US009777659B2

United States Patent
Aoyagi

(10) Patent No.: US 9,777,659 B2
(45) Date of Patent: Oct. 3, 2017

(54) CONTROL DEVICE OF INTERNAL COMBUSTION ENGINE

(75) Inventor: Shinsuke Aoyagi, Zama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 907 days.

(21) Appl. No.: 14/000,514

(22) PCT Filed: May 13, 2011

(86) PCT No.: PCT/JP2011/061020
§ 371 (c)(1),
(2), (4) Date: Aug. 20, 2013

(87) PCT Pub. No.: WO2012/157037
PCT Pub. Date: Nov. 22, 2012

(65) Prior Publication Data
US 2014/0074379 A1    Mar. 13, 2014

(51) Int. Cl.
F02D 41/14    (2006.01)
F02D 41/24    (2006.01)
F02D 41/00    (2006.01)
F02D 41/22    (2006.01)
F02D 41/18    (2006.01)

(52) U.S. Cl.
CPC ..... F02D 41/1454 (2013.01); F02D 41/0002 (2013.01); F02D 41/0072 (2013.01);
(Continued)

(58) Field of Classification Search
CPC ...... F02D 41/18; F02D 41/221; F02D 41/222; F02D 41/0002; F02D 41/0072;
(Continued)

(56) References Cited

U.S. PATENT DOCUMENTS 5,343,745 A * 9/1994 Tomisawa ............. F02D 41/187
                                                              123/491
5,750,889 A * 5/1998 Kowatari ............. F02D 41/187
                                                              701/101
(Continued)

FOREIGN PATENT DOCUMENTS

DE   10 2008 012 607 A1   9/2009
EP         2708724 A1     3/2014
(Continued)

OTHER PUBLICATIONS

Nov. 20, 2015 extended Search Report issued in European Patent Application No. 11865927.5.

*Primary Examiner* — Stephen K Cronin
*Assistant Examiner* — Arnold Castro
(74) *Attorney, Agent, or Firm* — Oliff PLC

(57) ABSTRACT

A control device of an internal combustion engine calculates on the basis of the air-fuel ratio difference a correction for the estimated fuel supply amount correction for correcting the estimated fuel supply amount to make the estimated and detected air-fuel ratios correspond to each other and calculates correction values for the fuel supply difference compensation and the air amount detection difference compensation by dividing the correction value for the estimated fuel supply amount correction, using the fuel supply and air amount detection difference proportions, and performing the air-fuel ratio control, using the corrected estimated fuel supply and detected air amounts. The correction value for the estimated fuel supply amount correction is divided to the correction values for the fuel supply difference compensation and the air amount detection difference compensation such that a value equivalent to the air-fuel ratio difference becomes equal to the air-fuel ratio difference, using these correction values.

5 Claims, 12 Drawing Sheets

(52) U.S. Cl.
CPC ....... F02D 41/1462 (2013.01); F02D 41/221 (2013.01); F02D 41/222 (2013.01); F02D 41/2454 (2013.01); F02D 41/1458 (2013.01); F02D 41/18 (2013.01); F02D 41/2474 (2013.01); Y02T 10/42 (2013.01); Y02T 10/47 (2013.01)

(58) Field of Classification Search
CPC ............. F02D 41/1454; F02D 41/1458; F02D 41/1462; F02D 41/2454; F02D 41/2474; Y02T 10/42; Y02T 10/47
See application file for complete search history.

(56) References Cited

U.S. PATENT DOCUMENTS

| | | | | |
|---|---|---|---|---|
| 5,987,997 | A * | 11/1999 | Roskam | G01F 1/668 73/861.29 |
| 9,194,322 | B2 * | 11/2015 | Shimada | F02D 41/30 701/104 |
| 2002/0114732 | A1 * | 8/2002 | Vyers | G01F 1/6847 422/62 |
| 2007/0074709 | A1 | 4/2007 | Kato et al. | |
| 2013/0054122 | A1 * | 2/2013 | Aoyagi | F02D 41/182 701/104 |
| 2014/0058646 | A1 * | 2/2014 | Shimada | F02D 41/30 701/104 |

FOREIGN PATENT DOCUMENTS

| | | |
|---|---|---|
| GB | 2 207 779 A | 2/1989 |
| JP | 2000-120480 A | 4/2000 |
| JP | A 2007-262946 | 10/2007 |

\* cited by examiner (A)

(B)

(C)

(A)

(B)

CONTROL DEVICE OF INTERNAL COMBUSTION ENGINE

TECHNICAL FIELD

This invention relates to a control device of an internal combustion engine.

BACKGROUND ART

A control device of an internal combustion engine is described in the Patent Document 1.

The engine of the Document 1 comprises fuel injectors, an air flow meter and an air-fuel ratio sensor.

The injector injects a fuel when a command corresponding to a target fuel injection amount (hereinafter, this command will be referred to as—fuel injection command—) is given to the injector. In the case that the injector can inject the fuel of the amount corresponding to the command exactly, that is, the injector has no error, the fuel of the amount corresponding to the target amount is injected from the injector.

The air flow meter outputs an output value corresponding to an amount of an air flowing therethrough (hereinafter, this amount will be referred to as—fresh air amount—).

The control device calculates the fresh air amount on the basis of the output value of the air flow meter. That is, the air flow meter detects the fresh air amount. In the case that the air flow meter can output an output value exactly corresponding to the actual fresh air amount, that is, the air flow meter has no error, the fresh air amount is exactly calculated on the basis of the output value of the air flow meter. That is, the air flow meter exactly detects the fresh air amount.

The air-fuel ratio sensor outputs an output value corresponding to an air-fuel ratio of a mixture gas formed in the combustion chamber of the engine (i.e. a gas of a mixed air and fuel and hereinafter, this gas will be referred simply to as—mixture gas—).

The control device calculates the air-fuel ratio of the mixture gas on the basis of the output value of the air-fuel ratio sensor. That is, the air-fuel ratio sensor detects the air-fuel ratio of the mixture gas.

In the case that the injector and the air flow meter have no error, the air-fuel ratio of the mixture gas calculated (hereinafter, this ratio will be referred to as—estimated air-fuel ratio—) from the fuel injection amount corresponding to the fuel injection command and the fresh air amount detected by the air flow meter (hereinafter, this amount will be referred to as—detected fresh air amount) corresponds to the air-fuel ratio of the mixture gas detected by the air-fuel ratio sensor (hereinafter, this ratio will be referred to as—detected air-fuel ratio—).

In other words, in the case that the injector or the air flow meter has an error, the estimated air-fuel ratio may become corresponding to the detected air-fuel ratio incidentally, however, in many cases, the estimated air-fuel ratio does not become corresponding to the detected air-fuel ratio.

Therefore, in the case that the estimated air-fuel ratio does not correspond to the detected air-fuel ratio, it can be judged that the injector or the air flow meter has an error.

There is a control using the fuel injection amount understood from the fuel injection command (hereinafter, this amount will be referred to as—commanded fuel injection amount—) or detected fresh air amount as an engine control.

If the injector has no error, the desired object of this control can be accomplished even when this control is performed using the commanded fuel injection amount itself or if the air flow meter has no error, the desired object of this control can be accomplished even when this control is performed using the detected fresh air amount itself.

However, in the case that the injector has an error, when the control is performed using the commanded fuel injection amount itself, the desired object of this control is not accomplished and in the case that the air flow meter has an error, when the control is performed using the detected fresh air amount itself, the desired object of this control is not accomplished.

Therefore, in order to accomplish the desired object of each control, when the injector has an error, the control should be performed using the commanded fuel injection amount appropriately corrected and when the air flow meter has an error, the control should be performed using the detected fresh air appropriately corrected.

That is, when the estimated air-fuel ratio does not correspond to the detected air-fuel ratio, it can be judged that the injector or the air flow meter has an error and therefore, the commanded fuel injection amount or the detected fresh air amount should be corrected.

In the device of the Document 1, when the estimated air-fuel ratio does not correspond to the detected air-fuel ratio, the commanded fuel injection amount and the detected fresh air amount are corrected as follows.

In the device of the Document 1, a ratio of the estimated air-fuel ratio relative to the detected air-fuel ratio (i.e. the estimated air-fuel ratio/detected air-fuel ratio and hereinafter, this will be referred to as—air-fuel-ratio —) is calculated during the engine operation.

Then, when the estimated air-fuel ratio corresponds to the detected air-fuel ratio, the air-fuel-ratio is "1" and therefore, a value is calculated by subtracting "1" from the air-fuel-ratio calculated in the case that the estimated air-fuel ratio does not correspond to the detected air-fuel ratio (=the ratio of the air-fuel ratio−1 and hereinafter, this value will be referred to as—air-fuel ratio difference—).

On the other hand, influences of the fuel injection difference and the fresh air amount detection difference maximally given to the air-fuel ratio difference are obtained by an experience, etc. and a rate of the air-fuel ratio difference due to the fuel injection difference in the air-fuel ratio (this rate is smaller than "1" and hereinafter, will be referred to as—fuel injection difference proportion) and a rate of the air-fuel ratio difference due to the fresh air amount detection difference (this rate is smaller than "1" and will be referred to as—fresh air amount detection difference proportion—) are previously obtained.

The sum of the fuel injection and fresh air amount detection difference proportions (=the fuel injection difference proportion+the fresh air amount detection difference proportion) is "1".

In the device of the Document 1, the fuel injection difference rate is calculated by multiplying the air-fuel ratio difference calculated during the engine operation by the fuel injection difference proportion (=the air-fuel ratio difference×the fuel injection difference proportion) and the fresh air amount detection difference rate is calculated by multiplying the air-fuel ratio difference calculated during the engine operation by the fresh air amount detection difference proportion (=the air-fuel ratio difference×the fresh air amount detection difference proportion).

When the air-fuel-ratio is larger than "1", the estimated air-fuel ratio is larger than the detected air-fuel ratio, that is, the estimated air-fuel ratio is leaner than the detected air-fuel ratio and therefore, it can be understood that the amount of the fuel injected actually from the injector (hereinafter, this amount will be referred to as—actual fuel injection amount—) is smaller than the commanded fuel injection amount and the actual fresh air amount is larger than the detected fresh air amount.

In this case, it is necessary to correct the fuel injection command corresponding to the target fuel injection amount so as to increase the command in order to make the injector inject the fuel of the amount corresponding to the target amount and it is necessary to correct the detected fresh air amount so as to increase the amount in order to detect the actual fresh air amount on the basis of the output value of the air flow meter.

In the device of the Document 1, the fuel injection command is corrected by multiplying this command by a value obtained by adding the fuel injection difference rate to "1" (=the fuel injection command×(1+the fuel injection difference rate)) and the detected fresh air amount is corrected by multiplying this amount by a value obtained by adding the fresh air amount detection difference rate to "1" (=the detected fresh air amount×(1+the fresh air amount detection difference rate)).

When the air-fuel-ratio is smaller than "1", the estimated air-fuel ratio is smaller than the detected air-fuel ratio, that is, the estimated air-fuel ratio is richer than the detected air-fuel ratio and therefore, it can be understood that the actual fuel injection amount is larger than the commanded fuel injection amount and the actual fresh air amount is smaller than the detected fresh air amount.

In this case, it is necessary to correct the fuel injection command corresponding to the target fuel injection amount so as to decrease this command in order to make the injector inject the fuel of the amount corresponding to the target fuel injection amount and it is necessary to correct the detected fresh air amount so as to decrease this amount in order to detect the actual fresh air amount on the basis of the output value of the air flow meter.

In the device of the Document 1, the fuel injection command is corrected by multiplying this command by a value obtained by subtracting the fuel injection difference rate from "1" (=the fuel injection command×(1−the fuel injection difference rate)) and the detected fresh air amount is corrected by multiplying this amount by a value obtained by the fresh air amount detection difference rate from "1" (=the detected fresh air amount×(1−the fresh air amount detection rate)).

PRIOR ART DOCUMENTS

Patent Document

[PATENT DOCUMENT 1] Unexamined Japanese Patent Publication No. 2007-262946

DISCLOSURE OF THE INVENTION

Problems to be Solved by the Invention

In order to make the estimated air-fuel ratio correspond to the detected air-fuel ratio for a relatively short time, when a ratio of a value obtained by adding the fresh air amount detection difference rate, calculated in the case that the air-fuel-ratio is larger than "1", to "1" (=1+the fresh air amount detection difference rate) relative to a value obtained by adding the fuel injection difference rate, calculated in the case that the air-fuel-ratio is larger than "1", to "1" (=1+the fuel injection difference rate) (=(1+the fresh air amount detection difference rate)/(1+the fuel injection difference rate), and hereinafter, this ratio will be referred to as—difference ratio—) corresponds to the air-fuel-ratio, the fact has been realized by the study of the inventor of this application that the air-fuel ratio difference is distributed appropriately to the air-fuel ratio differences due to the fuel injection difference and the fresh air amount detection difference, respectively.

Similarly, in order to make the estimated air-fuel ratio correspond to the detected air-fuel ratio for a relatively short time, when a ratio of a value obtained by subtracting the fresh air amount detection difference rate, calculated in the case that the air-fuel-ratio is smaller than "1", from "1" (=1−the fresh air amount detection difference rate) relative to a value obtained by subtracting the fuel injection difference rate, calculated in the case that the air-fuel-ratio is smaller than "1", from "1" (=1−the fuel injection difference rate) (=(1−the fresh air detection difference rate)/(1−the fuel injection difference rate) and hereinafter, this ratio will be referred to as—difference ratio—) corresponds to the air-fuel-ratio ratio, the fact has been realized by the study of the inventor of this application that the air-fuel ratio difference is distributed appropriately to the air-fuel ratio differences due to the fuel injection difference and the fresh air amount detection difference, respectively.

That is, in general, in the case of setting a correction value for correcting a parameter/parameters relating to the fuel injection amount to compensate the fuel injection difference and a correction value for correcting a parameter/parameters relating to the fresh air amount to compensate the fresh air amount detection difference on the basis of one air-fuel ratio obtained by the estimated and detected air-fuel ratios, when a value equivalent to the air-fuel ratio difference calculated from these correction values corresponds to the air-fuel ratio difference, it has been realized by the inventor of this application that the air-fuel ratio difference is distributed appropriately to the air-fuel ratio differences due to the fuel injection difference and the fresh air amount detection differences, respectively.

In the device of the Document 1, the difference ratios under the condition where the air-fuel-ratio is larger than "1" and is smaller than "1" do not correspond to the air-fuel-ratio.

Therefore, in the device of the Document 1, it can be understood that the air-fuel ratio difference is not distributed appropriately to the air-fuel ratio differences due to the fuel injection difference and the fresh air amount detection difference.

Because of this, even if the fuel injection command and the detected fresh air amount are corrected by the device of the Document 1, it takes relatively long time for making the estimated air-fuel ratio to correspond to the detected air-fuel ratio.

The appropriate distribution of the air-fuel ratio difference to air-fuel ratio differences due to the fuel injection difference and the fresh air amount detection difference is useful for making the estimated air-fuel ratio correspond to the detected air-fuel ratio for a relatively short time.

The object of the invention is to distribute the air-fuel ratio difference appropriately to the air-fuel ratio differences due to the fuel injection difference and the fresh air amount detection difference.

Means for Solving the Problems

The invention of this application relates to a control device of an internal combustion engine, comprising:

means for supplying a fuel to a combustion chamber;

means for giving to the fuel supply means, a command for supplying the fuel of a target amount to the combustion chamber by the fuel supply means;

means for estimating an amount of the fuel supplied from the fuel supply means to the combustion chamber on the basis of the command given from the fuel supply command means to the fuel supply means;

means for controlling an amount of an air supplied to the combustion chamber;

means for giving to the air supply amount control means, a command for supplying the air of a target amount to the combustion chamber by the air supply amount control means;

means for detecting the amount of the air supplied to the combustion chamber;

means for estimating an air-fuel ratio of a mixture gas formed in the combustion chamber on the basis of a fuel amount estimated by the fuel supply amount estimation means and an air amount detected by the air amount detection means;

means for detecting the air-fuel ratio of the mixture gas formed in the combustion chamber; and means for performing a control for making the air-fuel ratio of the mixture gas estimated by the air-fuel ratio estimation means and the air-fuel ratio of the mixture gas detected by the air-fuel ratio detection means correspond to each other, using the estimated fuel supply amount and the detected air amount or the air supply command.

The device of the invention calculates on the basis of a difference of the estimated air-fuel ratio relative to the detected air-fuel ratio, a correction value for correcting the fuel supply amount estimated by the fuel supply amount estimation means to make the estimated and detected air-fuel ratios correspond to each other when the estimated and detected air-fuel ratios do not correspond to each other, acquires as a fuel supply difference proportion, a rate of the air-fuel ratio difference due to the fuel supply difference of the fuel supply means occupying the air-fuel ratio difference and as an air amount detection difference proportion, a rate of the air-fuel ratio difference due to the air amount detection difference of the air amount detection means occupying the air-fuel ratio difference, calculates a correction value for correcting the estimated fuel supply amount and a correction value for correcting the detected air amount or the air supply command by dividing the correction value for the estimated fuel supply amount compensation, using the fuel supply and air amount detection difference proportions, and performs the air-fuel ratio control, using the estimated fuel supply amount corrected by the correction value for the fuel supply difference compensation and the detected air amount or the air supply command corrected by the correction value for the air amount detection difference compensation.

In order to accomplish the above-mentioned object, in the device of the invention, the correction value for the estimated fuel supply amount correction is divided to the correction value for the fuel supply difference compensation and the correction value for the air amount detection difference compensation such that a value equivalent to the air-fuel ratio difference calculated using the correction values for the fuel supply difference compensation and the air amount detection difference compensation corresponds to the air-fuel ratio difference.

According to the invention, the correction values for the fuel supply difference compensation and the air amount detection difference compensation are set on the basis of the difference of the estimated air-fuel ratio relative to the detected air-fuel ratio.

When the air-fuel ratio difference equivalent value, which is a value equivalent to the air-fuel ratio difference, is calculated from these correction values, the correction values for the fuel supply difference compensation and the air amount detection difference compensation are set such that the air-fuel ratio difference equivalent value corresponds to the air-fuel ratio difference (i.e. the value as the base of the setting of the correction values for the fuel supply difference compensation and the air amount detection difference compensation).

When the air-fuel ratio difference equivalent value is equal to the air-fuel ratio difference, the air-fuel ratio control using the correction values for the fuel supply difference compensation and the air amount detection difference compensation is one under the condition where the air-fuel ratio difference is distributed appropriately to the air-fuel ratio differences due to the fuel injection difference and the air amount detection difference, respectively.

Therefore, according to the invention, an effect obtained by the air-fuel ratio control becomes high.

The fuel supply means of the invention is not limited to a particular means and may be a fuel injector.

The air supply amount control means of the invention is not limited to a particular means and may be a throttle valve.

When the invention is applied to the engine comprising an exhaust gas recirculation device for recirculating to an intake passage, an exhaust gas discharged from the combustion chamber to an exhaust passage, which device having a valve for controlling an amount of the exhaust gas recirculated to the intake passage, the air supply amount control means of the invention may be the recirculated exhaust gas amount control valve.

When the invention is applied to the engine comprising a supercharger having an exhaust turbine arranged in the exhaust passage and a compressor arranged in the intake passage, which supercharger has vanes of the exhaust turbine for controlling a compression force to the air by the compressor, the air supply amount control means of the invention may be the vanes.

The air amount detection means of the invention is not limited to a particular means and may be an air flow meter arranged in the intake passage.

The air-fuel ratio detection means of the invention is not limited to a particular means and may be an oxygen concentration sensor.

The air-fuel ratio difference of the invention may be any value indicating the difference of the estimated air-fuel ratio relative to the detected air-fuel ratio and may be a difference equivalent value calculated by subtracting 1 from the ratio of the estimated air-fuel ratio relative to the detected air-fuel ratio.

In this case, the correction value for the estimated fuel supply amount correction is calculated as a value for making the difference equivalent value zero.

The method for obtaining the fuel supply difference proportion and the air amount detection difference proportion are not limited to a particular method and the following method may be preferred.

That is, an amount of a particular component of the exhaust gas discharged from the combustion chamber is acquired as a first particular component amount when the air-fuel ratio control is performed using the estimated fuel supply amount corrected by the correction value for the fuel supply difference compensation and the detected air amount or the air supply command not corrected by the correction value for the air amount detection difference compensation under the condition where the fuel supply means has a fuel supply difference and the air amount detection means has no air amount detection difference.

Further, an amount of a particular component of the exhaust gas discharged from the combustion chamber is acquired as a second particular component amount when the air-fuel ratio control is performed using the estimated fuel supply amount not corrected by the correction value for the fuel supply difference compensation and the detected air amount or the air supply command corrected by the correction value for the air amount detection difference compensation under the condition where the fuel supply means has a fuel supply difference and the air amount detection means has no air amount detection difference.

Further, an amount of a particular component of the exhaust gas discharged from the combustion chamber is acquired as a third particular component amount when the air-fuel ratio control is performed using the estimated fuel supply amount corrected by the correction value for the fuel supply difference compensation and the detected air amount or the air supply command not corrected by the correction value for the air amount detection difference compensation under the condition where the fuel supply means has no fuel supply difference and the air amount detection means has an air amount detection difference.

Further, an amount of a particular component of the exhaust gas discharged from the combustion chamber is acquired as a fourth particular component amount when the air-fuel ratio control is performed using the estimated fuel supply amount not corrected by the correction value for the fuel supply difference compensation and the detected air amount or the air supply command corrected by the correction value for the air amount detection difference compensation under the condition where the fuel supply means has no fuel supply difference and the air amount detection means has an air amount detection difference.

Then, it is preferred that the fuel supply and air amount detection difference proportions are obtained on the basis of the four acquired particular component amounts.

According to the invention, when the fuel supply means has a fuel supply difference (for example, a drawing tolerance of the manufacturing of the fuel supply means) and the air amount detection means has an air amount detection difference (for example, a drawing tolerance of the manufacturing of the air amount detection means), the fuel supply and air amount detection difference proportions depending on the errors of the fuel supply means and the air amount detection means, are used for the air-fuel ratio control.

Therefore, the air-fuel ratio control is performed considering the fuel supply difference of the fuel supply means and the air amount detection difference of the air amount detection means and therefore, the effect obtained from the air-fuel ratio control becomes high.

For example, it is preferred that the fuel supply and air amount detection difference proportions are obtained as follows.

That is, an amount of a particular component of the exhaust gas discharged from the combustion chamber is acquired as a first particular component amount when the air-fuel ratio control is performed using the estimated fuel supply amount corrected by the correction value for the fuel supply difference compensation and the detected air amount or the air supply command not corrected by the correction value for the air amount detection difference compensation under the condition where the fuel supply means has a fuel supply difference, the air amount detection means has no air amount detection difference and the air-fuel ratio detection means has no air-fuel ratio detection difference.

Further, an amount of a particular component of the exhaust gas discharged from the combustion chamber is acquired as a second particular component amount when the air-fuel ratio control is performed using the estimated fuel supply amount not corrected by the correction value for the fuel supply difference compensation and the detected air amount or the air supply command corrected by the correction value for the air amount detection difference compensation under the condition where the fuel supply means has a fuel supply difference, the air amount detection means has no air amount detection difference and the air-fuel ratio detection means has no air-fuel ratio detection difference.

Further, an amount of a particular component of the exhaust gas discharged from the combustion chamber is acquired as a third particular component amount when the air-fuel ratio control is performed using the estimated fuel supply amount corrected by the correction value for the fuel supply difference compensation and the detected air amount or the air supply command not corrected by the correction value for the air amount detection difference compensation under the condition where the fuel supply means has no fuel supply difference, the air amount detection means has an air amount detection difference and the air-fuel ratio detection means has no air-fuel ratio detection difference.

Further, an amount of a particular component of the exhaust gas discharged from the combustion chamber is acquired as a fourth particular component amount when the air-fuel ratio control is performed using the estimated fuel supply amount not corrected by the correction value for the fuel supply difference compensation and the detected air amount or the air supply command corrected by the correction value for the air amount detection difference compensation under the condition where the fuel supply means has no fuel supply difference, the air amount detection means has an air amount detection difference and the air-fuel ratio detection means has no air-fuel ratio detection difference.

Further, an amount of a particular component of the exhaust gas discharged from the combustion chamber is acquired as a fifth particular component amount when the air-fuel ratio control is performed using the estimated fuel supply amount corrected by the correction value for the fuel supply difference compensation and the detected air amount or the air supply command not corrected by the correction value for the air amount detection difference compensation under the condition where the fuel supply means has no fuel supply difference, the air amount detection means has no air amount detection means difference and the air-fuel ratio detection means has an air-fuel ratio detection difference.

Further, an amount of a particular component of the exhaust gas discharged from the combustion chamber is acquired as a sixth particular component amount when the air-fuel ratio control is performed using the estimated fuel supply amount not corrected by the correction value for the fuel supply difference compensation and the detected air amount or the air supply command corrected by the correction value for the air amount detection difference compensation under the condition where the fuel supply means has no fuel supply difference, the air amount detection means has no air amount detection difference, and the air-fuel ratio detection means has an air-fuel ratio detection difference.

Then, it is preferred that the fuel supply and air amount detection difference proportions are obtained on the basis of the acquired six particular component amounts.

According to this invention, when the fuel supply means has a fuel supply difference (for example, a drawing tolerance of the manufacturing of the fuel supply means), the air amount detection means an air amount detection difference (for example, a drawing tolerance of the manufacturing of the air amount detection means) and the air-fuel ratio detection means has an air-fuel ratio detection difference (for example, a drawing tolerance of the manufacturing of the air-fuel ratio detection means), the fuel supply and air amount detection difference proportions depending on the fuel supply difference of the fuel supply means, the air amount detection difference of the air amount detection means and the air-fuel ratio detection difference of the air-fuel ratio detection means, are used for the air-fuel ratio control.

Therefore, the air-fuel ratio control is performed considering these three differences and therefore, the effect obtained from the air-fuel ratio control becomes high.

Another invention of this application relates to a control device of an internal combustion engine, comprising:

means for supplying a fuel to a combustion chamber;

means for giving to the fuel supply means, a command for supplying a fuel of a target amount to the combustion chamber by the fuel supply means;

means for estimating an amount of the fuel supplied to the combustion chamber from the fuel supply means on the basis of the command given from the fuel supply command means to the fuel supply means;

means for controlling an amount of an air supplied to the combustion chamber;

means for giving to the air supply amount control means, a command for supplying the air of a target amount to the combustion chamber by the air supply amount control means;

means for detecting the amount of the air supplied to the combustion chamber;

means for estimating an air-fuel ratio of a mixture gas formed in the combustion chamber on the basis of the fuel amount estimated by the fuel supply amount estimation means and the air amount detected by the air amount detection means;

means for detecting the air-fuel ratio of the mixture gas formed in the combustion chamber; and means for performing an air-fuel ratio control for making the air-fuel ratio of the mixture gas estimated by the air-fuel ratio estimation means and the air-fuel ratio of the mixture gas detected by the air-fuel ratio detection means correspond to each other, using the fuel supply command and the detected air amount or the air supply command.

The device of this invention calculates on the basis of a difference of the estimated air-fuel ratio relative to the detected air-fuel ratio, a correction value for correcting the command given to the fuel supply means to make the estimated and detected air-fuel ratios correspond to each other when the estimated and detected air-fuel ratios do not correspond to each other, acquires as a fuel supply difference proportion, a rate of the air-fuel ratio difference due to the fuel supply difference of the fuel supply means occupying the air-fuel ratio difference and acquires as an air amount detection difference proportion, a rate of the air-fuel ratio difference due to the air amount detection difference of the air amount detection means occupying the air-fuel ratio difference, calculates correction values for correcting the fuel supply command and the detected air amount or the air supply command by dividing the correction value for the fuel supply command correction, using the fuel supply and air amount detection difference proportions, performs the air-fuel ratio control, using the fuel supply command corrected by the correction value for the fuel supply difference compensation and the detected air amount or the air supply command corrected by the correction value for the air amount detection difference compensation.

In order to accomplish the above-mentioned object, in the device of this invention, the correction value for the fuel supply command correction is divided to the correction values for the fuel supply difference compensation and the air amount detection difference compensation such that the air-fuel ratio difference equivalent value, which is a value equivalent to the air-fuel ratio difference calculated using the correction values for the fuel supply difference compensation and the air amount detection difference compensation, corresponds to the air-fuel ratio difference.

According to this invention, the correction values for the fuel supply difference compensation and the air amount detection difference compensation are set on the basis of the difference of the estimated air-fuel ratio relative to the detected air amount.

The correction values for the fuel supply difference compensation and the air amount detection difference compensation are set such that the air-fuel ratio difference equivalent value calculated from these correction values as a value equivalent to the air-fuel ratio difference, corresponds to the air-fuel ratio difference (i.e. a value as the base of the setting of the correction values for the fuel supply difference compensation and the air amount detection difference compensation).

When the air-fuel difference equivalent value is equal to the air-fuel ratio difference, the air-fuel ratio control using these correction values is a control under the condition where the air-fuel ratio difference is distributed appropriately to the air-fuel ratio differences due to the fuel injection difference and the air amount detection difference.

Therefore, according to this invention, the effect obtained from the air-fuel ratio becomes high.

The air-fuel ratio difference of this invention may be any value indicating the difference of the estimated air-fuel ratio relative to the detected air-fuel ratio and may be a difference equivalent value calculated by subtracting 1 from the ratio of the estimated air-fuel ratio relative to the detected air-fuel ratio.

In this case, the correction value for the fuel supply command correction is calculated as a value for making the difference equivalent value zero.

The method for obtaining the fuel supply and air amount detection difference proportions is not limited to a particular one and the following method may be preferred.

That is, an amount of a particular component of the exhaust gas discharged from the combustion chamber is acquired as a first particular component amount when the air-fuel ratio control is performed using the fuel supply command corrected by the correction value for the fuel supply difference compensation and the detected air amount or the air supply command not corrected by the correction value for the air amount detection difference compensation under the condition where the fuel supply means has a fuel supply difference and the air amount detection means has no air amount detection difference.

Further, an amount of a particular component of the exhaust gas discharged from the combustion chamber is acquired as a second particular component amount when the air-fuel ratio control is performed using the fuel supply command not corrected by the correction value for the fuel supply difference compensation and the detected air amount or the air supply command corrected by the correction value for the air amount detection difference compensation under the condition where the fuel supply means has a fuel supply difference and the air amount detection means has no air amount detection difference.

Further, an amount of a particular component of the exhaust gas discharged from the combustion chamber is acquired as a third particular component amount when the air-fuel ratio control is performed using the fuel supply command corrected by the correction value for the fuel supply difference compensation and the detected air amount or the air supply command not corrected by the correction value for the air amount detection difference compensation under the condition where the fuel supply means has no fuel supply difference and the air amount detection means has an air amount detection difference.

Further, an amount of a particular component of the exhaust gas discharged from the combustion chamber is acquired as a fourth particular component amount when the air-fuel ratio control is performed using the fuel supply command not corrected by the correction value for the fuel supply difference compensation and the detected air amount or the air supply command corrected by the correction value for the air amount detection difference compensation under the condition where the fuel supply means has no fuel supply difference and the air amount detection means has an air amount detection difference.

Then, it is preferred that the fuel supply and air amount detection difference proportions are obtained on the basis of the acquired four particular component amounts.

According to this invention, when the fuel supply means has a fuel supply difference (for example, a drawing tolerance of the manufacturing of the fuel supply means) and the air amount detection means has an air amount detection difference (for example, a drawing tolerance of the manufacturing of the air amount detection means), the fuel supply and air amount detection difference proportions depending on the fuel supply difference of the fuel supply means and the air amount detection difference of the air amount detection means, are used for the air-fuel ratio control.

Therefore, the air-fuel ratio control is performed considering the fuel supply difference of the fuel supply means and the air amount detection difference of the air amount detection means and therefore, an effect obtained by the air-fuel ratio control becomes high.

For example, it is preferred that the fuel supply and air amount detection difference proportions are obtained as follows.

That is, an amount of a particular component of the exhaust gas discharged from the combustion chamber is acquired as a first particular component amount when the air-fuel ratio control is performed using the fuel supply command corrected by the correction value for the fuel supply difference compensation and the detected air amount or the air supply command not corrected by the correction value for the air amount detection difference compensation under the condition where the fuel supply means has a fuel supply difference, the air amount detection means has no air amount detection difference and the air-fuel ratio detection means has no air-fuel ratio detection difference.

Further, an amount of a particular component of the exhaust gas discharged from the combustion chamber is acquired as a second particular component amount when the air-fuel ratio control is performed using the fuel supply command not corrected by the correction value for the fuel supply difference compensation and the detected air amount or the air supply command corrected by the correction value for the air amount detection difference compensation under the condition where the fuel supply means has a fuel supply difference, the air amount detection means has no air amount detection difference and the air-fuel ratio detection means has no air-fuel ratio detection difference.

Further, an amount of a particular component of the exhaust gas discharged from the combustion chamber is acquired as a third particular component amount when the air-fuel ratio control is performed using the fuel supply command corrected by the correction value for the fuel supply difference compensation and the detected air amount or the air supply command not corrected by the correction value for the air amount detection difference compensation under the condition where the fuel supply means has no fuel supply difference, the air amount detection means has an air amount detection difference and the air-fuel ratio detection means has no air-fuel ratio detection difference.

Further, an amount of a particular component of the exhaust gas discharged from the combustion chamber is acquired as a fourth particular component amount when the air-fuel ratio control is performed using the fuel supply command not corrected by the correction value for the fuel supply difference compensation and the detected air amount or the air supply command corrected by the correction value for the air amount detection difference compensation under the condition where the fuel supply means has no fuel supply difference, the air amount detection means has an air amount detection difference and the air fuel ratio detection means has no air-fuel ratio detection difference.

Further, an amount of a particular component of the exhaust gas discharged from the combustion chamber is acquired as a fifth particular component amount when the air-fuel ratio control is performed using the fuel supply command corrected by the correction value for the fuel supply difference compensation and the detected air amount or the air supply command not corrected by the correction value for the air amount detection difference compensation under the condition where the fuel supply means and the air amount detection means have no error and the air-fuel ratio detection means has an error.

Further, an amount of a particular component of the exhaust gas discharged from the combustion chamber is acquired as a sixth particular component amount when the air-fuel ratio control is performed using the fuel supply command not corrected by the correction value for the fuel supply difference compensation and the detected air amount or the air supply command corrected by the correction value for the air amount detection difference compensation under the condition where the fuel supply means and the air amount detection means have no error and the air-fuel ratio detection means has an error.

Then, it is preferred that the fuel supply and air amount detection difference proportions are obtained on the basis of the acquired six particular component amounts.

According to this invention, when the fuel supply means has an error (for example, a drawing tolerance of the manufacturing of the fuel supply means), the air amount detection means has an error (for example, a drawing tolerance of the manufacturing of the air amount detection means) and the air-fuel ratio detection means has an error (for example, a drawing tolerance of the manufacturing of the air-fuel ratio detection means), the fuel supply and air amount detection difference proportions depending on the errors of the fuel supply means, the air amount detection means and the air-fuel ratio detection means, are used for the air-fuel ratio control.

Therefore, the air-fuel ratio control is performed considering the errors of the fuel supply means, the air amount detection means and the air-fuel ratio detection means and therefore, the effect obtained from the air-fuel ratio becomes high.

Further another invention of this application relates to a control device of an internal combustion engine, comprising:

means for supplying a fuel to a combustion chamber;
means for giving to the fuel supply means, a command for supplying the fuel of a target amount to the combustion chamber by the fuel supply means;
means for estimating the amount of the fuel supplied from the fuel supply means to the combustion chamber on the basis of the command given from the fuel supply command means to the fuel supply means;
means for controlling an amount of a fuel supplied to the combustion chamber;
means for giving to the air supply amount control means, a command for supplying the air of a target amount to the combustion chamber by the air supply amount control means;
means for detecting an amount of the air supplied to the combustion chamber;
means for estimating an air-fuel ratio of a mixture gas formed in the combustion chamber on the basis of the amount of the fuel estimated by the fuel supply amount estimation means and the amount of the air detected by the air amount detection means;
means for detecting the air-fuel ratio of the mixture gas formed in the combustion chamber; and
means for performing an air-fuel ratio control for making the air-fuel ratio of the mixture gas estimated by the air-fuel ratio estimation means and the air-fuel ratio of the mixture gas detected by the air-fuel ratio detection means correspond to each other, using the estimated fuel supply amount, the fuel supply command and the detected air amount or the air supply command.

The device of this invention calculates on the basis of the difference of the estimated air-fuel ratio relative to the detected air-fuel ratio, a correction value for correcting the amount estimated by the fuel supply amount estimation means and the fuel supply command given to the fuel supply means to make the estimated and detected air-fuel ratios correspond to each other when the estimated and detected air-fuel ratios do not correspond to each other, the device acquires as a fuel supply difference proportion, a rate of the air-fuel ratio difference due to the fuel supply difference of the fuel supply means occupying the air-fuel ratio difference and acquires as an air amount detection difference proportion, a rate of the air-fuel ratio difference due to the air amount detection difference of the air amount detection means occupying the air-fuel ratio difference,
calculates a correction value for correcting the estimated fuel supply amount and the fuel supply command and a correction value for correcting the detected air amount or the air supply command by dividing the correction value for the estimated fuel supply amount-fuel supply command correction, using the fuel supply and air amount detection difference proportions, and
controls the air-fuel ratio control using the estimated fuel supply amount corrected by the correction value for fuel supply difference compensation, the fuel supply command corrected by the correction value for the fuel supply difference compensation and the detected air amount or the air supply command corrected by the correction value for the air amount detection difference compensation.

In the device of this invention, in order to accomplish the above-mentioned object, the correction value for the estimated fuel supply amount-fuel supply command correction is divided to the correction value for the fuel supply difference compensation and the correction value for the air amount detection difference compensation such as the value equivalent to the air-fuel ratio difference calculated using the correction values for the fuel supply difference compensation and the air amount detection difference compensation corresponds to the air-fuel ratio difference.

According to this invention, the correction values for fuel supply difference compensation and the air amount detection difference compensation are set on the basis of the air-fuel ratio difference which is a difference of the estimated air-fuel ratio relative to the detected air amount.

These correction values are set such that the air-fuel ratio difference equivalent value equivalent to the air-fuel ratio difference calculated from these correction values, becomes equal to the air-fuel ratio difference (i.e. a value as the base of the setting of the correction values for the fuel supply difference compensation and the air amount detection difference compensation).

When the air-fuel ratio difference equivalent value is equal to the air-fuel ratio difference, the air-fuel ratio control using these correction values is a control under the condition where the air-fuel ratio difference is distributed appropriately to the air-fuel ratio differences due to the fuel injection difference and the air amount detection difference.

Therefore, according to this invention, the effect obtained by this air-fuel ratio control becomes high.

The air-fuel ratio difference of this invention may be any value indicating the difference of the estimated air-fuel ratio relative to the detected air-fuel ratio and may be a difference equivalent value calculated by subtracting 1 from the ratio of the estimated air-fuel ratio relative to the detected air-fuel ratio.

In this case, the correction value for the estimated fuel supply amount/fuel supply command correction is calculated as a value for making the difference equivalent value zero.

The method for obtaining the fuel supply difference and air amount detection difference proportions is not limited to a particular method and the following method may be preferred.

That is, an amount of the particular component of the exhaust gas discharged from the combustion chamber is acquired as a first particular amount when the air-fuel ratio control is performed using the estimated fuel supply amount corrected by the correction value for the fuel supply difference compensation, the fuel supply command corrected by the correction value for the fuel supply difference compensation and the detected air amount or the air supply command not corrected by the air amount detection difference compensation under the condition where the fuel supply means has an error and the air amount detection means has no error.

Further, an amount of the particular component of the exhaust gas discharged from the combustion chamber is acquired as a second particular component amount when the air-fuel ratio control is performed using the estimated fuel supply amount not corrected by the correction value for the fuel supply difference compensation, the fuel supply command not corrected by the correction value for the fuel supply difference compensation and the detected air amount or the air supply command corrected by the air amount detection difference compensation under the condition where the fuel supply means has an error and the air amount detection means has no error.

Further, an amount of the particular component of the exhaust gas discharged from the combustion chamber is acquired as a third particular component amount when the air-fuel ratio control is performed using the estimated fuel supply amount corrected by the correction value for the fuel supply difference compensation, the fuel supply command corrected by the correction value for the fuel supply difference compensation and the detected air amount or the air supply command not corrected by the correction value for the air amount detection difference compensation under the condition where the fuel supply means has no error and the air amount detection means has an error.

Further, an amount of the particular component of the exhaust gas discharged from the combustion chamber is acquired as a fourth particular component amount when the air-fuel ratio control is performed using the estimated fuel supply amount not corrected by the correction value for the fuel supply difference compensation, the fuel supply command not corrected by the correction value for the fuel supply difference compensation and the detected air amount or the air supply command corrected by the correction value for the air amount detection difference compensation under the condition where the fuel supply means has no error and the air amount detection means has an error.

Then, it is preferred that the fuel supply difference and air amount detection difference proportions are obtained on the basis of the four acquired particular component amounts.

According to this invention, when the fuel supply means has an error (for example, a drawing tolerance of the manufacturing of the fuel supply means) and the air amount detection means has an error (for example, a drawing tolerance of the manufacturing of the air amount detection means), the fuel supply difference and air amount detection difference proportions depending on the fuel supply difference of the fuel supply means and the air amount detection difference of the air amount detection means, are used for the air-fuel ratio control.

Therefore, the air-fuel ratio control is performed considering the fuel supply difference of the fuel supply means and the air amount detection difference of the air amount detection means and therefore, the effect obtained by the air-fuel ratio control becomes high.

For example, it is preferred that the fuel supply difference and air amount detection difference proportions are obtained as follows.

That is, an amount of the particular component of the exhaust gas discharged from the combustion chamber is acquired as a first particular component amount when the air-fuel ratio control is performed using the estimated fuel supply amount corrected by the correction value for the fuel supply difference compensation, the fuel supply command corrected by the correction value for the fuel supply difference compensation and the detected air amount or the air supply command not corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a second particular component amount when the air-fuel ratio control is performed using the estimated fuel supply amount not corrected by the correction value for the fuel supply difference compensation, the fuel supply command not corrected by the correction value for the fuel supply difference compensation and the detected air amount or the air supply command corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a third particular component amount when the air-fuel ratio control is performed using the estimated fuel supply amount corrected by the correction value for the fuel supply difference compensation, the fuel supply command corrected by the correction value for the fuel supply difference compensation and the detected air amount and the air supply command not corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fourth particular component amount when the air-fuel ratio control is performed using the estimated fuel supply amount not corrected by the correction value for the fuel supply difference compensation, the fuel supply command not corrected by the correction value for the fuel supply difference compensation and the detected air amount or the air supply command corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fifth particular component amount when the air-fuel ratio control is performed using the estimated fuel supply amount corrected by the correction value for the fuel supply difference compensation, the fuel supply command corrected by the correction value for the fuel supply difference compensation and the detected air amount or the air supply command not corrected by the correction value for the air amount detection difference compensation under the condition where the fuel supply means and the air amount detection means have no error and the air-fuel ratio detection means has an error.

Further, an amount of the particular component of the exhaust gas discharged from the combustion chamber is acquired as a sixth particular component when the air-fuel ratio control is performed using the estimated fuel supply amount not corrected by the correction value for the fuel supply difference compensation, the fuel supply command not corrected by the correction value for the fuel supply difference compensation and the detected air amount or the air supply command corrected by the correction value for the air amount detection difference compensation under the condition where the fuel supply means and the air amount detection means have no error and the air-fuel ratio detection means has an error.

Then, it is preferred that the fuel supply difference and air amount detected difference proportions are obtained on the basis of the six acquired particular component amounts.

According to this invention, when the fuel supply means has an error (for example, a drawing tolerance of the manufacturing of the fuel supply means), the air amount detection means has an error (for example, a drawing tolerance of the manufacturing of the air amount detection means) and the air-fuel ratio detection means has an error (for example, a drawing tolerance of the manufacturing of the air-fuel ratio detection means), the fuel supply difference and air amount detection difference proportions depending on these differences of the fuel supply means, the air amount detection means and the air-fuel ratio detection means, are used for the air-fuel ratio control.

Therefore, the air-fuel ratio control is performed considering the errors of the fuel supply means, the air amount detection means and the air-fuel ratio detection means and therefore, the effect obtained by the air-fuel ratio control becomes high.

Further another invention of this application relates to a control device of an internal combustion engine, comprising:
  means for supplying a fuel to a combustion chamber;
  means for giving to the fuel supply means, a command for supplying the fuel of a target amount to the combustion chamber by the fuel supply means;
  means for estimating an amount of the fuel supplied from the fuel supply means to the combustion chamber on the basis of the command given from the fuel supply command means to the fuel supply means;
  means for controlling an amount of an air supplied to the combustion chamber;
  means for giving to the air supply amount control means, a command for supplying the air of a target amount by the air supply amount control means to the combustion chamber;
  means for detecting the amount of the air supplied to the combustion chamber;
  means for estimating an air-fuel ratio of a mixture gas formed in the combustion chamber on the basis of the amount of the air estimated by the fuel supply amount estimation means and the amount of the air detected by the air amount detection means;
  means for detecting the air-fuel ratio of the mixture gas formed in the combustion chamber; and
  means for performing an air-fuel ratio control for making the air-fuel ratios of the mixture gas estimated by the air-fuel ratio estimation means and detected by the air-fuel ratio detection means correspond to each other, using the estimated fuel supply amount or the fuel supply command and the detected air amount.

The device of this invention calculates on the basis of the difference of the estimated air-fuel ratio relative to the detected air-fuel ratio, a correction value for correcting the air amount detected by the air amount detection means to make the estimated and detected air-fuel ratios correspond to each other when the estimated and detected air-fuel ratios do not correspond to each other,
  acquires as a fuel supply difference proportion, a rate of the air-fuel ratio difference due to the fuel supply difference of the fuel supply means occupying the air-fuel ratio difference and acquires as an air amount detection difference proportion, a rate of the air-fuel ratio difference due to the air amount detection difference of the air amount detection means occupying the air-fuel ratio difference,
  calculates a correction value for correcting the estimated fuel supply amount or the fuel supply command and a correction value for correcting the detected air amount by dividing the correction value for the detected air amount correction, using the fuel supply difference and air amount detection difference proportions, and
  performs the air-fuel ratio control using the estimated fuel supply amount or the fuel supply command corrected by the correction value for the fuel supply difference compensation and the detected air amount corrected by the correction value for the air amount detection difference compensation.

In the device of this invention, in order to accomplish the above-mentioned object, the correction value for the detected air amount correction is divided to the correction values for the fuel supply difference compensation and the air amount detection difference compensation such that the air-fuel ratio difference equivalent value equivalent to the air-fuel ratio difference calculated using the correction values for the fuel supply difference compensation and the air amount detection difference compensation, becomes equal to the air-fuel ratio difference.

According to this invention, the correction values for the fuel supply difference compensation and the air amount detection difference compensation are set on the basis of the difference of the estimated air-fuel ratio relative to the detected air-fuel ratio.

These correction values are set such that the air-fuel ratio difference equivalent value equivalent to the air-fuel ratio difference calculated from these correction values, becomes equal to the air-fuel ratio difference (i.e. a value as the base of the setting of these correction values).

When the air-fuel ratio difference equivalent value is equal to the air-fuel ratio difference, the air-fuel ratio control using these correction values is a control under the condition where the air-fuel ratio difference is distributed appropriately to the air-fuel ratio differences due to the fuel injection difference and the air amount detection difference.

Therefore, according to this invention, the effect obtained by the air-fuel ratio control becomes high.

The air-fuel ratio difference of the invention may be any values indicating the difference of the estimated air-fuel ratio relative to the detected air-fuel ratio and may be a difference equivalent value calculated by subtracting 1 from the ratio of the estimated air-fuel ratio relative to the detected air-fuel ratio.

In this case, the correction value for the detected air amount correction is calculated as a value for making the difference equivalent value zero.

The method for obtaining the fuel supply difference and air amount detection difference proportions is not limited to a particular method and the following method may be preferred.

That is, an amount of the particular component of the exhaust gas discharged from the combustion chamber is acquired as a first particular component amount when the air-fuel ratio control is performed using the estimated fuel supply amount or the fuel supply command corrected by the correction value for the fuel supply difference compensation and the detected air amount not corrected by the correction value for the air amount detection difference compensation under the condition where the fuel supply means has an error and the air amount detection means has no error.

Further, an amount of the particular component of the exhaust gas discharged from the combustion chamber is acquired as a second particular component amount when the air-fuel ratio control is performed using the estimated fuel supply amount or the fuel supply command not corrected by the correction value for the fuel supply difference compensation and the detected air amount corrected by the correction value for the air amount detection difference compensation under the condition where the fuel supply means has an error and the air amount detection means has no error.

Further, an amount of the particular component of the exhaust gas discharged from the combustion chamber is acquired as a third particular component amount when the air-fuel ratio control is performed using the estimated fuel supply amount or the fuel supply command corrected by the correction value for the fuel supply difference compensation and the detected air amount not corrected by the correction value for the air amount detection difference compensation under the condition where the fuel supply means has no error and the air amount detection means has an error.

Further, an amount of the particular component of the exhaust gas discharged from the combustion chamber is acquired as a fourth particular component amount when the air-fuel ratio control is performed using the estimated fuel supply amount or the fuel supply command not corrected by the correction value for the fuel supply difference compensation and the detected air amount corrected by the correction value for the air amount detection difference compensation under the condition where the fuel supply means has no error and the air amount detection means has an error.

Then, it is preferred that the fuel supply difference and air amount detection difference proportions are obtained on the basis of the four acquired particular component amounts.

According to this invention, when the fuel supply means has an error (for example, a drawing tolerance of the manufacturing of the fuel supply means) and the air amount detection means has an error (for example, a drawing tolerance of the manufacturing of the air amount detection means), the fuel supply difference and air amount detection difference proportions depending on the errors of the fuel supply means and the air amount detection means, are used for the air-fuel ratio control.

Therefore, the air-fuel ratio control is performed considering the errors of the fuel supply means and the air amount detection means and therefore, the effect obtained by the air-fuel ratio control becomes high.

For example, it is preferred that the fuel supply difference and air amount detection difference proportions are obtained as follows.

That is, an amount of a particular component of an exhaust gas discharged from the combustion chamber is acquired as a first particular component amount when the air-fuel ratio control is performed using the estimated fuel supply amount or the fuel supply command corrected by the correction value for the fuel supply difference compensation and the detected air amount not corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a second particular component amount when the air-fuel ratio control is performed using the estimated fuel supply amount or the fuel supply command not corrected by the correction value for the fuel supply difference compensation and the detected air amount corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a third particular component amount when the air-fuel ratio control is performed using the estimated fuel supply amount or the fuel supply command corrected by the correction value for the fuel supply difference compensation and the detected air amount not corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fourth particular component amount when the air-fuel ratio control is performed using the estimated fuel supply amount or the fuel supply command not corrected by the correction value for the fuel supply difference compensation and the detected air amount corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fifth particular component amount when the air-fuel ratio control is performed using the estimated fuel supply amount or the fuel supply command corrected by the correction value for the fuel supply difference compensation and the detected air amount not corrected by the correction value for the air amount detection difference compensation under the condition where the fuel supply means and the air amount detection means have no error and the air-fuel ratio detection means has an error.

Further, an amount of the particular component of the exhaust gas discharged from the combustion chamber is acquired as a sixth particular component amount when the air-fuel ratio control is performed using the estimated fuel supply amount or the fuel supply command not corrected by the correction value for the fuel supply difference compensation and the detected air amount corrected by the correction value for the air amount detection difference compensation under the condition where the fuel supply means and the air amount detection means have no error and the air-fuel ratio detection means has an error.

Then, it is preferred that the fuel supply difference and air amount detection difference proportions are obtained on the basis of the six acquired particular component amounts.

According to this invention, when the fuel supply means has an error (for example, a drawing tolerance of the manufacturing of the fuel supply means), the air amount detection means has an error (for example, a drawing tolerance of the manufacturing of the air amount detection means) and the air-fuel ratio detection means has an error (for example, a drawing tolerance of the manufacturing of the air-fuel ratio detection means), the fuel supply difference and air amount detection difference proportions depending on the errors of the fuel supply means, the air amount detection means and the air-fuel ratio detection means, are used for the air-fuel ratio control.

Therefore, the air-fuel ratio control is performed considering the errors of the fuel supply means, the air amount detection means and the air-fuel ratio detection means and therefore, the effect obtained by the air-fuel ratio control becomes high.

Further another invention of this application relates to a control device of an internal combustion engine, comprising:
means for supplying a fuel to a combustion chamber;
means for giving to the fuel supply means, a command for supplying the fuel of a target amount to the combustion chamber by the fuel supply means;
means for estimating an amount of the fuel supplied from the fuel supply means to the combustion chamber on the basis of the command given from the fuel supply command means to the fuel supply means;
means for controlling an amount of an air supplied to the combustion chamber;
means for giving to the air supply amount control means, a command for supplying the air of a target amount to the combustion chamber by the air supply amount control means;
means for detecting the amount of the air supplied to the combustion chamber; means for estimating an air-fuel ratio of a mixture gas formed in the combustion chamber on the basis of the amount of the fuel estimated by the fuel supply amount estimation means and the amount of the air detected by the air amount detection means;
means for detecting the air-fuel ratio of the mixture gas formed in the combustion chamber; and
means for performing an air-fuel ratio control for making the air-fuel ratio of the mixture gas estimated by the air-fuel ratio estimation means and the air-fuel ratio of the mixture gas detected by the air-fuel ratio detection means correspond to each other, using the estimated fuel supply amount or the fuel supply command and the air supply command.

The device of this invention calculates on the basis of the difference of the estimated air-fuel ratio relative to the detected air-fuel ratio, a correction value for correcting the command given to the air supply amount control means to make the estimated and detected air-fuel ratios correspond to each other when the estimated and detected air-fuel ratios do not correspond to each other,
acquires as a fuel supply difference proportion, a rate of the air-fuel ratio difference due to the fuel supply difference of the fuel supply means occupying the air-fuel ratio difference and acquires as an air amount detection difference proportion, a rate of the air-fuel ratio difference due to the air amount detection difference of the air amount detection means occupying the air-fuel ratio difference,
calculates a correction value for correcting the estimated fuel supply amount or the fuel supply command and a correction value for correcting the fuel supply command by dividing the correction value for the air supply command correction, using the fuel supply difference and air amount detection difference proportions, and
performs the air-fuel ratio control using the estimated fuel supply amount or the fuel supply command corrected by the correction value for the fuel supply difference compensation and the air supply command corrected by the correction value for the air amount detection difference compensation.

In the device of this invention, in order to accomplish the above-mentioned object, the correction value for the air supply command correction is divided to the correction values for the fuel supply difference compensation and the air amount detection difference compensation such that the air-fuel ratio difference equivalent value equivalent to the air-fuel ratio difference calculated using the correction values for the fuel supply difference compensation and the air amount detection compensation, becomes equal to the air-fuel ratio difference.

According to this invention, the correction values for the fuel supply difference compensation and the air amount detection difference compensation are set on the basis of the difference of the estimated air-fuel ratio relative to the detected air-fuel ratio.

These correction values are set such that the air-fuel ratio difference equivalent value equivalent to the air-fuel ratio difference calculated from these correction values, becomes equal to the air-fuel ratio difference (i.e. a value as the base of the setting of these correction values).

When the air-fuel ratio difference equivalent value is equal to the air-fuel ratio difference, the air-fuel ratio control using these correction values is a control under the condition where the air-fuel ratio difference is distributed appropriately to the air-fuel ratio differences due to the fuel injection difference and the air amount detection difference.

Therefore, according to this invention, the effect obtained by the air-fuel ratio control becomes high.

The air-fuel ratio difference of the invention may be any values indicating the difference of the estimated air-fuel ratio relative to the detected air-fuel ratio and may be a difference calculated by subtracting 1 from the ratio of the estimated air-fuel ratio relative to the detected air-fuel ratio.

In this case, the correction value for the air supply command correction is calculated as a value for making the difference equivalent value zero.

The method for obtaining the fuel supply difference and air amount detection difference proportions is not limited to a particular method and the following method may be preferred.

That is, an amount of a particular component of the exhaust gas discharged from the combustion chamber is acquired as a first particular component amount when the air-fuel ratio control is performed using the estimated fuel supply amount or the fuel supply command corrected by the correction value for the fuel supply difference compensation and the air supply command not corrected by the correction value for the air amount detection difference compensation under the condition where the fuel supply means has an error and the air amount detection means has no error.

Further, an amount of the particular component of the exhaust gas discharged from the combustion chamber is acquired as a second particular component amount when the air-fuel ratio control is performed using the estimated fuel supply amount or the fuel supply command not corrected by the correction value for the fuel supply difference compensation and the air supply command corrected by the correction value for the air amount detection difference compensation under the condition where the fuel supply means has an error and the air amount detection means has no error.

Further, an amount of the particular component of the exhaust gas discharged from the combustion chamber is acquired as a third particular component amount when the air-fuel ratio control is performed using the estimated fuel supply amount or the fuel supply command corrected by the correction value for the fuel supply difference compensation and the air supply command not corrected by the correction value for the air amount detection difference compensation under the condition where the fuel supply means has no error and the air amount detection means has an error.

Further, an amount of the particular component of the exhaust gas discharged from the combustion chamber is acquired as a fourth particular component amount when the air-fuel ratio control performed using the estimated fuel supply amount or the fuel supply command not corrected by the correction value for the fuel supply difference compensation and the air supply command corrected by the correction value for the air amount detection difference compensation under the condition where the fuel supply means has no error and the air amount detection means has an error.

Then, it is preferred that the fuel supply difference and air amount detection difference proportions are obtained on the basis of the four acquired particular component amounts.

According to this invention, when the fuel supply means has an error (for example, a drawing tolerance of the manufacturing of the fuel supply means) and the air amount detection means has an error (for example, a drawing tolerance of the manufacturing of the air amount detection means), the fuel supply difference and air amount detection difference proportions depending on the errors of the fuel supply means and the air amount detection means, are used for the air-fuel ratio control.

Therefore, the air-fuel ratio control is performed considering the errors of the fuel supply means and the air amount detection means and therefore, the effect obtained by the air-fuel ratio control becomes high.

For example, it is preferred that the fuel supply difference and air amount detection difference proportions are obtained as follows.

That is, an amount of a particular component of the exhaust gas discharged from the combustion chamber is acquired as a first particular component amount when the air-fuel ratio control is performed using the estimated fuel supply amount or the fuel supply command corrected by the correction value for the fuel supply difference compensation and the air supply command not corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a second particular component amount when the air-fuel ratio control is performed using the estimated fuel supply amount or the fuel supply command not corrected by the correction value for the fuel supply difference compensation and the air supply command corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a third particular component amount when the air-fuel ratio control is performed using the estimated fuel supply amount or the fuel supply command corrected by the correction value for the fuel supply difference compensation and the air supply command not corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fourth particular component amount when the air-fuel ratio control is performed using the estimated fuel supply amount or the fuel supply command not corrected by the correction value for the fuel supply difference compensation and the air supply command corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fifth particular component amount when the air-fuel ratio control is performed using the estimated fuel supply amount or the fuel supply command corrected by the correction value for the fuel supply difference compensation and the air supply command not corrected by the correction value for the air amount detection difference compensation under the condition where the fuel supply means and the air amount detection means have no error and the air-fuel ratio detection means has an error.

Further, an amount of the particular component of the exhaust gas discharged from the combustion chamber is acquired as a sixth particular component amount when the air-fuel ratio control is performed using the estimated fuel supply amount or the fuel supply command not corrected by the correction value for the fuel supply difference compensation and the air supply command corrected by the correction value for the air amount detection difference compensation under the condition where the fuel supply means and the air amount detection means have no error and the air-fuel ratio detection means has an error.

Then, it is preferred that the fuel supply difference and air amount detection difference proportions are obtained on the basis of the six acquired particular component amounts.

According to this invention, when the fuel supply means has an error (for example, a drawing tolerance of the manufacturing of the fuel supply means), the air amount detection means has an error (for example, a drawing tolerance of the manufacturing of the air amount detection means) and the air-fuel ratio detection means has an error (for example, a drawing tolerance of the manufacturing of the air-fuel ratio detection means), the fuel supply difference and air amount detection difference proportions depending on the errors of the fuel supply means, the air amount detection means and the air-fuel ratio detection means, are used for the air-fuel ratio control.

Therefore, the air-fuel ratio control is performed considering the errors of the fuel supply means, the air amount detection means and the air-fuel ratio detection means and therefore, the effect obtained by the air-fuel ratio control becomes high.

Further another invention of this application relates to a control device of an internal combustion engine, comprising:

means for supplying a fuel to a combustion chamber;
means for giving to the fuel supply means, a command for supplying the fuel of a target amount to the combustion chamber by the fuel supply means;
means for estimating an amount of the fuel supplied to the combustion chamber from the fuel supply means on the basis of the command given to the fuel supply means from the fuel supply command means;
means for controlling an amount of an air supplied to the combustion chamber;
means for giving to the air supply amount control means, a command for supplying the air of a target amount to the combustion chamber by the air supply amount control means;
means for detecting the amount of the air supplied to the combustion chamber;

means for estimating an air-fuel ratio of a mixture gas formed in the combustion chamber on the basis of the amount of the fuel estimated by the fuel supply amount estimation means and the amount of the air detected by the air amount detection means; means for detecting the air-fuel ratio of the mixture gas formed in the combustion chamber; and means for performing an air-fuel ratio control for making the air-fuel ratios of the mixture gas estimated by the air-fuel ratio estimation means and detected by the air-fuel ratio detection means correspond to each other, using the estimated fuel supply amount or the fuel supply command, the detected air amount and the air supply command.

The device of this invention calculates on the basis of the difference of the estimated air-fuel ratio relative to the detected air-fuel ratio, a correction value for correcting the air amount detected by the air amount detection means and the command given to the air supply amount control means to make the estimated and detected air-fuel ratios correspond to each other when the estimated and detected air-fuel ratios do not correspond to each other, acquires as a fuel supply difference proportion, a rate of the air-fuel ratio difference due to the fuel supply difference of the fuel supply means occupying the air-fuel ratio difference and acquires as an air amount detection difference proportion, a rate of the air-fuel ratio difference due to the air amount detection difference of the air amount detection means occupying the air-fuel ratio difference, calculates a correction value for correcting the estimated fuel supply amount or the fuel supply command and a correction value for correcting the detected air amount and the air supply command by dividing the correction value for the detected air amount/air supply command correction, using these rates, and performs the air-fuel ratio control using the estimated fuel supply amount or the fuel supply command corrected by the correction value for the fuel supply difference compensation, the detected air amount corrected by the correction value for the air amount detection difference compensation and the air supply command corrected by the correction value for the air amount detection difference compensation.

In the device of this invention, in order to accomplish the above-mentioned object, the correction value for the detected air amount/air supply command correction is divided to the correction values for the fuel supply difference compensation and the air amount detection difference compensation such that the air-fuel ratio equivalent value equivalent to the air-fuel ratio difference calculated using the correction values for the fuel supply difference compensation and the air amount detection difference compensation, becomes equal to the air-fuel ratio difference.

According to this invention, the correction values for the fuel supply difference compensation and the air amount detection difference compensation are set on the basis of the difference of the estimated air-fuel ratio relative to the detected air-fuel ratio.

These correction values are set such that the air-fuel ratio difference equivalent value equivalent to the air-fuel ratio difference calculated from these correction values, becomes equal to the air-fuel ratio difference (i.e. a value as the base of the setting of these correction values).

When the air-fuel ratio difference equivalent value is equal to the air-fuel ratio difference, the air-fuel ratio control using these correction values is a control under the condition where the air-fuel ratio difference is distributed appropriately to the air-fuel ratio differences due to the fuel injection difference and the air amount detection difference.

Therefore, according to this invention, the effect obtained by the air-fuel ratio control becomes high.

The air-fuel ratio difference of the invention may be any values indicating the difference of the estimated air-fuel ratio relative to the detected air-fuel ratio and may be a difference equivalent value calculated by subtracting 1 from the ratio of the estimated air-fuel ratio relative to the detected air-fuel ratio.

In this case, the correction value for the detected air amount/air supply command correction is calculated as a value for making the difference equivalent value zero.

The method for obtaining the fuel supply difference and air amount detection difference proportions is not limited to a particular method and the following method may be preferred.

That is, an amount of a particular component of the exhaust gas discharged from the combustion chamber is acquired as a first particular component amount when the air-fuel ratio control is performed using the estimated fuel supply amount or the fuel supply command corrected by the correction value for the fuel supply difference compensation, the detected air amount not corrected by the correction value for the air amount detection difference compensation and the air supply command not corrected by the air amount detection difference compensation under the condition where the fuel supply means has an error and the air amount detection means has no error.

Further, an amount of the particular component of the exhaust gas discharged from the combustion chamber is acquired as a second particular component amount when the air-fuel ratio control is performed using the estimated fuel supply amount or the fuel supply command not corrected by the correction value for the fuel supply difference compensation, the detected air amount corrected by the correction value for the air amount detection difference compensation and the air supply command corrected by the correction value for the air amount detection difference compensation under the condition where the fuel supply means has an error and the air amount detection means has no error.

Further, an amount of the particular component of the exhaust gas discharged from the combustion chamber is acquired as a third particular component amount when the air-fuel ratio control is performed using the estimated fuel supply amount or the fuel supply command corrected by the correction value for the fuel supply difference compensation, the detected air amount not corrected by the correction value for the air amount detection difference compensation and the air supply command not corrected by the correction value for the air amount detection difference compensation under the condition where the fuel supply means has no error and the air amount detection means has an error.

Further, an amount of the particular component of the exhaust gas discharged from the combustion chamber is acquired as a fourth particular component amount when the air-fuel ratio control is performed using the estimated fuel supply amount or the fuel supply command not corrected by the correction value for the fuel supply difference compensation, the detected air amount corrected by the correction value for the air amount detection difference compensation and the air supply command corrected by the correction value for the air amount detection difference compensation under the condition where the fuel supply means has no error and the air amount detection means has an error.

Then, it is preferred that the fuel supply difference and air amount detection difference proportions are obtained on the basis of the four acquired particular component amounts.

According to this invention, when the fuel supply means has an error (for example, a drawing tolerance of the manufacturing of the fuel supply means) and the air amount detection means has an error (for example, a drawing tolerance of the manufacturing of the air amount detection means), the fuel supply difference and air amount detection difference proportions depending on the errors of the fuel supply means and the air amount detection means, are used for the air-fuel ratio control.

Therefore, the air-fuel ratio control is performed considering the errors of the fuel supply means and the air amount detection means and therefore, the effect obtained by the air-fuel ratio control becomes high.

For example, it is preferred that the fuel supply difference and air amount detection difference proportions are obtained as follows.

That is, an amount of a particular component of the exhaust gas discharged from the combustion chamber is acquired as a first particular component amount when the air-fuel ratio control is performed using the estimated fuel supply amount or the fuel supply command corrected by the correction value for the fuel supply difference compensation, the detected air amount not corrected by the correction value for the air amount detection difference compensation and the air supply command not corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a second particular component amount when the air-fuel ratio control is performed using the estimated fuel supply amount or the fuel supply command not corrected by the correction value for the fuel supply difference compensation, the detected air amount corrected by the correction value for the air amount detection difference compensation and the air supply command corrected by the correction value for the air amount detection difference compensation under the condition where the fuel supply means has an error and the air amount detection means and the air-fuel ratio detection means have no error.

Further, an amount of the particular component of the exhaust gas discharged from the combustion chamber is acquired as a third particular component amount when the air-fuel ratio control is performed using the estimated fuel supply amount or the fuel supply command corrected by the correction value for the fuel supply difference compensation, the detected air amount not corrected by the correction value for the air amount detection difference compensation and the air supply command not corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fourth particular component amount when the air-fuel ratio control is performed using the estimated fuel supply amount or the fuel supply command not corrected by the correction value for the fuel supply difference compensation, the detected air amount corrected by the correction value for the air amount detection difference compensation and the air supply command corrected by the correction value for the air amount detection difference compensation under the condition where the fuel supply means and the air-fuel ratio detection means have no error and the air amount detection means has an error.

Further, an amount of the particular component of the exhaust gas discharged from the combustion chamber is acquired as a fifth particular component amount when the air-fuel ratio control is performed using the estimated fuel supply amount or the fuel supply command corrected by the correction value for the fuel supply difference compensation, the detected air amount not corrected by the correction value for the air amount detection difference compensation and the air supply command not corrected by the correction value for the air amount detection difference compensation under the condition where the fuel supply means and the air amount detection means have no error and the air-fuel ratio detection means has an error.

Further, an amount of the particular component of the exhaust gas discharged from the combustion chamber is acquired as a sixth particular component amount when the air-fuel ratio control is performed using the estimated fuel supply amount or the fuel supply command not corrected by the correction value for the fuel supply difference compensation, the detected air amount corrected by the correction value for the air amount detection difference compensation and the air supply command corrected by the correction value for the air amount detection difference compensation under the condition where the fuel supply means and the air amount detection means have no error and the air-fuel ratio detection means has an error.

Then, it is preferred that the fuel supply difference and air amount detection difference proportions are obtained on the basis of the six acquired particular component amount.

According to this invention, when the fuel supply means has an error (for example, a drawing tolerance of the manufacturing of the fuel supply means), the air amount detection means has an error (for example, a drawing tolerance of the manufacturing of the air amount detection means) and the air-fuel ratio detection means has an error (for example, a drawing tolerance of the manufacturing of the air-fuel ratio detection means), the fuel supply difference and air amount detection difference proportions depending on the errors of the fuel supply means, the air amount detection means and the air-fuel ratio detection means, are used for the air-fuel ratio control.

Therefore, the air-fuel ratio control is performed considering the errors of the fuel supply means, the air amount detection means and the air-fuel ratio detection means therefore, the effect obtained by the air-fuel ratio control becomes high.

When the device of the invention further comprises an exhaust gas recirculation means for introducing into an intake passage, an exhaust gas discharged from the combustion chamber to an exhaust passage, a target amount of the exhaust gas introduced into the intake passage by the exhaust gas recirculation means may be determined on the basis of the estimated fuel supply amount and the estimated fuel supply amount corrected by the correction value for the fuel supply difference compensation may be used for the determination of the target amount.

When the device of the invention further comprises means for estimating an actual amount of the exhaust gas introduced actually into the intake passage by the exhaust gas recirculation means, using the detected air amount, the detected air amount corrected by the correction value for the air amount detection difference compensation may be used for the estimation of the actual recirculated exhaust gas amount by the actual recirculated exhaust gas amount estimation means.

In the invention, the amount of the exhaust gas introduced into the intake passage by the exhaust gas recirculation means may be controlled such that the actual amount estimated by the actual recirculated exhaust gas amount estimation means corresponds to the target amount.

When the device of the invention further comprises means for detecting an amount of a particular component of the exhaust gas discharged from the combustion chamber, the fuel supply difference and air amount detection difference proportions may be employed as follows.

That is, a base of the fuel supply difference proportion is set as a base fuel supply difference proportion, the air amount detection difference proportion corresponding to this base rate is set as a base air amount detection difference proportion and an amount of the particular component of the exhaust gas discharged from the combustion chamber is acquired as a base particular component amount by the particular component amount detection means when the air-fuel ratio control is performed using these base rates.

A rate larger than the base fuel supply difference proportion is set as a first comparison fuel supply difference proportion, the air amount detection difference proportion corresponding to this first rate is set as a first comparison air amount detection difference proportion, and an amount of the particular component of the exhaust gas discharged from the combustion chamber is acquired as a first comparison particular component amount by the particular component amount detection means when the air-fuel ratio control is performed using these first rates.

Further, a rate smaller than the base fuel supply difference proportion is set as a second comparison fuel supply difference proportion, the air-fuel ratio detection difference proportion corresponding to this second rate is set as a second comparison air amount detection difference proportion, and an amount of the particular component of the exhaust gas discharged from the combustion chamber is acquired as a second comparison particular component amount by the particular component amount detection means when the air-fuel ratio control is performed using these second rates.

When the base particular component amount is the smallest among the acquired particular component amounts, the base fuel supply difference and base air amount detection difference proportions are employed as the fuel supply difference and air amount detection difference proportions, respectively.

On the other hand, a first process is performed when the first comparison particular component amount is the smallest among the acquired particular component amounts, the process comprising:

setting the first comparison fuel supply difference and first comparison air amount detection difference proportions as new base fuel supply difference and base air amount detection difference proportions, respectively, acquiring an amount of the particular component of the exhaust gas discharged from the combustion chamber as a base particular component amount by the particular component amount detection means when the air-fuel ratio control is performed using these new rates, setting a rate larger than the new base fuel supply difference proportion as a new first comparison fuel supply difference proportion, setting the air amount detection difference proportion corresponding to this first rate as a new first comparison air amount detection difference proportion, acquiring an amount of the particular component of the exhaust gas discharged from the combustion chamber as a first comparison particular component amount by the particular component amount detection means when the air-fuel ratio control is performed using these new first rates, setting a rate smaller than the new base fuel supply difference proportion as a new second comparison fuel supply difference proportion, setting the air amount detection difference proportion corresponding to this second rate as a new second comparison air amount detection difference proportion, and acquiring an amount of the particular component of the exhaust gas discharged from the combustion chamber as a second comparison particular component amount by the particular component amount detection means when the air-fuel ratio control is performed using these new second rates.

On the other hand, a second process is performed when the second comparison particular component amount is the smallest among the acquired particular component amounts, the second process comprising:

setting the second comparison fuel supply difference and second comparison air amount detection difference proportions as new base fuel supply difference and base air amount detection difference proportions, respectively, acquiring as a base particular component amount by the particular component amount detection means, an amount of the particular component of the exhaust gas discharged from the combustion chamber when the air-fuel ratio control is performed using these new base rates, setting a rate larger than the new base fuel supply difference proportion as a new first comparison fuel supply difference proportion, setting the air amount detection difference proportion corresponding to this first comparison fuel supply difference proportion as a new first comparison air amount detection difference proportion, acquiring as a first comparison particular component amount by the particular component amount detection means, an amount of the particular component of the exhaust gas discharged from the combustion chamber when the air-fuel ratio control is performed using these new first rates, setting a rate smaller than the new base fuel supply difference proportion as a second comparison fuel supply difference proportion, setting the air amount detection difference proportion corresponding to this second comparison fuel difference proportion as a new second comparison air amount detection difference proportion, and acquiring as a second comparison particular component amount by the particular component amount detection means, an amount of the particular component of the exhaust gas discharged from the combustion chamber when the air-fuel ratio control is performed using these new second comparison rates.

The first process is performed when the first comparison particular component amount is the smallest among the particular component amounts acquired by the first and second processes, the second process is performed when the second comparison particular component amount is the smallest among the particular component amounts acquired by the first and second processes, and the base fuel supply difference and base air amount detection difference proportions used in the first and second processes are employed as the fuel supply difference and air amount detection difference proportions, respectively when the base particular component amount is the smallest among the particular component amounts acquired by the first and second processes.

When the fuel supply difference occurs in the fuel supply means due to the deterioration thereof or the difference changes, or when the air amount detection difference occurs in the air amount detection means due to the deterioration thereof or the difference changes, or when the air-fuel ratio detection difference occurs in the air-fuel ratio detection means due to the deterioration thereof or the difference changes, the suitable fuel supply difference and air amount detection difference proportions also change.

According to this invention, even when such differences occur or change, during the engine operation, the suitable fuel supply difference and air amount detection difference proportions are employed and the effect obtained by the air-fuel ratio control becomes high.

In the invention, a range allowable as the correction value for the fuel supply difference compensation may be previously set as a fuel supply difference allowable range and when the correction value for the fuel supply difference compensation is not within the range, it may be judged that a malfunction occurs in the fuel supply means.

According to this invention, even when the fuel supply difference occurs in the fuel supply means due to the deterioration thereof or the difference changes or even when the air amount detection difference occurs in the air amount detection means due to the deterioration thereof or the difference changes or even when the air-fuel ratio detection difference occurs in the air-fuel ratio detection means due to the deterioration thereof or the difference changes, the malfunction diagnosis of the fuel supply means is performed using the correction value for the fuel supply difference compensation calculated on the basis of the suitable fuel supply difference proportion.

Therefore, according to this invention, the malfunction of the fuel supply means is exactly diagnosed.

In the invention, a range allowable as the correction value for the air amount detection difference compensation may be previously set as an air amount detection difference allowable range and when the correction value for the air amount detection difference compensation is not within the range, it may be judged that the malfunction occurs in the air amount detection means.

According to this invention, even when the fuel supply difference occurs in the fuel supply means due to the deterioration thereof or the difference changes, or even when the air amount detection difference occurs in the air amount detection means due to the deterioration thereof or the difference changes, or even when the air-fuel ratio detection difference occurs in the air-fuel ratio detection means due to the deterioration thereof or the difference changes, the malfunction diagnosis of the air amount detection means is performed using the correction value for the air amount detection difference compensation calculated on the basis of the suitable air amount detection difference proportion.

Therefore, according to this invention, the malfunction of the air amount detection means is exactly diagnosed.

MODE FOR CARRYING OUT THE INVENTION

Figure 1:
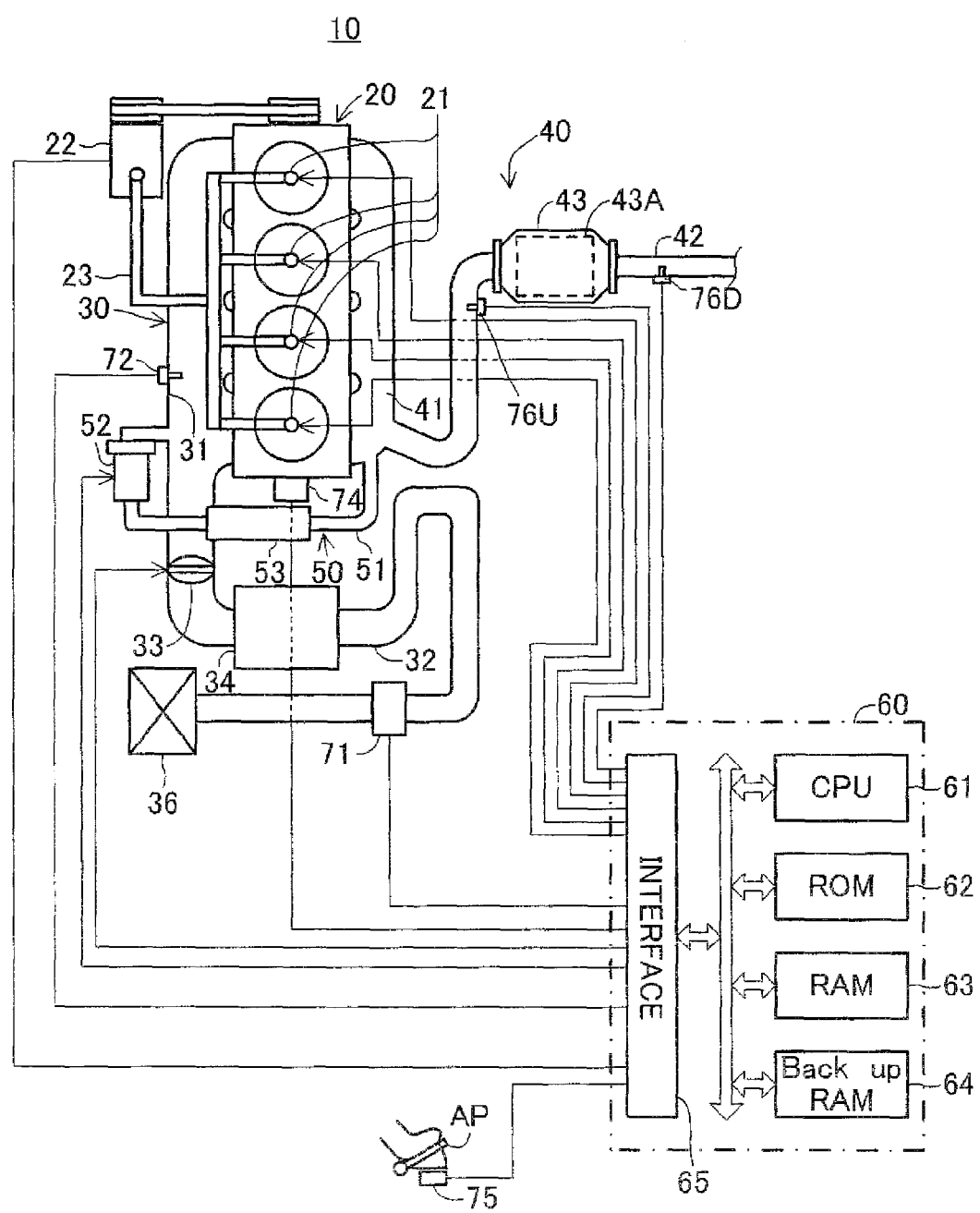
FIG. 1 is a general view showing an internal combustion engine which a control device of this invention applies.

Below, an embodiment of a control device of an internal combustion engine of the invention will be explained referring to the drawings. An internal combustion chamber which a control device of this invention applies is shown in FIG. 1.

The engine 10 shown in FIG. 1 comprises a body 20 of the engine (hereinafter, this body will be referred to as—engine body—), fuel injectors 21 arranged corresponding to four combustion chambers of the engine body, respectively, and a fuel pump 22 for supplying a fuel to the fuel injectors 21 via a fuel supply pipe 23.

The engine 10 further comprises an intake system 30 for supplying an air from the outside to the combustion chambers and an exhaust system 40 for discharging to the outside an exhaust gas discharged from the combustion chamber.

The engine 10 is a compression self-ignition internal combustion engine (so-called diesel engine).

It should be noted that the fuel injector 21 supplies the fuel to the combustion chamber by injecting the fuel into the combustion chamber. Therefore, it can be said that the fuel injector 21 is means for supplying the fuel to the combustion chamber.

The intake system 30 has intake branch pipes 31 and an intake pipe 32. In the following explanation, the intake system 30 will be also referred to as—intake passage—.

One of ends (i.e. branch portion) of the intake branch pipe 31 is connected to an intake port (now shown) formed in the engine body 20 corresponding to each combustion chamber. On the other hand, the other end of the intake branch pipe 31 is connected to the intake pipe 32.

A throttle valve 33 for controlling an amount of the air flowing in the intake pipe is arranged in the intake pipe 32.

Further, an intercooler 34 for cooling the air flowing in the intake pipe is arranged in the intake pipe 32.

Further, an air cleaner 36 is arranged in an end of the intake pipe 32 which opens to the outside.

The throttle valve 33 can control the amount of the air sucked into the combustion chamber by the operation condition thereof (concretely, the opening degree thereof and hereinafter, this opening degree will be referred to as—throttle valve opening degree—) being controlled. That is, the throttle valve 33 can control the amount of the air supplied to the combustion chamber.

Therefore, it can be said that the throttle valve 33 is means for controlling the amount of the air supplied to the combustion chamber.

On the other hand, the exhaust system 40 has exhaust branch pipes 41 and an exhaust pipe 42. In the following explanation, the exhaust system 40 will be also referred to as—exhaust passage—.

One of ends (i.e. branch portions) of the exhaust branch pipe 41 is connected to an exhaust port (not shown) formed in the engine body 20 corresponding to each combustion chamber. On the other hand, the other end of the exhaust branch pipe 41 is connected to the exhaust pipe 42.

A catalyst converter 43 incorporating an exhaust purification catalyst 43A for purifying a specific component(s) in the exhaust gas is arranged in the exhaust pipe 42.

An oxygen concentration sensor 76U for outputing a signal corresponding to the oxygen concentration in the exhaust gas discharged from the combustion chamber is mounted on the exhaust pipe 42 upstream of the exhaust purification catalyst 43A (hereinafter, this oxygen concentration sensor will be referred to as—upstream oxygen concentration sensor—).

On the other hand, an oxygen concentration sensor 76D for outputting a signal corresponding to the oxygen concentration in the exhaust gas flowing out of the exhaust purification catalyst 43A is mounted on the exhaust pipe 42 downstream of the exhaust purification catalyst 43A (hereinafter, this oxygen concentration sensor will be referred to as—downstream oxygen concentration sensor—).

An air flow meter 71 for outputting a signal corresponding to the flow rate of the air flowing in the intake pipe (therefore, the flow rate of the air sucked into the combustion chamber and hereinafter, this flow rate will be referred to as—fresh air amount—) is mounted on the intake pipe 32 downstream of the air cleaner 36.

A pressure sensor 72 for outputting a signal corresponding to the pressure of the gas in the intake branch pipe (i.e. the intake pressure) is mounted on the intake branch pipe 31 (hereinafter, this sensor will be referred to as—intake pressure sensor—).

A crank position sensor 74 for outputting a signal corresponding to the rotation phase of the crank shaft is mounted on the engine body 20.

The engine 10 further comprises an exhaust recirculation device (hereinafter, this device will be referred to as—EGR device—) 50. The EGR device 50 has an exhaust recirculation pipe (hereinafter, this pipe will be referred to as—EGR passage—) 51.

One end of the EGR passage 51 is connected to the exhaust branch pipe 41. On the other hand, the other end of the EGR passage 51 is connected to the intake branch pipe 31. That is, the other end of the EGR passage 51 is connected to the portion of the intake passage downstream of the throttle valve 33.

An exhaust recirculation control valve (hereinafter, this valve will be referred to as—EGR control valve—) 52 for controlling the flow rate of the exhaust gas flowing in the EGR passage is arranged in the EGR passage 51.

In the engine 10, as the opening degree of the EGR control valve 52 (hereinafter, this opening degree will be referred to as—EGR control valve opening degree—) is large, the flow rate of the exhaust gas flowing in the EGR passage 51 is large.

An exhaust recirculation cooler 53 for cooling the exhaust gas flowing in the EGR passage is arranged on the EGR passage 51.

The EGR device 50 can control the amount of the exhaust gas introduced into the intake passage 30 via the EGR passage 51 (hereinafter, this exhaust gas will be referred to as—EGR gas—) by the operation condition of the EGR control valve 52 (concretely, the opening degree of the EGR control valve 52 and hereinafter, this opening degree will be referred to as—EGR control valve opening degree—) being controlled.

The engine 10 further comprises electronic control unit 60. The electronic control unit 60 has a microprocessor (CPU) 61, a read only memory (ROM) 62, a random access memory (RAM) 63, a back-up RAM 64, and an interface 65.

The fuel injectors 21, the fuel pump 22, the throttle valve 33, and the EGR control valve 52 are connected to the interface 65 and the control signals for controlling the operation thereof are given from the electronic control unit 60 via the interface 65.

Also, the air flow meter 71, the intake pressure sensor 72, the crank position sensor 74, an accelerator pedal opening degree sensor 75 for outputting a signal corresponding to the opening degree of the accelerator pedal AP (i.e. the depression amount of the accelerator pedal AP and hereinafter, this opening degree will be referred to as—accelerator pedal opening degree—), and the upstream and downstream oxygen concentration sensors 76U and 76D are connected to the interface 65, and the signals output from the air flow meter 71, the intake pressure sensor 72, the crank position sensor 74, the accelerator pedal opening degree sensor 75, and the upstream and downstream oxygen concentration sensors 76U and 76D are input to the interface 65.

The fresh air amount is calculated by the electronic control unit 60 on the basis of the signal output from the air flow meter 71 (hereinafter, this fresh air amount will be referred to as—detected fresh air amount—), the intake pressure is calculated by the electronic control unit 60 on the basis of the signal output from the intake pressure sensor 72, the engine speed (i.e. speed of the engine 10) is calculated by the electronic control unit 60 on the basis of the signal output from the crank position sensor 74, the accelerator pedal opening degree is calculated by the electronic control unit 60 on the basis of the signal output from the accelerator pedal opening degree sensor 75, the air-fuel ratio of the exhaust gas discharged from the combustion chamber is calculated by the electronic control unit 60 on the basis of the signal output from the upstream oxygen concentration sensor 76U, and the air-fuel ratio of the exhaust gas flowing out of the exhaust purification catalyst 43A is calculated by the electronic control unit 60 on the basis of the signal output from the downstream oxygen concentration sensor 76D.

Therefore, it can be said that the air flow meter 71 functions as means for detecting the fresh air amount, the intake pressure sensor 72 functions as means for detecting the intake pressure, the crank position sensor 74 functions as means for detecting the engine speed, the accelerator pedal opening degree sensor 75 functions as means for detecting the accelerator pedal opening degree, the upstream oxygen concentration sensor 76U functions as means for detecting the oxygen concentration in the exhaust gas discharged from the combustion chamber, and the downstream oxygen concentration sensor 76D functions as means for detecting the oxygen concentration in the exhaust gas flowing out of the exhaust purification catalyst 43A.

Further, as the intake pressure is high, the amount of the gas sucked into the combustion chamber is large and as the intake pressure is low, the amount of the gas sucked into the combustion chamber is small.

Then, the intake pressure sensor 72 functions as means for detecting the intake pressure and therefore, the amount of the gas sucked into the combustion chamber can be grasped on the basis of the intake pressure detected by the sensor 72.

Therefore, it can be said that the intake pressure sensor 71 functions as means for detecting the amount of the gas sucked into the combustion chamber.

Further, as the air-fuel ratio of the mixture gas is large, the oxygen concentration in the burned gas produced by the combustion of the mixture gas formed in the combustion chamber is high and as the air-fuel ratio of the mixture gas is small, the oxygen concentration is low.

Further, in the case that the oxygen concentration in the burned gas produced by the combustion chamber when the mixture gas having the stoichiometric air-fuel ratio burns in the combustion chamber is referred to as base oxygen concentration, the oxygen concentration in the burned gas produced by the combustion of the mixture formed in the combustion chamber is larger than the base oxygen concentration when the air-fuel ratio of the mixture is larger than the stoichiometric air-fuel ratio while the oxygen concentration is smaller than the base oxygen concentration when the air-fuel ratio of the mixture is smaller than the stoichiometric air-fuel ratio.

Then, the upstream oxygen concentration sensor 76U functions as means for detecting the oxygen concentration in the exhaust gas discharged from the combustion chamber and therefore, the air-fuel ratio of the mixture gas can be grasped on the basis of the oxygen concentration detected by this sensor 76U.

Therefore, it can be said that the sensor 76U functions as means for detecting the air-fuel ratio of the mixture gas.

Next, an embodiment of the invention relating to the control of the fuel injector will be explained.

Figure 2:
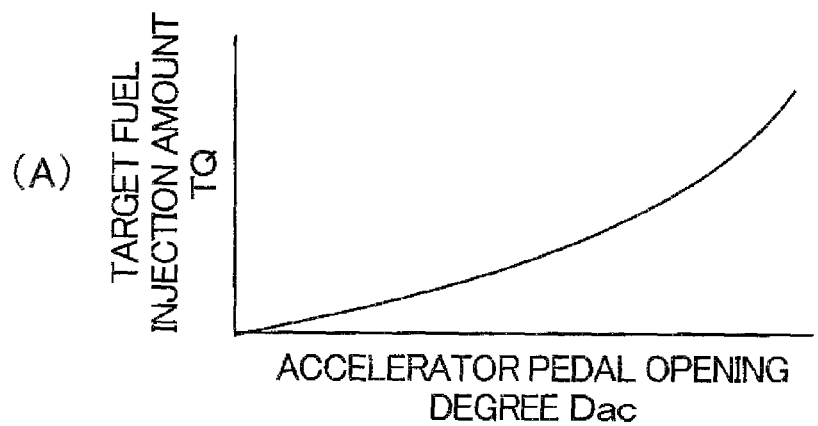
FIG. 2(A) is a view showing a map used for acquiring a target fuel injection amount TQ on the basis of an accelerator pedal opening degree Dac in one embodiment of this invention.
FIG. 2(B) is a view showing a map used for acquiring a target throttle valve opening degree TDth on the basis of a fuel injection amount Q and an engine speed N in one embodiment of this invention and FIG. 2(C) is a view showing a map used for acquiring a target EGR rate TRegr on the basis of the fuel injection amount Q and the engine speed N in one embodiment of this invention.
Figure 2:
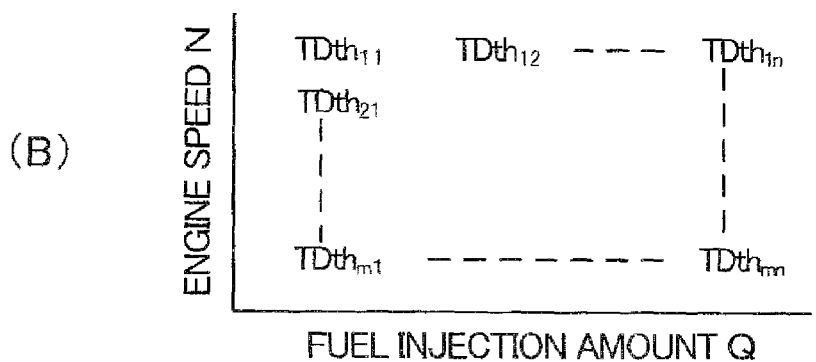
Figure 2:
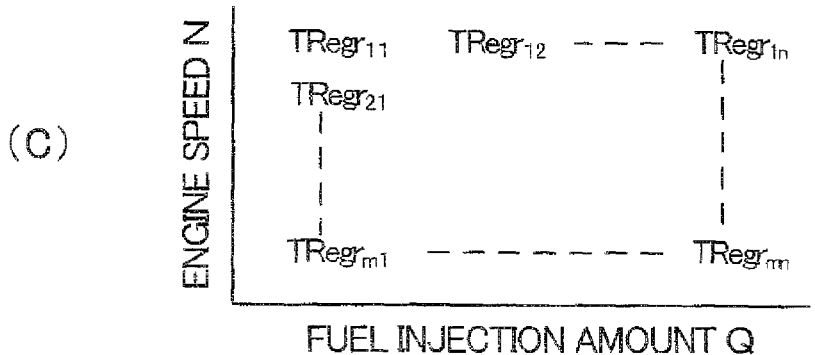

In one embodiment of the invention, a suitable fuel injection amount (i.e. the amount of the fuel injected from the fuel injector) depending on each accelerator pedal opening degree in the engine shown in the FIG. 1 is previously obtained by an experiment, etc, and the obtained fuel injection amounts are memorized as target fuel injection amounts TQ in the electronic control unit 60 in the form of a map as a function of the accelerator pedal opening degree Dac as shown in FIG. 2(A).

Then, during the engine operation (i.e. during the operation of the engine), a target fuel injection amount TQ is acquired from the map shown in FIG. 2(A) on the basis of the accelerator pedal opening degree Dac.

Then, a fuel injector opening period (i.e. the period to open the fuel injector to inject the fuel from the fuel injector) necessary to inject the fuel having this acquired target fuel injection amount TQ from the fuel injector is calculated on the basis of this target fuel injection amount TQ.

Then, the opening period of the fuel injector is controlled at each intake stroke so as to open the fuel injector for this calculated fuel injector opening period.

In the map shown in FIG. 2(A), as the accelerator pedal opening degree Dac is large, the target fuel injection amount TQ is large.

Next, an embodiment of the invention relating to the control of the throttle valve will be explained.

In one embodiment of the invention, a suitable throttle valve opening degree (i.e. the opening degree of the throttle valve) depending on each combination of the fuel injection amount and the engine speed (i.e. the speed of the engine) in the engine shown in FIG. 1 is previously obtained by an experiment, etc, and the obtained throttle valve opening degrees are memorized as target throttle valve opening degree TDth in the electronic control unit 60 as a form of the map as a function of the fuel injection amount Q and the engine speed N as shown in FIG. 2(B).

Then, during the engine operation, a target throttle valve opening degree TDth is acquired from the map shown in FIG. 2(B) on the basis of the fuel injection amount Q and the engine speed N.

Then, the throttle valve opening degree is controlled to open the throttle valve for this acquired target throttle valve opening degree TDth.

In the map shown in FIG. 2(B), as the fuel injection amount Q is large, the throttle valve opening degree TDth is large, and as the engine speed N is large, the target throttle valve opening degree TDth is large.

Further, in this embodiment, the target fuel injection amount TQ (i.e. the target fuel injection amount TQ acquired from the map shown in FIG. 2(A)) is employed as the fuel injection amount Q used for acquiring the target throttle valve opening degree TDth from the map shown in FIG. 2(B).

Next, an embodiment of the invention relating to the control of the EGR control valve will be explained.

In one embodiment of the invention, a suitable EGR rate (i.e. a ratio of the mass of the exhaust gas included in the gas sucked into the combustion chamber) depending on each combination of the fuel injection amount and the engine speed is previously obtained by an experiment, etc, and the obtained EGR rates are memorized as target EGR rates TRegr in the electronic control unit 60 in the form of a map as a function of the fuel injection amount Q and the engine speed N as shown in FIG. 2(C).

Then, during the engine operation, a target EGR rate TRegr is acquired from the map shown in FIG. 2(C) on the basis of the fuel injection amount Q and the engine speed N.

In the map shown in FIG. 2(C), as the fuel injection amount Q is large, the target EGR rate TRegr is small and as the engine speed is large, the target EGR rate TRegr is small.

On the other hand, during the engine operation, an estimated value of the actual EGR rate RegrE is calculated according to the following formula 1 (hereinafter, this estimated value will be referred to as—estimated EGR rate—).

In the formula 1, "Gc" is an in-cylinder intake gas amount (i.e. an amount of the gas sucked into the combustion chamber (i.e. the mixed gas of the air and the EGR gas)), "Ga" is the detected fresh air amount and "KGa" is a correction value for the detected fresh air amount correction.

$$RegrE=(Gc-Ga\times Kga)/Gc \qquad (1)$$

Then, an EGR rate difference (i.e. a difference of the actual EGR rate relative to the target EGR rate) is calculated according to the following formula 2.

In the formula 2, "TRegr" is the target EGR rate acquired from the map shown in FIG. 2(C) and "RegrE" is the estimated EGR rate calculated according to the formula 1.

$$\Delta Regr=TRegr-RegrE \qquad (2)$$

Then, the EGR control valve opening degree (i.e. the opening degree of the EGR control valve) is controlled by the feedback control such that the EGR rate difference ΔRegr calculated according to the formula 2 becomes zero.

Next, an embodiment of the invention relating to the calculation of the in-cylinder intake gas amount will be explained. In one embodiment of the invention, the in-cylinder intake gas amount Gc is calculated according to the following formula 3.

In the formula 3, "Pim" is the intake pressure, "N" is the engine speed and "F" is a function for calculating the in-cylinder intake gas amount on the basis of the intake pressure and the engine speed.

$$Gc=F(Pim,N) \qquad (3)$$

Next, an embodiment of the invention relating to the calculation of the fuel injection amount Q used for acquiring the target EGR rate TRegr from the map shown in FIG. 2(C) will be explained (hereinafter, this fuel injection amount will be referred to as—fuel injection amount for the target EGR rate acquisition—).

In one embodiment of the invention, the fuel injection amount Q for the target EGR rate acquisition is calculated according to the following formula 4.

In the formula 4, "TQ" is the target fuel injection amount acquired from the map shown in FIG. 2(A) and "Kq" is a correction value for the target fuel injection amount correction.

$$Q=TQ\times KQ \qquad (4)$$

Next, an embodiment of the invention relating to the calculation of the fresh air amount Ga used for calculating the estimated EGR rate RegrE according to the formula 1 will be explained (hereinafter, this fresh air amount will be explained as to—fresh air amount for the estimated EGR rate calculation—).

In one embodiment of the invention, the fresh air amount Ga for the estimated EGR rate calculation is calculated according to the following formula 5.

In the formula 5, "Gad" is the detected fresh air amount and "Kga" is a correction value for the detected fresh air amount correction.

$$Ga=Gad\times Kga \qquad (5)$$

Next, an embodiment of the invention relating to the calculation of the correction value for the target fuel injection amount correction used in the formula 4 will be explained.

In one embodiment of the invention, the correction value Kq for the target fuel injection amount correction is calculated according to the following formula 6.

In the formula 6, "Kb" is a base correction value which will be explained later in detail and "Kd" is a coefficient for distributing the base correction value into the correction values for the target fuel injection amount correction and the detected fresh air amount correction (hereinafter, this coefficient will be referred to as—distribution coefficient—).

$$Kq=KbKd \qquad (6)$$

Next, an embodiment of the invention relating to the calculation of the correction value for the detected fresh air amount correction used in the formula 5 will be explained.

In one embodiment of the invention, the correction value Kga for the detected fresh air amount correction is calculated according to the following formula 7.

In the formula 7, "Kb" is the base correction value which will be explained later in detail and "Kd" is the distribution coefficient.

$$Kga=Kb-(1-Kd) \qquad (7)$$

Next, an embodiment of the invention relating to the calculation of the base correction value Kb will be explained. In one embodiment of the invention, an estimated air-fuel ratio AFe is calculated according to the following formula 8.

In the formula 8, "Ga" is the detected fresh air amount, "TQ" is the target fuel injection amount acquired from the map shown in FIG. 2(A), "Kq" is the correction value for the target fuel injection amount correction calculated according to the formula 6 and "Kga" is the correction value for detected fresh air amount correction calculated according to the formula 7.

$$AFe=(Ga\times Kga)/(TQ\times Kq) \qquad (8)$$

Then, an air-fuel ratio difference rate Raf is calculated according to the following formula 9. In the formula 9, "AFe" is the estimated air-fuel ratio calculated according to the formula 8 and "AFd" is the detected air-fuel ratio.

$$Raf=AFe/AFd \qquad (9)$$

Then, a correction value for correcting the fuel injection amount for the target EGR rate acquisition (hereinafter, this correction value will be referred to as—instant correction value—) is calculated such that the air-fuel ratio difference rate Raf calculated according to the formula 9 becomes "1" (i.e. the estimated air-fuel ratio corresponds to the detected air-fuel ratio).

Then, the base correction value Kb is calculated according to the following formula 10. In the formula 10, "Kpi" is the instant correction value and "Kmap" is a learned correction value. The learned correction value will be explained later in detail.

$$Kb=Kpi+Kmap+1 \qquad (10)$$

Next, an embodiment of the invention relating to the learned correction value will be explained.

Figure 3:
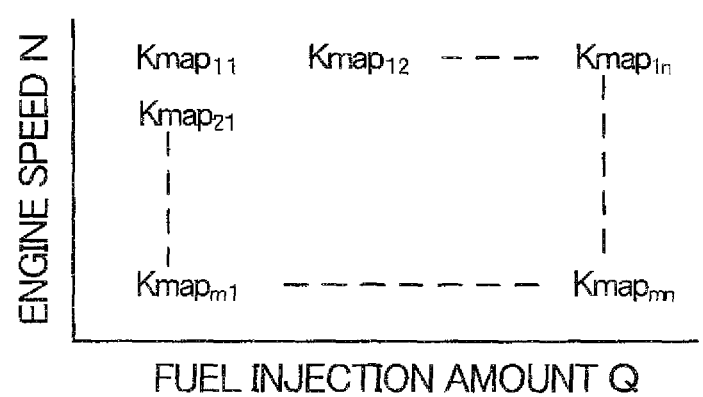
FIG. 3 is a view showing a map used for acquiring a learned value KG on the basis of the fuel injection amount Q and the engine speed N in one embodiment of this invention.

In one embodiment of the invention, as shown in FIG. 3, the learned correction value Kmap is memorized in the electronic control unit 60 in the form of a map as a function of the fuel injection amount Q and the engine speed N.

Then, the learned correction value Kmap corresponding to the fuel injection amount Q and the engine speed N is acquired from the map shown in FIG. 3.

Then, this acquired learned correction value is used as the learned correction value Kmap of the formula 10.

Further, the learned correction value is continually updated. That is, as explained above, in this embodiment, as shown in FIG. 3, the learned correction value Kmap is memorized in the electronic control unit 60 in the form of the map as a function of the fuel injection amount Q and the engine speed N.

In this regard, the initial value of the learned correction value Kmap is set as "0".

Then, during the engine operation, when the instant correction value Kpi is calculated, the new learned correction value Kmap obtained by adding this calculated instant correction value to the learned correction value Kmap of the map shown in FIG. 3 corresponding to the current fuel injection amount Q (the current target fuel injection amount TQ is used as this fuel injection amount Q) and the current engine speed N is memorized in the map shown in FIG. 3 as the learned correction value corresponding to the current fuel injection amount Q and the current engine speed N.

That is, during the engine operation, every the instant correction value Kpi is calculated, the learned correction value Kmap of the map shown in FIG. 3 corresponding to the current fuel injection amount Q and the current engine speed N is updated by the instant correction value Kpi.

By controlling the EGR control valve as explained above, the estimated EGR rate can be controlled to the target EGR rate while the estimated air-fuel ratio can correspond to the detected air-fuel ratio. Next, this will be explained in detail.

As explained above, as far as the estimated EGR rate does not correspond to the target EGR rate, the EGR control valve opening degree is controlled such that the difference of the estimated EGR rate relative to the target EGR rate becomes zero.

Therefore, even if the fuel injection amount used for acquiring the target EGR rate from the map shown in FIG. 2(C) is corrected in any fashion by the correction value for the target fuel injection amount correction or even if the detected fresh air amount used for calculating the estimated EGR rate is corrected in any fashion by the correction value for the detected fresh air amount correction, the estimated EGR rate is controlled conclusively to the target EGR rate.

Further, when the estimated air-fuel ratio is larger than the detected air-fuel ratio, that is, when the estimated air-fuel ratio is leaner than the detected air-fuel ratio, a value smaller than "0" is calculated as the instant correction value.

Thereby, the base correction value calculated according to the formula 10 is smaller than the last time calculated base correction value.

Then, in this case, the correction value for the target fuel injection amount correction calculated by the formula 6 is smaller than the last correction value for the target fuel injection amount correction and the correction value for the detected fresh air amount correction calculated by the formula 7 is larger than the last correction value for the detected fresh air amount correction.

Therefore, the fuel injection amount used for acquiring the target EGR rate is smaller than the last fuel injection amount. Thus, the target EGR rate acquired from the map shown in FIG. 2(C) is larger than the last time acquired target EGR rate.

Then, according to this, the EGR rate increases by the above-explained control of the EGR control valve and therefore, the detected air-fuel ratio becomes smaller than the this time detected air-fuel ratio. That is, the detected air-fuel ratio approaches the this time calculated estimated air-fuel ratio.

Further, the fuel injection amount used for calculating the estimated air-fuel ratio is smaller than the last fuel injection amount while the detected fresh air amount used for calculating the estimated air-fuel ratio is larger than the last detected fresh air amount and therefore, the estimated air-fuel ratio becomes large. That is, the estimated air-fuel ratio approaches the this time acquired detected air-fuel ratio.

As explained above, the detected air-fuel ratio approaches the this time calculated estimated air-fuel ratio while the estimated air-fuel ratio approaches the this time acquired detected air-fuel ratio and therefore, the estimated air-fuel ratio corresponds to the detected air-fuel ratio conclusively.

On the other hand, when the estimated air-fuel ratio is smaller than the detected air-fuel ratio, that is, when the estimated air-fuel ratio is richer than the detected air-fuel ratio, a value larger than "0" is calculated as the instant correction value.

According to this, the base correction value calculated by the formula 10 is larger than the last time calculated base correction value.

Then, in this case, the correction value for the target fuel injection amount correction calculated by the formula 6 is larger than the last correction value for the target fuel injection amount correction and the correction value for the detected fresh air amount correction calculated by the formula 7 is smaller than the last correction value for the detected fresh air amount correction.

Therefore, the fuel injection amount used for acquiring the target EGR rate is larger than the last fuel injection amount. Thus, the target EGR rate acquired from the map shown in FIG. 2(C) is smaller than the last time acquired target EGR rate.

Then, according to this, the EGR rate decreases by the above-explained control of the EGR control valve and therefore, the detected air-fuel ratio becomes larger than the this time detected air-fuel ratio. That is, the detected air-fuel ratio approaches the this time calculated estimated air-fuel ratio.

Further, the fuel injection amount used for calculating the estimated air-fuel ratio is larger than the last fuel injection amount while the detected fresh air amount used for calculating the estimated air-fuel ratio is smaller than the last detected fresh air amount and therefore, the estimated air-fuel ratio becomes small. That is, the estimated air-fuel ratio approaches the this time acquired detected air-fuel ratio.

As explained above, the detected air-fuel ratio approaches the this time calculated estimated air-fuel ratio while the estimated air-fuel ratio approaches the this time acquired detected air-fuel ratio and therefore, the estimated air-fuel ratio corresponds to the detected air-fuel ratio conclusively.

When the estimated air-fuel ratio corresponds to the detected air-fuel ratio, "0" is calculated as the instant correction value. According to this, the base correction value calculated by the formula 10 is equal to the last time calculated base correction value.

Then, in this case, the correction value for the target fuel injection amount correction calculated by the formula 6 is equal to the last correction value for the target fuel injection amount correction and the correction value for the detected fresh air amount correction calculated by the formula 7 is equal to the correction value for the detected fresh air amount correction.

Therefore, the fuel injection amount used for acquiring the target EGR rate is equal to the last fuel injection amount. Thus, the target EGR rate acquired from the map shown in FIG. 2(C) is equal to the last time acquired target EGR rate. Thus, the detected air-fuel ratio does not change. That is, the detected air-fuel ratio has corresponded to the this time calculated estimated air-fuel ratio.

Further, the fuel injection amount used for calculating the estimated air-fuel ratio is equal to the last fuel injection amount while the detected fresh air amount used for calculating the estimated air-fuel ratio is equal to the last detected fresh air amount and therefore, the estimated air-fuel ratio is equal to the this time estimated air-fuel ratio. That is, the estimated air-fuel ratio has corresponded to the this time acquired detected air-fuel ratio.

Thus, the condition that the estimated air-fuel ratio corresponds to the detected air-fuel ratio is maintained.

As explained above, the change of the target EGR rate by correcting the fuel injection amount used for acquiring the target EGR rate depending on the difference of the estimated air-fuel ratio relative to the target air-fuel ratio has an advantage that the exhaust emission decreases. Next, this will be explained.

In the case that the estimated air-fuel ratio is larger than the detected air-fuel ratio, that is, in the case that the estimated air-fuel ratio is leaner than the detected air-fuel ratio, assuming that the upstream oxygen concentration sensor has no error, there is a possibility that the target fuel injection amount is smaller than the actual fuel injection amount.

In other words, there is a possibility that the actual fuel injection amount is larger than the target fuel injection amount.

In this regard, the target EGR rate memorized in the map shown in FIG. 2(C) is set as the EGR rate which can decrease the exhaust emission depending on the fuel injection amount. That is, if the target EGR rate suitable for the actual fuel injection amount is not acquired from the map shown in FIG. 2(C), the exhaust emission decreases.

Therefore, there is a possibility that the actual fuel injection amount larger than the target fuel injection amount and therefore, in order to improve the exhaust emission, the target EGR rate corresponding to the large fuel injection amount should be acquired from the map shown in FIG. 2(C).

According to the above-explained embodiment, in the case that the estimated air-fuel ratio is larger than the detected air-fuel ratio, that is, in the case that there is a possibility that the actual fuel injection amount is larger than the target fuel injection amount, the target fuel injection amount is maintained while the fuel injection amount used for acquiring the target EGR rate from the map shown in FIG. 2(C) is increased and therefore, as a result, the target EGR rate which improves the exhaust emission is acquired from the map shown in FIG. 2(C) by the current actual fuel injection amount.

Similarly, in the case that the estimated air-fuel ratio is smaller than the detected air-fuel ratio, that is, in the case that the estimated air-fuel ratio is richer than the detected air-fuel ratio, assuming that the upstream oxygen concentration sensor has no error, there is a possibility that the target fuel injection amount is larger than the actual fuel injection amount.

In other words, there is a possibility that the actual fuel injection amount is smaller than the target fuel injection amount.

As explained above, the target EGR rate memorized in the map shown in FIG. 2(C) is set as the EGR rate which can improve the exhaust emission depending on the fuel injection amount.

That is, if the target EGR rate suitable for the actual fuel injection amount is not acquired from the map shown in FIG. 2(C), the exhaust emission decreases.

Therefore, there is a possibility that the actual fuel injection amount is smaller than the target fuel injection amount and therefore, in order to improve the exhaust emission, the target EGR rate corresponding to the small fuel injection amount should be acquired from the map shown in FIG. 2(C).

According to the above-explained embodiment, in the case that the estimated air-fuel ratio is smaller than the detected air-fuel ratio, that is, in the case that there is a possibility that the actual fuel injection amount is smaller than the target fuel injection amount, the target fuel injection amount is maintained while the fuel injection amount used for acquiring the target EGR rate from the map shown in FIG. 2(C) is decreased and therefore, as a result, the target EGR rate which improves the exhaust emission is acquired from the map shown in FIG. 2(C) by the current actual fuel injection amount.

In the case that the base correction value is divided into the correction values for the target fuel injection amount correction and the detected fresh air amount correction by using the distribution coefficient as explained above, when the EGR control valve is controlled as explained above such that the estimated EGR rate is controlled to the target EGR rate and the estimated air-fuel ratio corresponds to the detected air-fuel ratio, this can be accomplished for a short time.

Therefore, a high effect (for example, an effect to improve the exhaust emission) can be obtained from the above-explained control of the EGR control valve.

That is, when the difference of the estimated air-fuel ratio relative to the detected air-fuel ratio (in the above-explained embodiment, the base correction value) is divided into the correction values for the target fuel injection amount correction and the detected fresh air amount correction by using the distribution coefficient, the correction value for the target fuel injection amount correction substantially represents the fuel injection difference of the fuel injector and the correction value for the detected fresh air amount correction substantially represents the fresh air amount detection difference of the air flow meter.

In this regard, when the value obtained by dividing the estimated air-fuel ratio by the detected air-fuel ratio is referred to as "air fuel ratio", the value obtained by dividing the fresh air amount detection difference by the fuel injection difference, that is, the value obtained by dividing the correction value for the detected fresh air amount correction by the correction value for the target fuel injection amount is equivalent to the air-fuel-ratio.

Then, from the study by the inventor of this application, when the value obtained by dividing the correction value for the detected fresh air amount correction by the correction value for the target fuel injection amount correction is equal to the air-fuel-ratio, it has been found that it can be accomplished for a short time that the estimated EGR rate is controlled to the target EGR rate while the estimated air-fuel ratio corresponds to the detected air-fuel ratio by controlling the EGR control valve.

According to the above-explained embodiment, the value obtained by dividing the correction value for the detected fresh air amount correction by the correction value for the target fuel injection amount correction is equal to the air-fuel-ratio and therefore, it can be accomplished for a short time that the estimated EGR rate is controlled to the target EGR rate while the estimated air-fuel ratio corresponds to the detected air-fuel ratio by controlling the EGR control valve and furthermore, the exhaust emission discharged from the combustion chamber can be improved.

Figure 4:
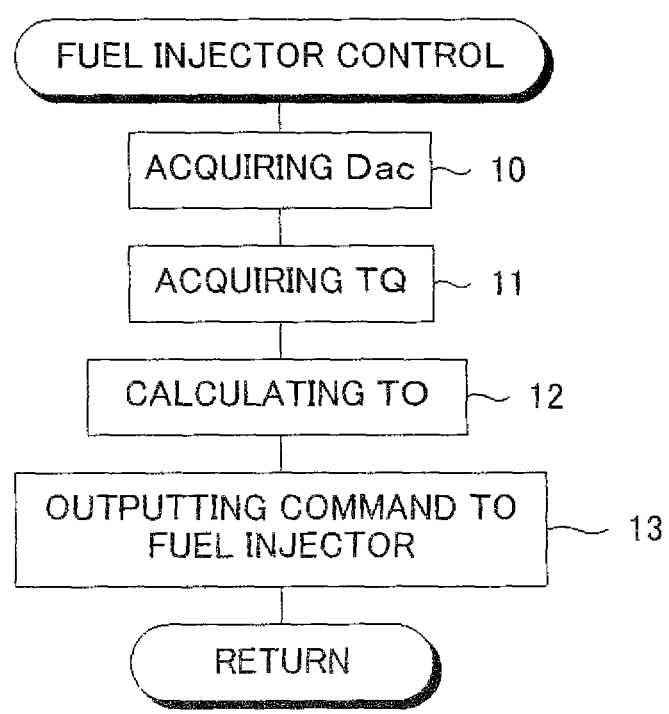
FIG. 4 is a flowchart showing an example of a routine for performing a control of a fuel injector of this invention.

Next, an example of a routine for performing the control of the fuel injector will be explained. The example of this routine is shown in FIG. 4. The routine shown in FIG. 4 is performed every a predetermined time has elapsed.

When the routine shown in FIG. 4 starts, first, at the step 10, the accelerator pedal opening degree Dac is acquired.

Next, at the step 11, the target fuel injection amount TQ is acquired from the map shown in FIG. 2(A) on the basis of the accelerator pedal opening degree Dac acquired at the step 10.

Next, at the step 12, a fuel injector opening time TO for injecting the fuel having the target fuel injection amount TQ acquired at the step 11 from the fuel injector is calculated.

Next, at the step 13, a command for opening the fuel injector by the fuel injector opening time TO calculated at the step 12 (hereinafter, this command will be referred to as—fuel injection command—) is output to the fuel injector and then, the routine is terminated.

Figure 5:
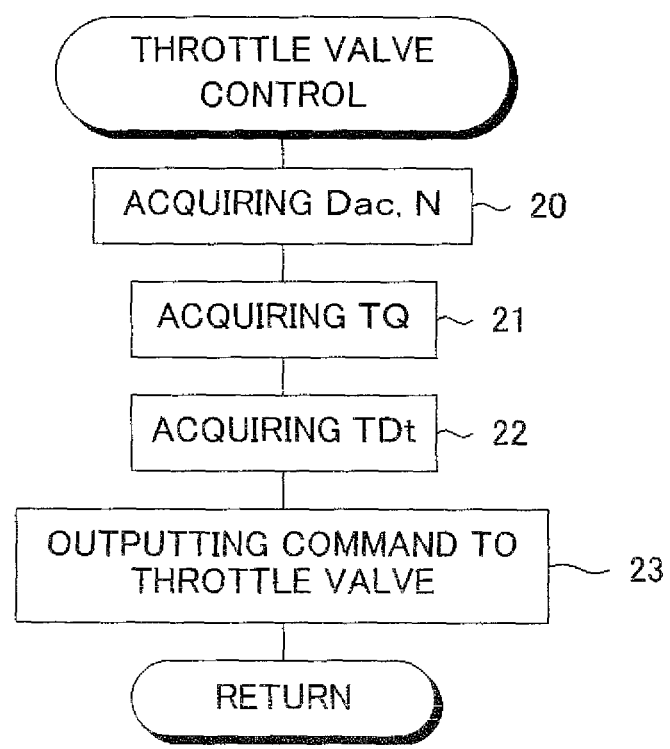
FIG. 5 is a flowchart showing an example of a routine for performing a control of a throttle valve of this invention.

Next, an example of a routine for performing the control of the throttle valve will be explained. The example of this routine is shown in FIG. 5. The routine shown in FIG. 5 is performed every a predetermined time has elapsed.

When the routine shown in FIG. 5 starts, first, at the step 20, the accelerator pedal opening degree Dac and the engine speed are acquired.

Next, at the step 21, the target fuel injection amount TQ is acquired as the fuel injection amount Q from the map shown in FIG. 2(A) on the basis of the accelerator pedal opening degree Dac acquired at the step 20.

Next, at the step 22, the target throttle valve opening degree TDth is acquired from the map shown in FIG. 2(B) on the basis of the fuel injection amount Q acquired at the step 21 and the engine speed N.

Next, at the step 23, a command for accomplishing the target throttle valve opening degree TD acquired at the step 22 is output to the throttle valve and then, the routine is terminated.

Figure 6:
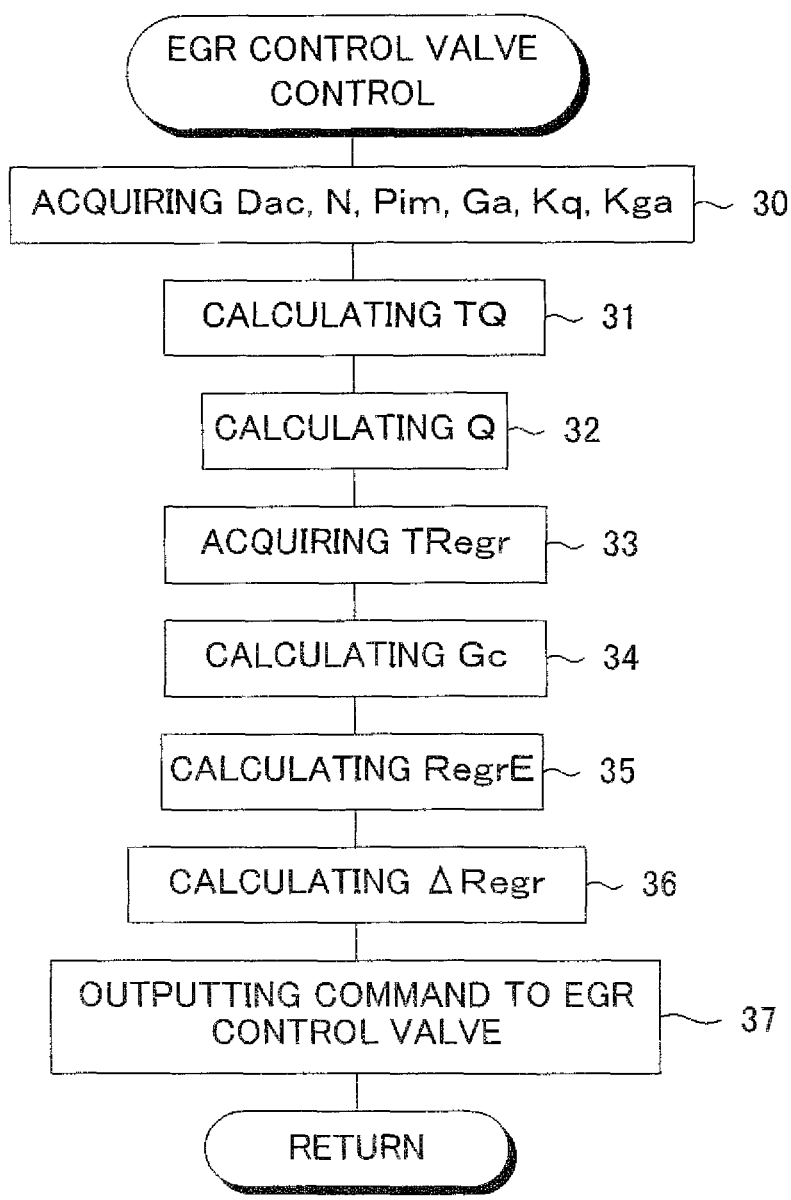
FIG. 6 is a flowchart showing an example of a routine for performing a control of an EGR control valve of this invention.

Next, an example of a routine for performing the control of the EGR control valve will be explained. The example of this routine is shown in FIG. 6. The routine shown in FIG. 6 is performed every a predetermined time has elapsed.

When the routine shown in FIG. 6 starts, first, at the step 30, the accelerator pedal opening degree Dac, the engine speed N, the intake pressure Pim, the detected fresh air amount Ga and the correction values Kq and Kga for the target fuel injection amount correction and the detected fresh air amount correction.

Next, at the step 31, the target fuel injection amount TO is acquired from the map shown in FIG. 2(A) on the basis of the accelerator pedal opening degree Dac acquired at the step 30.

Next, at the step 32, the fuel injection amount Q for the target EGR rate acquisition is calculated by applying the target fuel injection amount TQ acquired at the step 31 and the correction value Kq for the target fuel injection amount correction acquired at the step 30 to the formula 4.

Next, at the step 33, the target EGR rate TRegr is acquired from the map shown in FIG. 2(C) on the basis of the fuel injection amount Q calculated at the step 32 and the engine speed N acquired at the step 30.

Next, at the step 34, the in-cylinder intake gas amount Gc is calculated by applying the intake pressure Pim and the engine speed N acquired at the step 30 to the formula 3.

Next, at the step 35, the estimated EGR rate RegrE is calculated by applying the in-cylinder intake gas amount Gc calculated at the step 34, the detected fresh air amount Ga and the correction value Kga for the detected fresh air amount correction acquired at the step 30 to the formula 1.

Next, at the step 36, the EGR rate difference Δ Regr is calculated by applying the target EGR rate TRegr calculated at the step 33 and the estimated EGR rate RegrE calculated at the step 35 to the formula 2.

Next, at the step 37, a command for controlling the EGR control valve opening degree is output to the EGR control valve such that the EGR rate difference Δ Regr calculated at the step 36 becomes zero and then, the routine is terminated.

Figure 7:
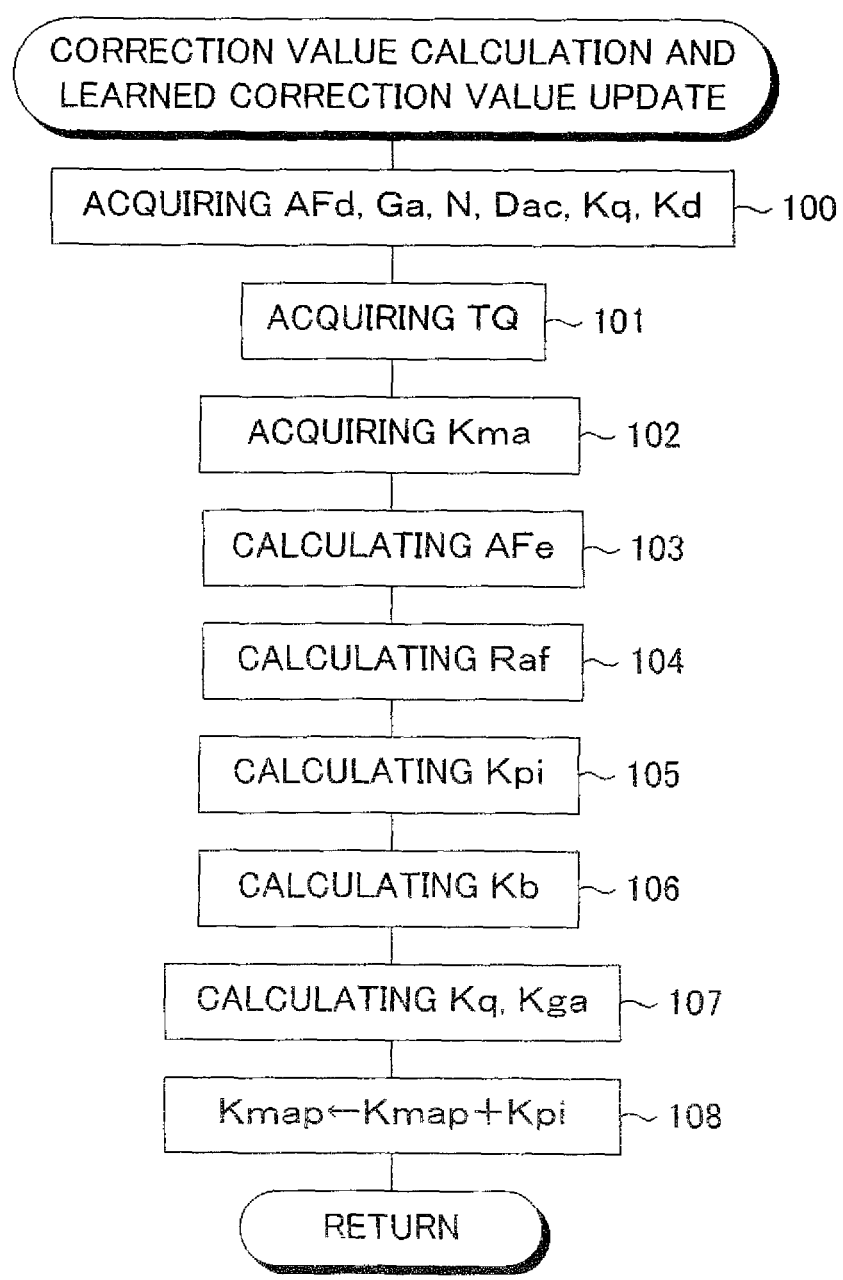
FIG. 7 is a flowchart showing an example of a routine for performing a calculation of correction values for a target fuel injection amount correction and a detected fresh air amount correction and an update of a learned correction value of this invention.

Next, an example of a routine for performing the calculation of the correction values for the target fuel injection amount correction and the detected fresh air amount correction and the update of the learned correction value. This routine is shown in FIG. 7. The routine shown in FIG. 7 is performed every a predetermined time has elapsed.

When the routine shown in FIG. 7 starts, first, at the step 100, the detected air-fuel ratio AFd, the detected fresh air amount Ga, the engine speed N, the accelerator pedal opening degree Dac, the correction value Kq for the target fuel injection amount correction and the distribution coefficient Kd are acquired.

Next, at the step 101, the target fuel injection amount TQ is acquired from the map shown in FIG. 2(A) on the basis of the accelerator pedal opening degree Dac acquired at the step 100.

Next, at the step 102, the learned correction value Kmap is acquired from the map shown in FIG. 3 on the basis of the target fuel injection amount TQ acquired at the step 101 and the engine speed N acquired at the step 100.

Next, at the step 103, the estimated air-fuel ratio AFe is calculated by applying the target fuel injection amount TQ acquired at the step 101, the detected fresh air amount Ga and the correction value Kq for the target fuel injection amount acquired at the step 100 to the formula 8.

Next, at the step 104, the air-fuel ratio difference rate Raf is calculated by applying the estimated air-fuel ratio AFe calculated at the step 103 and the detected air-fuel ratio AFd acquired at the step 100.

Next, at the step 105, a correction value for correcting the fuel injection amount for the target EGR rate acquisition is calculated as the instant correction value Kpi such that the air-fuel ratio difference rate Raf calculated at the step 104 becomes "1".

Next, at the step 106, the base correction value Kb is calculated by applying the instant correction value Kpi calculated at the step 105 and the learned correction value Kmap acquired at the step 102 to the formula 10.

Next, at the step 107, the correction value Kq for the target fuel injection amount correction is calculated by applying the base correction value Kb calculated at the step 106 and the distribution coefficient Kd acquired at the step 100 to the formula 6 while the correction value Kga for the detected fresh air amount correction is calculated by applying the base correction value Kb calculated at the step 106 and the distribution coefficient Kd acquired at the step 100 to the formula 7.

Next, at the step 108, a value obtained by adding the instant correction value Kpi calculated at the step 105 to the learned correction value Kmap acquired at the step 102 is updated as a new learned correction value Kmap and then, the routine is terminated.

Next, an embodiment of the invention relating to the setting of the distribution coefficient Kd will be explained.

In the following explanation, "fuel injector tolerance" is a drawings tolerance relating to the accuracy of the fuel injection amount from the fuel injector relative to the fuel injection command, "air flow meter tolerance" is a drawings tolerance relating to the detection accuracy of the fresh air amount by the air flow meter, "oxygen concentration sensor tolerance" is a drawings tolerance relating to the detection accuracy of the oxygen concentration by the upstream oxygen concentration sensor, "NOx production amount" is an amount of the NOx (nitrogen oxide) produced in the combustion chamber per unit running distance and "accumulated running distance" is an accumulated running distance of a vehicle which the engine of the invention is mounted.

In one embodiment of the invention (hereinafter, this embodiment will be referred to as—first embodiment relating to the distribution coefficient setting—), first, the engine which the fuel injectors having no fuel injection amount difference, the air flow meter having no detected fresh air amount difference and the upstream oxygen concentration sensor having no detected oxygen concentration difference are mounted is operated at a predetermined operation mode under the condition where the base correction value Kb is maintained "1" (i.e. the condition that the correction values for the target fuel injection amount correction and the detected fresh air amount correction and substantially, the condition that the target fuel injection amount and detected fresh air amount are not corrected) and then, the current NOx production amount (hereinafter, this NOx production amount will be referred to as—base NOx production amount—) is acquired.

Then, in this embodiment, a first distribution coefficient map is prepared as follows.

That is, first, the engine which new fuel injectors having the fuel injection amount difference, the air flow meter having no detected fresh air amount difference and the upstream oxygen concentration sensor having no detected oxygen concentration difference are mounted is operated at the above-mentioned predetermined operation mode under the condition where the calculation of the base correction value on the basis of the air-fuel ratio difference ratio is performed and the distribution coefficient Kd is fixed to "0".

Then, during this engine operation, the data of the NOx production amounts (hereinafter, this NOx production amount will be referred to as—first NOx production amount—) are acquired.

Then, a plurality of NOx index values (i.e. index values relating to the NOx produced in the combustion chamber and hereinafter, this NOx index value will be referred to as—first NOx index value—) ID1 are calculated by applying the data of the first NOx production amounts to the following formula 11 one by one.

In the following formula 11, "NOXb" is a base NOx production amount and "NOX1) is a first NOx production amount.

$$ID1 = NOX1/NOXb - 1 \qquad (11)$$

Further, the engine which new fuel injectors having the fuel injection amount difference, the air flow meter having no detected fresh air amount difference and the upstream oxygen concentration sensor having no detected oxygen concentration difference are mounted is operated at the above-mentioned operation mode under the condition where the calculation of the base correction value on the basis of the air-fuel ratio difference ratio is performed and the distribution coefficient Kd is fixed to "1".

Then, during this engine operation, the date of the NOx production amounts (hereinafter, this NOx production amount will be referred to as—second NOx production amount—) are acquired.

Then, a plurality of NOx index values (hereinafter, this NOx index value will be referred to as—second NOx index value—) 102 are calculated by applying the data of the second NOx production amounts to the following formula 12 one by one.

In the following formula 12, "NOXb" is the base NOx production amount and "NOX2" is a second NOx production amount.

$$ID2 = NOX2/NOXb - 1 \qquad (12)$$

Further, the engine which the fuel injectors having no fuel injection amount difference, new air flow meter having the detected fresh air amount difference and the upstream oxygen concentration sensor having no detected oxygen concentration difference are mounted is operated at the above-mentioned operation mode under the condition where the calculation of the base correction value on the basis of the air-fuel ratio difference ratio is performed and the distribution coefficient Kd is fixed to "0".

Then, during this engine operation, the data of the NOx production amounts (hereinafter, this NOx production amount will be referred to as—third NOx production amount—) are acquired.

Then, a plurality of NOx index values (hereinafter, this NOx index value will be referred to as—third NOx index value—) ID3 are calculated by applying the data of the third NOx production amounts to the following formula 13 one by one.

In the following formula 13, "NOXb" is the base NOx production amount and "NOX3" is a third NOx production amount.

$$ID3 = NOX3/NOXb - 1 \qquad (13)$$

Further, the engine which the fuel injectors having no fuel injection amount difference, new air flow meter having the detected fresh air amount difference and the upstream oxygen concentration sensor having no detected oxygen concentration difference are mounted is operated at the above-mentioned operation mode under the condition where the calculation of the base correction value on the basis of the air-fuel ratio difference ratio is performed and the distribution coefficient Kd is fixed to "1".

Then, during this engine operation, the date of the NOx production amounts (hereinafter, this NOx production amount will be referred to as—fourth NOx production amount—) are acquired.

Then, a plurality of NOx index values (hereinafter, this NOx index value will be referred to as—fourth NOx index value—) ID4 are calculated by applying the data of the fourth NOx production amounts to the following formula 14 one by one.

In the following formula 14, "NOXb" is the base NOx production amount and "NOX4" is a fourth NOx production amount.

$$ID4 = NOX4/NOXb - 1 \qquad (14)$$

Further, the engine which the fuel injectors having no fuel injection amount difference, the air flow meter having no detected fresh air amount difference and new upstream oxygen concentration sensor having the detected oxygen concentration difference are mounted is operated at the above-mentioned operation mode under the condition where the calculation of the base correction value on the basis of the air-fuel ratio difference ratio is performed and the distribution coefficient Kd is fixed to "0".

Then, during this engine operation, the data of the NOx production amounts (hereinafter, this NOx production amount will be referred to as—fifth NOx production amount—) are acquired.

Then, a plurality of NOx index values (hereinafter, this NOx index value will be referred to as—fifth NOx index value—) ID5 are calculated by applying the data of the fifth NOx production amounts to the following formula 15 one by one.

In the following formula 15, "NOXb" is the base NOx production amount and "NOX5" is a fifth NOx production amount.

$$ID5=NOX5/NOXb-1 \qquad (15)$$

Further, the engine which the fuel injectors having no fuel injection amount difference, the air flow meter having no detected fresh air amount difference and new upstream oxygen concentration sensor having the detected oxygen concentration difference are mounted is operated at the above-mentioned operation mode under the condition where the calculation of the base correction value on the basis of the air-fuel ratio difference ratio is performed and the distribution coefficient Kd is fixed to "1".

Then, during this engine operation, the data of NOx production amounts (hereinafter, this NOx production amount will be referred to as—sixth NOx production amount—) are acquired.

Then, a plurality of NOx index values (hereinafter, this NOx index value will be referred to as—sixth NOx index value—) ID6 are calculated by applying the data of the sixth NOx production amounts to the following formula 16 one by one.

In the following formula 16, "NOXb" is the base NOx production amount and "NOX6" is a sixth NOx production amount.

$$ID6=NOX6/NOXb-1 \qquad (16)$$

Figure 8:
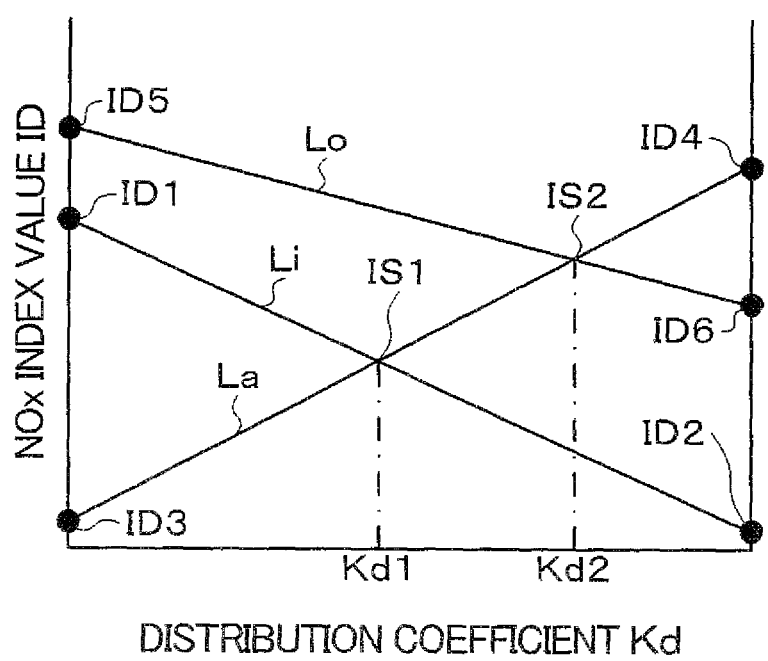
FIG. 8 is a view for explaining one embodiment of a setting of a distribution coefficient of this invention.

Then, the first to sixth NOx index values which have the same combination of the target fuel injection amount and the engine speed relating thereto are selected from the thus calculated first to sixth NOx index values ID1 to ID6 and then, as shown in FIG. 8, in the coordinate having the abscissa of the distribution coefficient Kd and the ordinate of the NOx index value ID, the first NOx index value ID1 is plotted on the line of "0" of the distribution coefficient Kd (this plot point is shown by the reference symbol ID1 in FIG. 8), the second NOx index value ID2 is plotted on the line of "1" of the distribution coefficient Kd (this plot point is shown by the reference symbol ID2 in FIG. 8), the third NOx index value ID3 is plotted on the line of "0" of the distribution coefficient Kd (this plot point is shown by the reference symbol ID3 in FIG. 8), the fourth NOx index value ID4 is plotted on the line of "1" of the distribution coefficient Kd (this plot point is shown by the reference symbol ID4 in FIG. 8), the fifth NOx index value ID5 is plotted on the line of "0" of the distribution coefficient Kd (this plot point is shown by the reference symbol ID5 in FIG. 8) and the sixth NOx index value ID6 is plotted on the line of "1" of the distribution coefficient Kd (this plot point is shown by the reference symbol ID6 in FIG. 8).

Then, the plot points ID1 and ID2 are connected by a straight line (this straight line is shown by the reference symbol Li), the plot points ID3 and ID4 are connected by a straight line (this straight line is shown by the reference symbol La and the plot points ID5 and ID6 are connected by a straight line (this straight line is shown by the reference symbol Lo).

Then, from the distribution coefficients Kd1 and Kd2 corresponding to the intersection points IS1 and IS2 respectively of the straight lines Li and La, the distribution coefficient where the value obtained by adding together the NOx index values on each straight lines Li, La and Lo corresponding to the distribution coefficients Kd1 and Kd2 respectively (in FIG. 8, the distribution coefficient Kd2) is acquired as the distribution coefficient to be employed as the distribution coefficient constituting the first distribution coefficient map.

Figure 9:
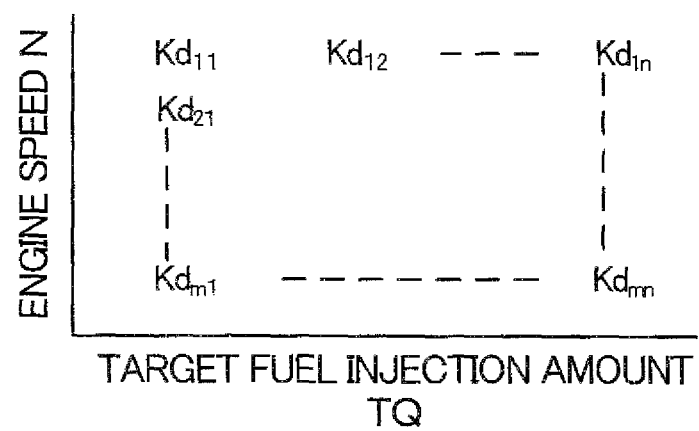
FIG. 9(A) is a view showing a first distribution coefficient map and FIG. 9(B) is a view showing a second distribution coefficient map.
Figure 9:
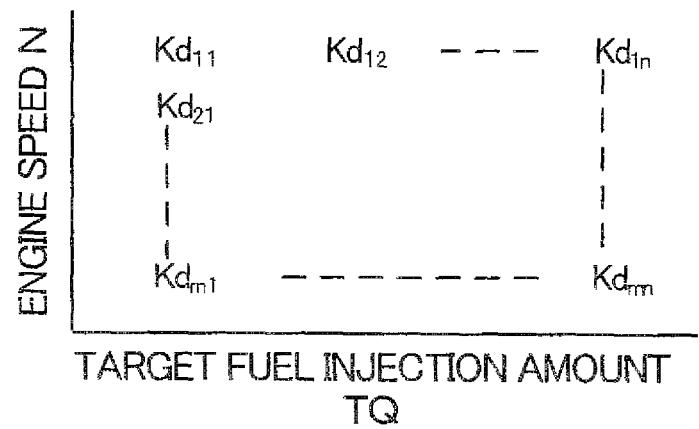

Then, a plurality of the distribution coefficients to be employed as the distribution coefficients constituting the first distribution coefficient map are acquired by performing the above-explained process repeatedly corresponding to each combination of the target fuel injection amount and the engine speed relating to the NOx index value and then, as shown in FIG. 9(A), the first distribution map used for acquiring the distribution coefficient Kd on the basis of the target fuel injection amount TQ and engine speed N is prepared on the basis of the acquired distribution coefficients.

Further, in this embodiment, the second distribution coefficient map is prepared as follows.

That is, first, the engine comprising the fuel injectors used for a certain time and having an error, the air flow meter having no error and the upstream oxygen concentration sensor having no error is operated at the above-mentioned operation mode under the condition where the distribution coefficient Kd is maintained "0" and the calculation of the base correction value on the basis of the air-fuel ratio difference ratio is performed.

Then, during the engine operation, the data of the NOx production amount (hereinafter, this NOx production amount will be referred to as—first NOx production amount—) are acquired.

Then, a plurality of the NOx index values ID1 are calculated by applying the data of the first NOx production amounts to the formula 11 one by one (hereinafter, this NOx index value will be referred to as—first NOx index value—).

Further, the engine comprising the fuel injectors used for a certain time and having an error, the air flow meter having no error and the upstream oxygen concentration sensor having no error is operated at the above-mentioned operation mode under the condition where the distribution coefficient Kd is maintained "1" and the calculation of the base correction value on the basis of the air-fuel ratio difference ratio is performed.

Then, during the engine operation, the data of the NOx production amount (hereinafter, this NOx production amount will be referred to as—second NOx production amount—) are acquired.

Then, a plurality of the NOx index values ID2 are calculated by applying the data of the second NOx production amounts to the formula 12 one by one (hereinafter, this NOx index value will be referred to as—second NOx index value—).

Further, the engine comprising the fuel injectors having no error, the air flow meter used for a certain time and having an error and the upstream oxygen concentration sensor having no error is operated at the above-mentioned operation mode under the condition where the distribution coefficient Kd is maintained "0" and the calculation of the base correction value on the basis of the air-fuel ratio difference ratio is performed.

Then, during the engine operation, the data of the NOx production amount (hereinafter, this NOx production amount will be referred to as—third NOx production amount—) are acquired.

Then, a plurality of the NOx index values ID3 are calculated by applying the data of the third NOx production amounts to the formula 13 one by one (hereinafter, this NOx index value will be referred to as—third NOx index value—).

Further, the engine comprising the fuel injectors having no error, the air flow meter used for a certain time and having an error and the upstream oxygen concentration sensor having no error is operated at the above-mentioned operation mode under the condition where the distribution coefficient Kd is maintained "1" and the calculation of the base correction value on the basis of the air-fuel ratio difference ratio is performed.

Then, during the engine operation, the data of the NOx production amount (hereinafter, this NOx production amount will be referred to as—fourth NOx production amount—) are acquired.

Then, a plurality of the NOx index values ID4 are calculated by applying the data of the fourth NOx production amounts to the formula 14 one by one (hereinafter, this NOx index value will be referred to as—fourth NOx index value—).

Further, the engine comprising the fuel injectors having no error, the air flow meter having no error and the upstream oxygen concentration sensor used for a certain time and having an error is operated at the above-mentioned operation mode under the condition where the distribution coefficient Kd is maintained "0" and the calculation of the base correction value on the basis of the air-fuel ratio difference ratio is performed.

Then, during the engine operation, the data of the NOx production amount (hereinafter, this NOx production amount will be referred to as—fifth NOx production amount—) are acquired.

Then, a plurality of the NOx index values ID5 are calculated by applying the data of the third NOx production amounts to the formula 15 one by one (hereinafter, this NOx index value will be referred to as—fifth NOx index value—).

Further, the engine comprising the fuel injectors having no error, the air flow meter having no error and the upstream oxygen concentration sensor used for a certain time and having an error is operated at the above-mentioned operation mode under the condition where the distribution coefficient Kd is maintained "1" and the calculation of the base correction value on the basis of the air-fuel ratio difference ratio is performed.

Then, during the engine operation, the data of the NOx production amount (hereinafter, this NOx production amount will be referred to as—sixth NOx production amount—) are acquired.

Then, a plurality of the NOx index values ID6 are calculated by applying the data of the third NOx production amounts to the formula 16 one by one (hereinafter, this NOx index value will be referred to as—six NOx index value—).

Then, the first to sixth NOx index values corresponding to the same combination of the target fuel injection amount and the engine speed are found from the first to sixth NOx index values ID1 to ID6 calculated as explained above, a plurality of distribution coefficients to be employed as distribution coefficients for constituting a second distribution coefficient map are acquired by the same process as that explained relating to the preparation of the first distribution coefficient map, and the second distribution coefficient map used for acquiring the distribution coefficient Kd from the target fuel injection amount TQ and the engine speed N is prepared on the basis of the acquired distribution coefficients as shown in FIG. 9(B).

Regarding the preparation of the second distribution coefficient map, the "fuel injector used for a certain time" is a fuel injector of an engine when the vehicle having the engine having new fuel injectors mounted has run for a predetermined distance, the "air flow meter used for a certain time" is an air flow meter of an engine when the vehicle having the engine having new air flow meter mounted has run for a predetermined distance, and the "upstream oxygen concentration sensor used for a certain time" is an upstream oxygen concentration sensor of an engine when the vehicle having the engine having new upstream oxygen concentration sensor mounted has run for a predetermined distance.

Then, during the engine operation, when the total sum running distance is shorter than a base total sum running distance (i.e. the above-mentioned predetermined distance), the distribution coefficient acquired from the first distribution coefficient map on the basis of the current target fuel injection amount and the current engine speed is set as the distribution coefficient used for the actual engine control (hereinafter, this distribution coefficient will be also referred to as—distribution coefficient for the engine control—).

On the other hand, during the engine operation, when the total sum running distance is equal to or larger than the base total sum running distance, the distribution coefficient acquired from the second distribution coefficient on the basis of the current target fuel injection amount and the current engine speed is set as the distribution coefficient for the engine speed.

According to the above-explained setting of the distribution coefficient, the distribution coefficient is set in consideration of the fuel injector tolerance, the air flow meter tolerance and the oxygen concentration sensor tolerance.

Thus, even when the fuel injector has a fuel injection difference in the range of the drawings tolerance, or the air flow meter has a fresh air amount detection difference in the range of the drawings tolerance, or the upstream oxygen concentration sensor has an error in the range of the drawings tolerance, the amount of NOx discharged from the combustion chamber can be decreased and therefore, the distribution coefficient which can decrease the exhaust emission discharged from the combustion chamber is set.

Next, another embodiment of the invention relating to the setting of the distribution coefficient Kd will be explained.

In this another embodiment of the invention (hereinafter, this embodiment will be referred to as—second embodiment relating to the distribution coefficient setting—), first, the engine equipped with the fuel injector having no fuel injection difference, the air flow meter having no fresh air amount detection difference and the upstream oxygen concentration sensor having no error is operated at a predetermined operation mode in the condition that the base correction value Kb is maintained at the constant value "1" (i.e. the correction values for the target fuel injection amount correction and the detected fresh air amount correction are "1", respectively and therefore, the target fuel injection amount and the detected fresh air amount are not corrected substantially) and then, under this condition, the NOx production amounts are previously acquired (hereinafter, this NOx production amount will be referred to as—base NOx production amount—).

Then, during the engine operation, the currently-used distribution coefficient Kd is used as the base distribution coefficient.

Then, the engine is operated in the condition that this base distribution coefficient is used as the provisional distribution coefficient and then, under this condition, the NOx production amounts are detected and thereafter, the index values relating to NOx produced in the combustion chamber IDb are calculated by applying the detected NOx production amounts to the following formula 17 (hereinafter, this index value will be referred to as—base NOx index value—).

In the formula 17, "NOXdb" is the detected NOx production amount and "NOXb" is the base NOx production amount.

$$IDb = NOXdb/NOXb - 1 \quad (17)$$

Next, the engine is operated in the condition that the value smaller than the currently-used distribution coefficient by the predetermined value (this value is larger than zero) is used as the provisional distribution coefficient (i.e. the value smaller than the base distribution coefficient by the predetermined value) and then, the NOx production amounts are detected and thereafter, the index values IDs relating to NOx produced in the combustion chamber are calculated by applying the detected NOx production amounts to the following formula 18 (hereinafter, this index value will be referred to as—decrease-side NOx index value—).

In the formula 18, "NOXds" is the detected NOx production amount and "NOXb" is the base NOx production amount.

$$IDs = NOXds/NOXb - 1 \quad (18)$$

Next, the engine is operated in the condition that the value larger than the currently-used distribution coefficient by the predetermined value (this value is larger than zero) is used as the provisional distribution coefficient and then, the NOx production amounts are detected and thereafter, the index values IDl relating to NOx produced in the combustion chamber are calculated by applying the detected NOx production amounts to the following formula 19 (hereinafter, this index value will be referred to as—increase-side NOx index value—).

In the formula 19, "NOXdl" is the detected NOx production amount and "NOXb" is the base NOx production amount.

$$IDl = NOXdl/NOXb - 1 \quad (19)$$

Then, the calculated NOx index values are compared with each other and then, it is judged which value is the smallest.

In this regard, when it is judged that the base NOx index IDb calculated by the formula 17 is the smallest, the base distribution coefficient used at this time is set to the distribution coefficient and then, the setting of the distribution coefficient is terminated.

That is, in this case, the currently-used distribution coefficient itself is used as the distribution coefficient.

On the other hand, when it is judged that the decrease-side NOx index value IDs calculated by the formula 18 is the smallest, the calculation of the NOx index values IDb, IDs and IDl according to the formulas 17 to 19 and the comparison thereof are performed in the condition that the value smaller than the base distribution coefficient used at this time by the predetermined value (this value is larger than zero) is sed as a new base distribution coefficient.

That is, the value smaller than the base distribution coefficient used at this time by the predetermined value is used as a new base distribution coefficient, the engine is operated in the condition that this new base distribution coefficient is used as the provisional distribution coefficient and then, the NOx production amount is detected and thereafter, the base NOx index value IDb is calculated by applying the detected NOx production amount NOXdb to the formula 17, and next, the engine is operated in the condition that the value smaller than the new base distribution coefficient by the predetermined value is used as the provisional distribution coefficient and then, the NOx production amount is detected and thereafter, the decrease-side NOx index value IDs is calculated by applying the detected NOx production amount NOXds to the formula 18, and next, the operation is operated in the condition that the value larger than the new base distribution coefficient by the predetermined value is used as the provisional distribution coefficient and then, the NOx production amount is detected and thereafter, the increase-side NOx index value IDl is calculated by applying the detected NOx production amount NOXdl to the formula 19.

Then, the calculated NOx index values are compared with each other and it is judged which NOx index value is the smallest.

In this regard, when it is judged that the base NOx index value IDb calculated by the formula 18 is the smallest, the base distribution coefficient used at this time is set to the distribution coefficient and on the other hand, when it is judged that the decrease-side NOx index value IDs calculated by the formula 17 is the smallest, the above-explained engine operation, NOx production amount detection, NOx index value calculation and NOx index value comparison are performed in the condition that the value smaller than the base distribution coefficient used at this time by the predetermined value is used as a new base distribution coefficient and this process is performed repeatedly until it is judged that the base NOx index value IDb calculated by the formula 18 is the smallest.

On the other hand, when it is judged that the increase-side NOx index value IDl calculated by the formula 19 is the smallest, the calculation of the NOx index values IDb, IDs and IDl according to the formulas 17 to 19 and the comparison of these NOx index values are performed in the condition that the value larger than the base distribution coefficient used at this time by the predetermined value (this value is larger than zero) is used as a new base distribution coefficient.

That is, the value larger than the base distribution coefficient used at this time by the predetermined value is used as a new base distribution coefficient, the engine is operated in the condition that this new base distribution coefficient is used as the provisional distribution coefficient and then, the NOx production amount is detected and thereafter, the base NOx index value IDb is calculated by applying the detected NOx production amount NOXdb to the formula 17 and next, the engine is operated in the condition that the value smaller than the new base distribution coefficient by the predetermined value is used as the provisional distribution coefficient and then, the NOx production amount is detected and thereafter, the decrease-side NOx index value IDs is calculated by applying the detected NOx production amount NOXds to the formula 18 and next, the engine is operated in the condition that the value larger than the new base distribution coefficient by the predetermined value is used as the provisional distribution coefficient and then, the NOx production amount is detected and thereafter, the increase-side NOx index value IDl is calculated by applying the detected NOx production amount NOXdl to the formula 19.

Then, the calculated NOx index values are compared with each other and then, it is judged which NOx index value is the smallest.

In this regard, when it is judged that the base NOx index value IDb calculated by the formula 18 is the smallest, the base distribution coefficient used at this time is set to the distribution coefficient and on the other hand, when it is judged that the increase-side NOx index value IDl calculated by the formula 19 is the smallest, the above-explained engine operation, NOx production amount detection, NOx index value calculation and NOx index value comparison are performed in the condition that the value larger than the base distribution coefficient used at this time by the predetermined value is used as a new base distribution coefficient and this process is performed repeatedly until it is judged that the base NOx index value IDb calculated by the formula 17 is the smallest.

Of course, when it is judged that the decrease-side NOx index value IDs calculated by the formula 18 is the smallest, the above-explained engine operation, NOx production amount detection, NOx index value calculation and NOx index value comparison are performed in the condition that the value smaller than the base distribution coefficient used at this time by the predetermined value is used as a new base distribution coefficient and thereafter, when it is judged that the increase-side NOx index value IDl calculated by the formula 19 is the smallest, the above-explained engine operation, NOx production amount detection, NOx index value calculation and NOx index value comparison are performed in the condition that the base distribution coefficient is increased by the predetermined value.

On the other hand, when it is judged that the maximum NOx index value IDl calculated by the formula 19 is the smallest, the above-explained engine operation, NOx production amount detection, NOx index value calculation and NOx index value comparison are performed in the condition that the value larger than the base distribution coefficient used at this time by the predetermined value is used as a new base distribution coefficient and thereafter, when it is judged that the decrease-side NOx index value IDs calculated by the formula 18 is the smallest, the above-explained engine operation, NOx production amount detection, NOx index value calculation and NOx index value comparison are performed in the condition that the base distribution coefficient is decreased by the predetermined value.

According to the above-explained distribution coefficient setting, even when the fuel injection difference occurs in the fuel injector or this difference changes due to the fuel injector deterioration or even when the fresh air amount detection difference occurs in the air flow meter or this difference changes due to the air flow meter deterioration or even when the oxygen concentration detection difference occurs in the upstream oxygen concentration sensor or this difference changes due to the upstream oxygen concentration sensor deterioration, a new distribution coefficient is set in reflection of these difference occurrence or changes during the engine operation.

Thus, the NOx amount discharged from the combustion chamber can be decreased and therefore, the distribution coefficient which can decrease the exhaust emission discharged from the combustion chamber is set.

Figure 10:
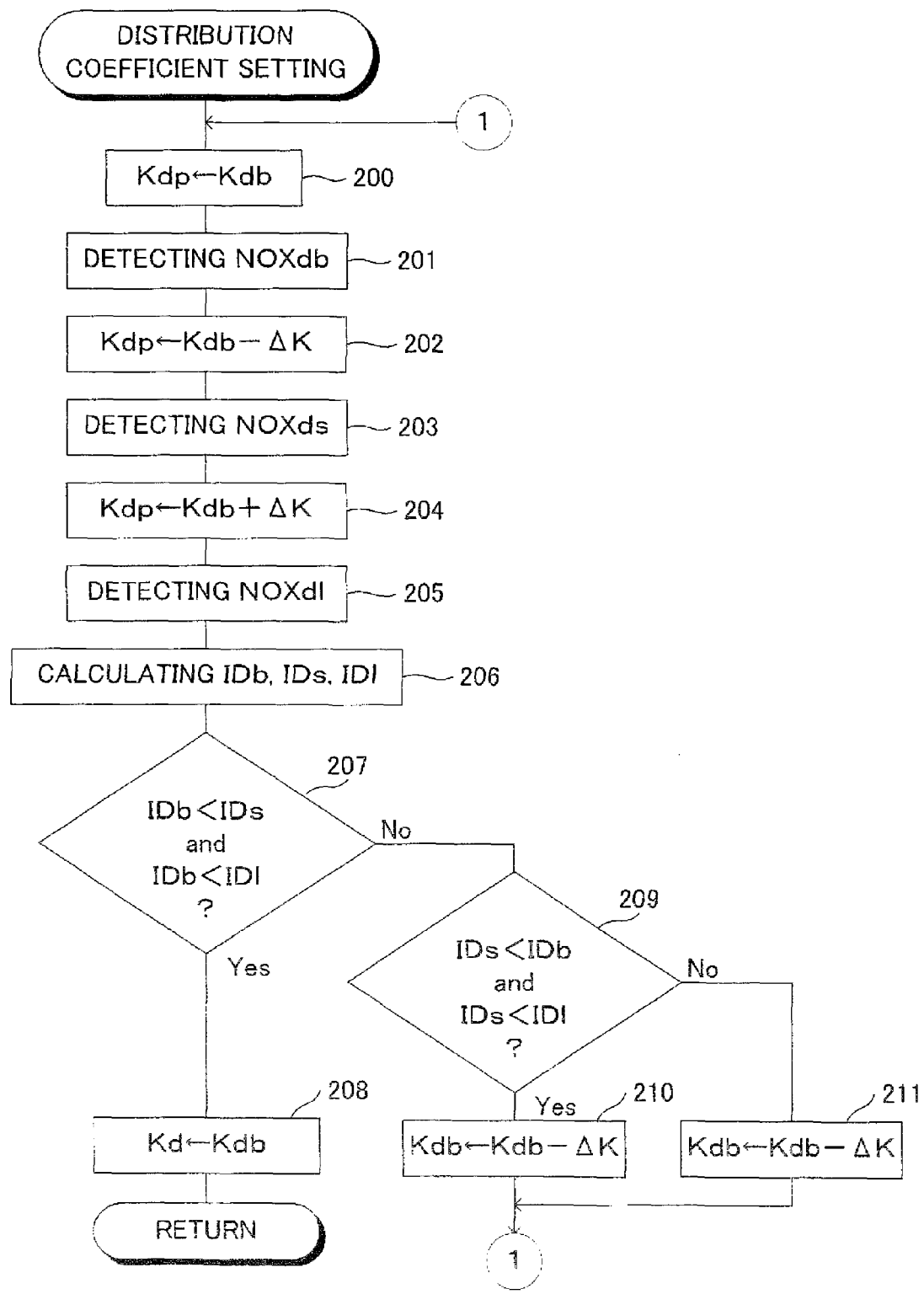
FIG. 10 is a flowchart showing an example of a routine for performing a setting of a distribution coefficient of another embodiment of this invention.

Next, an example of the routine for performing the setting of the second embodiment will be explained. This routine is shown in FIG. 10. The routine shown in FIG. 10 is performed every a predetermined time has elapsed.

When the routine shown in FIG. 10 starts, first, at the step 200, the base distribution coefficient Kdb is set as the provisional distribution coefficient Kdp.

Next, at the step 201, the NOx production amount NOXdb is detected when the engine is operated using the provisional distribution coefficient Kdp set at the step 200.

Next, at the step 202, the value smaller than the base distribution coefficient Kdb by the predetermined value ΔK is set as the provisional distribution coefficient Kdp.

Next, at the step 203, the NOx production amount NOXds is detected when the engine is operated using the provisional distribution coefficient Kdp set at the step 202.

Next, at the step 204, the value larger than the base distribution coefficient Kdb by the predetermined value ΔK is set as the provisional distribution coefficient Kdp.

Next, at the step 205, the NOx production amount NOXdl is detected when the engine is operated using the provisional distribution coefficient Kdp set at the step 204.

Next, at the step 206, the base NOx index value IDb is calculated by applying the NOx production amount NOXdb detected at the step 201 to the formula 17 and then, the decrease-side NOx index value IDs is calculated by applying the NOx production amount NOXds detected at the step 203 to the formula 18 and then, the increase-side NOx index value IDl is calculated by applying the NOx production amount NOXdl detected at the step 205 to the formula 19.

Next, at the step 207, it is judged if the base NOx index value IDb calculated at the step 206 is smaller than the decrease-side NOx index value IDs calculated at the step 206 (IDb<IDs) and the increase-side NOx index value Idl calculated at the step 206 (IDb<IDs).

In this regard, when it is judged that IDb<IDs and IDb<IDl, the routine proceeds to the step 208.

On the other hand, when it is judged that IDb≥IDs or IDb≥IDl, the routine proceeds to the step 209.

When it is judged at the step 207 that IDb<IDs and IDb<IDl, that is, the base NOx index value IDb is the smallest among the three NOx index values IDb, IDs and IDl and then, the routine proceeds to the step 208, the base distribution coefficient Kdb set as the provisional distribution coefficient Kdp at the step 200 is set as the distribution coefficient Kd and then, the routine is terminated.

On the other hand, when it is judged at the step 207 that IDb or IDb that is, the base NOx index value IDb is the smallest among the three NOx index values IDb, IDs and IDl and then, the routine proceeds to the step 209, it is judged if the decrease-side NOx index value IDs calculated at the step 206 is smaller than the base NOx index value IDb calculated at the step 206 (IDs<IDb) and the increase-side NOx index value 101 calculated at the step 206 (IDs<IDl).

In this regard, when it is judged that IDs<IDb and IDs<IDl, the routine proceeds to the step 210.

On the other hand, when it is judged that IDs≥IDb or IDs≥IDl, the routine proceeds to the step 211.

When it is judged at the step 209 that IDs<IDb and IDs<IDl, that is, the decrease-side NOx index value IDs is the smallest among the three NOx index values IDb, IDs and IDl and then, the routine proceeds to the step 210, the value smaller than the base distribution coefficient Kdb set as the provisional distribution coefficient Kdp at the step 200 by the predetermined value ΔK is set as a new base distribution coefficient Kdb and then, the routine returns to the step 200.

On the other hand, when it is judged at the step 209 that IDs≥IDb or IDs≥IDl, that is, the decrease-side NOx index value IDs is not the smallest among the three NOx index values IDb, IDs and IDl and then, the routine proceeds to the step 211, the value larger than the base distribution coefficient Kdb set as the provisional coefficient Kdp at the step 200 by the predetermined value ΔK is set as a new base distribution coefficient and then, the routine returns to the step 200.

Next, the embodiment of the invention relating to the malfunction diagnosis of the fuel injector using the correction value for the target fuel injection amount correction calculated as explained above will be explained.

In one embodiment of the invention, when the accuracy of the fuel injection amount by the fuel injector (hereinafter, this accuracy will be referred to as—fuel injection amount accuracy—) is within the allowable range, the correction value Kq for the target fuel injection amount correction calculated in the above-explained embodiment is within a certain constant range.

That is, when the correction value Kq for the target fuel injection amount correction is not within a range corresponding to the allowable fuel injection amount accuracy range, the fuel injection amount accuracy is not within the allowable range and therefore, it may be judged that the malfunction occurs in the fuel injector.

Thus, the range of the correction value Kq for the target fuel injection amount correction corresponding to the allowable fuel injection amount accuracy range is previously obtained as an allowable correction value range by an experiment, etc. and when the correction value for the target fuel injection amount correction calculated during the engine operation is not within the allowable correction amount range, it can be judged that the malfunction occurs in the fuel injector.

In the above-explained fuel injector malfunction diagnosis, even when the fuel injection difference occurs in the fuel injection or this differece changes due to the fuel injector deterioration or even when the fresh air amount detection difference occurs in the air flow meter or this differece changes due to the air flow meter deterioration or even when the oxygen concentration detection difference occurs or this difference changes due to the upstream oxygen concentration sensor deterioration, the fuel injector malfunction diagnosis is performed on the basis of the correction value for the target fuel injection amount correction calculated using the distribution coefficient in reflection of the difference occurrences or changes.

Thus, the fuel injector malfunction can be diagnosed accurately.

Figure 11:
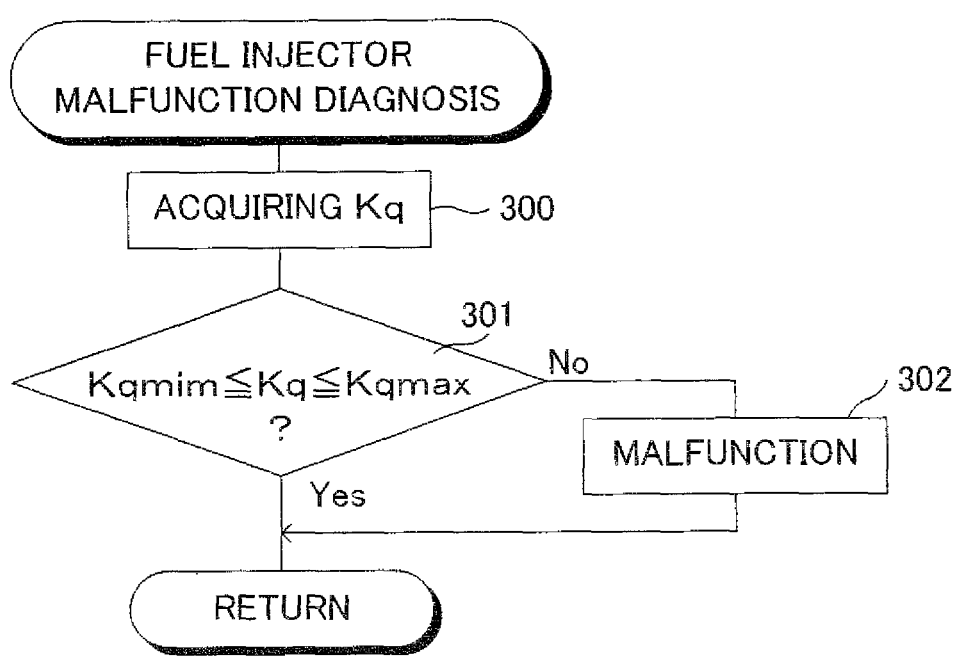
FIG. 11 is a flowchart showing an example of a routine for performing a malfunction diagnosis of the fuel injector of this invention.

Next, an example of a routine for performing the fuel injector malfunction diagnosis of the above-explained embodiment will be explained. This routine is shown in FIG. 11. The routine shown in FIG. 11 is performed every a predetermined time has elapsed.

When the routine shown in FIG. 11 starts, first, at the step 300, the correction value Kq for the target fuel injection amount correction is acquired.

Next, at the step 301, it is judged if the correction value Kq acquired at the step 300 is equal to or larger than the lower limit value Kqmim and is equal to or smaller than the upper limit value Kqmax (Kqmim≤Kq≤Kqmax).

When it is judged that Kqmim≤Kq≤Kqmax, the routine is terminated directly.

In this case, it is diagnosed that no malfunction occurs in the fuel injector.

On the other hand, it is not judged that Kqmim≤Kq≤Kqmax, the routine proceeds to the step 302 where it is diagnosed that a malfunction occurs in the fuel injector and then, the routine is terminated.

Next, an embodiment of the invention relating to the air flow meter malfunction diagnosis using the correction value for the detected fresh air amount correction calculated as explained above will be explained.

In one embodiment of the invention, when the detection accuracy of the fresh air by the air flow meter (hereinafter, this accuracy will be referred to as—fresh air amount detection accuracy—) is within the allowable range, the correction value Kga for the detected fresh air amount correction calculated in the above-explained embodiment is within a certain constant range.

That is, when the correction value Kga for the detected fresh air amount correction is not within the range corresponding to the allowable range of the fresh air amount detection accuracy, the fresh air amount detection accuracy is not within the allowable range and it can be judged that a malfunction occurs in the air flow meter.

Thus, the range of the correction value Kga for the detected fresh air amount correction corresponding to the allowable range of the fresh air amount detection accuracy is obtained previously by an experiment, etc., and it may be diagnosed that a malfunction occurs in the air flow meter when the correction value for the detected fresh air amount correction calculated during the engine operation is not within the above-mentioned allowable correction value range.

In the above-explained air flow meter malfunction diagnosis, even when the fuel injection difference occurs in the fuel injector or this difference changes due to the fuel injector deterioration or when the fresh air amount detection difference occurs in the air flow meter or this difference changes due to the air flow meter deterioration or when the oxygen concentration detection difference occurs in the upstream oxygen concentration sensor or this difference changes due to the upstream oxygen concentration sensor deterioration, the air flow meter malfunction diagnosis is performed on the basis of the correction value for the detected fresh air amount correction calculated using the distribution coefficient in reflection of these difference occurrences or changes.

Thus, the air flow meter malfunction can be diagnosed accurately.

Figure 12:
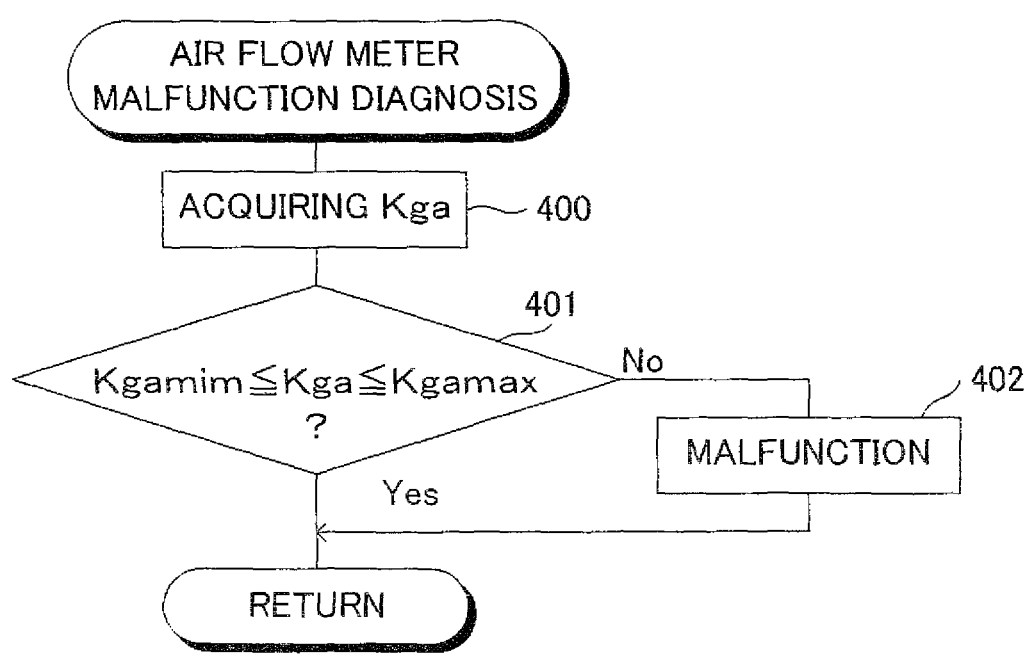
FIG. 12 is a flowchart showing an example of a routine for performing a malfunction diagnosis of an air flow meter of this invention.

Next, an example of a routine for performing the air flow meter malfunction diagnosis of the above-explained embodiment will be explained. This routine is shown in FIG. 12. The routine shown in FIG. 12 is performed every a predetermined time has elapsed.

When the routine shown in FIG. 12 starts, first, at the step 400, the correction value Kga for the detected fresh air amount correction is acquired.

Next, at the step 401, it is judged if the correction value Kga acquired at the step 400 is equal to or larger than the lower limit value Kgamim and is equal to or smaller than the upper limit value Kgamax (Kgamim≤Kga≤Kgamax).

When it is judged that Kgamim≤Kga≤Kgamax, the routine is terminated directly.

In this case, it is not diagnosed that a malfunction occurs in the air flow meter.

On the other hand, when it is not judged that Kgamim≤Kga≤Kgamax, the routine proceeds to the step 402 where it is judged that a malfunction occurs in the air flow meter and then, the routine is terminated.

In the above-explained embodiment, the feedback control of the EGR control valve opening degree on the basis of the EGR rate difference is, for example, a so-called PI control (i.e. a proportional integral control).

Further, in the above-explained embodiment, the target fuel injection amount correction by the correction value for the target fuel injection amount correction may be performed independently of the engine operation condition or this correction may be performed only when the engine operation condition meets the operation condition suitable or necessary to perform this correction.

Further, in the above-explained embodiment, the detected fresh air amount correction by the correction value for the detected fresh air amount correction may be performed independently of the engine operation condition or this correction may be performed only when the engine operation condition meets the operation condition suitable or necessary to perform this correction.

Further, in the above-explained embodiment, the instant correction value Kpi used for calculating the base correction value Kb is, for example, a correction value for correcting the fuel injection amount for the target EGR rate acquisition so as to make the estimated air-fuel ratio correspond to the detected air-fuel ratio by controlling the fresh air amount by the proportional integral feedback control of the EGR rate.

Further, in the above-explained embodiment, the instant correction value may be reflected in the base correction value independently of the engine operation condition or only when the engine operation condition meets a defined operation condition.

In this regard, in order not to reflect the instant correction value to the base correction value when the engine operation state does not satisfy a particular state, for example, the base correction value is calculated according to the formula 10 under the condition where the instant correction value is "0".

Further, the defined operation condition is, for example, a condition that the detected air-fuel ratio is not extremely rich or lean or a condition that the detected air-fuel ratio change is relatively small or a condition that the fuel injection amount change is relatively small or a condition that the intake pressure change is relatively small or a combination of at least two of these conditions.

Further, in the above-explained embodiment, the target fuel injection amount correction by the correction value for the target fuel injection amount correction or the detected fresh air amount correction by the correction value for the detected fresh air amount correction may be performed independently of the engine operation condition or only when the engine operation condition meets a defined operation condition.

In this regard, in order not to perform these corrections when the engine operation state does not satisfy a particular state, for example, "1" is set to the base correction value.

Further, the defined operation condition is, for example, a condition that the engine speed is not extremely large or small or a condition that the fuel injection amount is not extremely large or small or a combination thereof.

Further, a constant time is needed until the air passing the air flow meter is introduced into the combustion chamber.

Further, a constant time is needed until the exhaust gas discharged from the combustion chamber reaches the upstream oxygen concentration sensor.

Further, it is preferred that the detected and estimated air-fuel ratios used for calculating the air-fuel ratio difference ratio by the formula 9 are those relating to the mixture gas at the same time.

Thus, in the above-explained embodiment, when the estimated is calculated, the dead time and the time constant relating to the air until it is introduced after passing the air flow meter are considered while the dead time and the time constant relating to the exhaust gas until it reaches the upstream oxygen concentration sensor after being discharged from the combustion chamber are considered.

Further, in the above-explained embodiment, the learned correction value update may be performed independently of the engine operation condition or only when the engine operation condition meets a defined operation condition.

The defined operation condition is, for example, a condition that the detected air-fuel ratio is not extremely rich or lean or a condition that the detected air-fuel ratio change is relatively small or a condition that the fuel injection amount change is relatively small or a condition that the intake pressure change is relatively small or a combination of at least two of these conditions.

Further, in the above-explained embodiment, the learned correction value update may be terminated by replacing the not-updated learned correction value with the updated learned correction value directly or by changing the not-updated learned correction value toward the updated learned correction value progressively and replacing the not-updated learned correction value with the updated learned correction value finally (i.e. a so-called "leveling processing" may be applied to the learned correction value update.).

Further, the air-fuel ratio difference (i.e. the difference of the estimated air-fuel ratio relative to the air-fuel ratio of the mixture gas calculated on the basis of the detected oxygen concentration) may occur due to the cause other than the fuel injection amount difference, the detected fresh air amount difference and detected oxygen concentration difference.

In this regard, in the base that the air-fuel ratio difference due to the cause other than the fuel injection amount, detected fresh air amount and detected oxygen concentration differences is extremely large, the learned correction value becomes extremely large and as a result, the base correction value becomes extremely large and finally, the correction values for the target fuel injection amount correction and the detected fresh air amount correction become extremely large.

In this case, the target fuel injection amount correction by the correction value for the target fuel injection amount correction and the detected fresh air amount correction by the correction value for the detected fresh air amount correction become extremely large.

In this regard, in the above-explained embodiment, in order to avoid the excess corrections of the target fuel injection amount and the detected fresh air amount, suitable values may be set as the upper limit of the learned correction value (this value is positive and hereinafter, will be referred to as—upper limit learned correction value—) and the lower limit of the learned correction value (this value is negative and hereinafter, will be referred to as—lower limit learned correction value), respectively and then, the learned correction value may be limited to the upper learned correction value when the learned correction value corrected by the instant correction value is positive and larger than the upper limit correction value and on the other hand, the learned correction value may be limited to the lower limit correction value when the learned correction value corrected by the instant correction value is negative and smaller than the lower limit correction value (i.e. the learned correction value and the lower limit learned correction value are negative and therefore, the absolute value of the learned correction value is larger than that of the lower limit learned correction value).

Further, in place of the learned correction value limitation using the upper and lower limit learned correction values, suitable values may be set as the upper limit value of the base correction value (this value is positive and hereinafter, will be referred to as—upper limit base correction value—) and the lower limit value of the base correction value (this value is negative and hereinafter, will be referred to as—lower limit base correction value—), respectively and then, the base correction value may be limited to the upper limit base correction value when the base correction value calculated by the formula 10 is positive and larger than the upper limit base correction value and on the other hand, the base correction value may be limited to the lower limit base correction value when the base correction value calculated by the formula 10 is negative and smaller than the lower limit base correction value (i.e. the base correction value and the lower limit base correction value are negative and therefore, the absolute value of the base correction value is larger than that of the lower limit base correction value).

Further, in place of the learned correction value limitation using the upper and lower limit learned correction value, suitable values may be set as the upper limit value of the correction value for the target fuel injection amount correction (this value is positive and hereinafter, will be referred to as—upper limit correction value—) and the lower limit value of the correction value for the target fuel injection amount correction (this value is negative and hereinafter, will be referred to as—lower limit correction value—) and then, the correction value calculated by the formula 6 may be limited to the upper limit correction value when the correction value is positive and larger than the upper limit correction value and on the other hand, the correction value calculated by the formula 6 may be limited to the lower limit correction value when the correction value is negative and smaller than the lower limit correction value (i.e. the correction value and the lower limit correction value are negative and therefore, the absolute value of the correction value is larger than that of the lower limit correction value).

Further, in place of the learned correction value limitation using the upper and lower limit learned correction values, suitable values may be set as the upper limit value of the correction value for the detected fresh air amount correction (this value is positive and hereinafter, will be referred to as—upper limit correction value) and the lower limit value of the correction value for the detected fresh air amount correction (this value is negative and hereinafter, will be referred to as—lower limit correction value), respectively and then, the correction value calculated by the formula 7 may be limited to the upper limit correction value when the correction value is positive and larger than the upper limit correction value and on the other hand, the correction value calculated by the formula 7 may be limited to the lower limit correction value when the correction value is negative and smaller than the lower limit correction value (i.e. the correction value and the lower limit correction value are negative and therefore, the absolute value of the correction value is larger than that of the lower limit correction value).

Further, the first embodiment relating to the setting is one that the invention is applied to the case that the absolute values of the positive and negative fuel injector tolerances are the same as each other (i.e. X).

However, the invention can be applied to the case that the absolute values of the positive and negative fuel injector tolerances are different from each other.

In this case, it is preferred that when producing the fuel injection amount difference of the fuel injector tolerance having the larger absolute value, the NOx production amount during the engine operation with the distribution coefficient being "0" is used as "NOXi0" of the formula 11 while the NOx production amount during the engine operation with the distribution coefficient being "1" is used as "NOXi1" of the formula 12.

Further, the first embodiment relating to the setting is one that the invention is applied to the case that the absolute values of the positive and negative air flow meter tolerances are the same as each other (i.e. Y).

However, the invention can be applied to the case that the absolute values of the positive and negative air flow meter tolerances are different from each other.

In this case, it is preferred that when producing the detected fresh air amount difference having the larger absolute value, the NOx production amount during the engine operation with the distribution coefficient being "0" is used as "NOXa0" of the formula 13 while the NOx production amount during the engine operation with the distribution coefficient being "1" is used as "NOXa1" of the formula 14.

Further, the first embodiment relating to the setting is one that the invention is applied to the case the absolute values of the positive and negative oxygen concentration sensor tolerances are the same as each other (i.e. Z).

However, the invention can be applied to the case that the absolute values of the positive and negative oxygen concentration sensor tolerances are different from each other.

In this case, it is preferred that when producing the detected oxygen concentration differece of the oxygen concentration sensor tolerance having the larger absolute value, the NOx production amount during the engine operation with the distribution coefficient being "0" is used as "NOXo0" of the formula 15 while the NOx production amount during the engine operation with the distribution coefficient being "1" is used as "NOXo1" of the formula 16.

Further, in the first embodiment relating to the setting, when the total sum running distance is shorter than the base total sum running distance, the distribution coefficient acquired from the first distribution coefficient map is set as the distribution coefficient for the engine control and on the other hand, when the total sum running distance is equal to or longer than the base total sum running distance, the distribution coefficient acquired from the second distribution coefficient map is set as the distribution coefficient for the engine control.

However, in place of this, the distribution coefficient depending on the total sum running distance may be calculated by the interpolation depending on the total sum running distance between the distribution coefficients acquired respectively from the first and second distribution coefficient maps on the basis of the current fuel injection amount and the current engine speed, and this calculated distribution coefficient may be set as the distribution coefficient for the engine control.

Further, in the first embodiment relating to the setting, the two distribution coefficient maps are prepared, one of which is the first map used when the total sum running distance is shorter than the base total sum running distance and the other of which is the second map used when the total sum running distance is equal to or longer than the base distance.

However, two or more distribution coefficient maps may be prepared depending on the total sum running distance, one of them may be selected depending on the total distance and the distribution coefficient acquired from the selected map may be set as that for engine control.

In the case that two or more distribution coefficient maps are prepared depending on the total sum running distance, all maps can be prepared by the process relating to the setting explained relating to the first embodiment.

However, there are proportional relationships between the fuel injection amount difference and NOx index value, between the detected fresh air amount differece and the NOx index value and between the detected oxygen concentration difference and the NOx index value.

That is, the NOx index value increases in proportion to the increase of the fuel injection amount difference, in proportion to the increase of the detected fresh air amount difference and in proportion to the increase of the detected oxygen concentration difference.

Therefore, without acquiring the data of the NOx index value used for preparing all distribution coefficient maps by the above-explained process, only the data of the NOx index value used for preparing at least two distribution coefficient maps by the above-explained maps may be acquired, the NOx index value for preparing the remaining maps may be acquired by the calculation in consideration of the proportional relationship between the fuel injection amount difference and the NOx index value or the proportional relationship between the detected fresh air amount difference and the NOx index value or the proportional relationship between the detected oxygen concentration difference and the NOx index value on the basis of the acquired data, and each map may be prepared.

In the first embodiment relating to the setting, in place of the total sum running distance, a total sum engine operation time (i.e. the total sum operation time of the engine) may be used.

In this case, when the total sum engine operation time is shorter than a base total sum engine operation time (i.e. a base total sum engine operation time corresponding to the base total sum running distance), the distribution coefficient acquired from the first distribution coefficient map is set as the distribution coefficient for the engine control and on the other hand, when the total time is equal to or longer than the base time, the distribution coefficient acquired from the second distribution coefficient map is set as the distribution coefficient for the engine control.

The total sum running distance and the total sum engine operation time represent the deterioration degrees of the injector, the air flow meter and the upstream oxygen concentration sensor and these degrees decreases as the total distance or the total time decreases and these degrees increases as the total distance or the total time increases.

Therefore, it can be understood that the first embodiment of the setting sets the distribution coefficient acquired from the first distribution coefficient map as the distribution coefficient for the engine control when the deterioration degrees of the injector, the air flow meter and the upstream oxygen concentration sensor are smaller than a predetermined base deterioration degree (i.e. a deterioration degree corresponding to the base total sum running distance or the base total sum engine operation time) and on the other hand, sets the distribution coefficient acquired from the second distribution coefficient map as the distribution coefficient for the engine control when the deterioration degrees of the injector, the air flow meter and the upstream sensor are equal to or larger than the base deterioration degree.

In the second embodiment relating to the setting, the detection of the NOx production amount is, for example, performed on the basis of an output value from a sensor for detecting a NOx concentration in the exhaust gas (hereinafter, this sensor will be referred to as—NOx concentration sensor—) arranged in the exhaust passage.

The oxygen concentration in the exhaust gas may be detected by using a mechanism of the NOx concentration sensor for detecting the NOx concentration.

Therefore, in this case, in the second embodiment relating to the setting, in place of the detection of the oxygen concentration (i.e. the air-fuel ratio of the mixture gas) in the exhaust gas by the upstream oxygen concentration sensor, the oxygen concentration (i.e. the air-fuel ratio of the mixture gas) in the exhaust gas by the NOx sensor may be detected.

In the second embodiment relating to the setting, the predetermined value, a value smaller than the base distribution coefficient by which predetermined value when detecting the NOx production amount NOXds of the formula 18 may be the same as or different from the predetermined value.

In the second embodiment relating to the setting, the predetermined value, by which a value smaller than the base distribution coefficient is set to a new base distribution coefficient when it is judged that the index value IDs calculated by the formula 18 is the smallest one may be the same or different from the predetermined value, by which a value larger than the base distribution coefficient is set to a new base distribution coefficient when it is judged that the index value IDi calculated by the formula 19 is the smallest one.

In the second embodiment relating to the setting, the predetermined value, by which a value smaller than the base distribution coefficient is set to the provisional distribution coefficient when the NOx production amount NOXds of the formula 18 is detected may be the same or different from the predetermined value, by which a value smaller than the base distribution coefficient is set to the new base distribution coefficient when it is judged that the index value IDs calculated by the formula 18 is the smallest one (or the predetermined value, by which a value larger than the base distribution coefficient is set to a new base distribution coefficient when it is judged that the index value ID1 calculated by the formula 19 is the smallest one).

In the second embodiment relating to the setting, the predetermined value, by which a value larger than the distribution coefficient is set to a provisional distribution coefficient when the NOx production amount NOXd1 of the formula 19 is detected may be the same or different from the predetermined value, by which a value smaller than the base distribution coefficient is set a new base distribution coefficient when it is judged that the index value IDs calculated by the formula 18 is the smallest one (or the predetermined value, by which a value larger than the base distribution coefficient is set to a new base distribution coefficient when it is judged that the index value ID1 calculated by the formula 19 is the smallest one).

In the second embodiment relating to the distribution setting, the setting of the distribution coefficient may be performed independently of the engine operation condition and the setting of the distribution coefficient may be performed only when the engine operation condition is one suitable for the detection of the NOx concentration by the NOx concentration sensor (i.e. when the engine operation condition is one where the NOx concentration is detected by the accuracy larger than the predetermined accuracy by the NOx concentration sensor).

In the case that the distribution coefficient is set by the setting of the second embodiment, as the initial value of the distribution coefficient after the injector of the engine is replaced with a new one or the air flow meter of the engine is replaced with a new one or the upstream oxygen concentration sensor of the engine is replaced with a new one, the distribution coefficient used before the replacement of the injector or the air flow meter or the upstream oxygen sensor or "1" may be employed.

The large distribution coefficient is preferred in order to avoid the excessive correction of the target fuel injection amount or the detected fresh air amount by the correction value for the excessive large target fuel injection amount or detected fresh air amount correction which is led when the detected oxygen concentration difference is considerably large and therefore, the employment of "1" as the initial value of the distribution coefficient is preferred in order to avoid such an excessive correction.

In the case that the distribution coefficient is set by the setting of the second embodiment, any value (which is equal to or larger than "0" and equal to or smaller than "1") may be employed as the initial value of the distribution coefficient after the reset of the presently-used distribution coefficient.

However, the large distribution coefficient is preferred in order to avoid the excessive correction of the target fuel injection amount or detected fresh air amount by the excessive large correction value for the target fuel injection amount correction or the detected fresh air amount correction which is led when the detected oxygen concentration difference is considerably large and therefore, the employment of "1" as the initial value of the distribution coefficient is preferred in order to avoid such an excessive correction.

In the second embodiment relating to the setting, a predetermined number of the base index values may be calculated by the formula 17, the average value of these calculated values may be calculated and this calculated average value may be compared with the decrease-side and increase side NOx index values.

Similarly, a predetermined number of the decrease-side NOx index values may be calculated by the formula 18, the average value of these calculated values may be calculated and this calculated average value may be compared with the base and increase-side NOx index values.

Similarly, a predetermined number of the increase-side NOx index values may be calculated by the formula 19, the average value of these calculated values may be calculated and this calculated average value may be compared with the base and decrease-side NOx index values.

In the case that the setting of the second embodiment is employed, if the correction of the target fuel injection amount by the correction value for target fuel injection amount correction or of the detected fresh air amount by the correction value for the detected fresh air amount correction may not be performed, it is preferred that the setting of the distribution coefficient is performed on condition of performing this correction.

In the case that the setting of the second embodiment is employed, the distribution coefficient setting may be performed independently of the engine condition or only when a specific engine condition is satisfied.

The specific engine condition is, for example, one where a predetermined time has elapsed or the vehicle has run for a predetermined running distance.

That is, the setting may be performed every the predetermined time has elapsed or the vehicle has run for the predetermined running distance.

As the initial base distribution coefficient of the setting of the second embodiment, a value other than the presently-used distribution coefficient may be set.

However, in consideration of the fact that the presently-used distribution coefficient becomes a value for maintaining the NOx production amount at a desired amount or a near value, it is preferred that the presently-used distribution coefficient is set as the initial coefficient of the setting of the second embodiment in order to maintain the NOx production amount at the desired amount.

In the above-explained embodiments, it is a given fact that the distribution coefficient is equal to or smaller than "1".

Therefore, in the case that "1" is set as the initial base distribution coefficient of the setting of the second embodiment, a value larger than the base coefficient by the predetermined value cannot be set and therefore, the increase-side NOx index value cannot be calculated by the formula 19.

In this case, the base NOx index value calculated by the formula 17 is compared with the decrease-side NOx index value calculated by the formula 18 and then, if the base NOx index value is smaller than or equal to the decrease-side NOx index value, the setting is terminated by setting the base coefficient (i.e. "1") to the distribution coefficient, and on the other hand, if the decrease-side NOx index value is smaller than the base NOx index value, a value smaller than the base coefficient by the predetermined value is set as a new base coefficient and thereafter, the process explained relating to the setting of the second embodiment is repeated.

When the base NOx index value is equal to the decrease-side NOx index value, the setting of the distribution coefficient may be terminated by setting a value smaller than the base coefficient by the predetermined value as the distribution coefficient.

However, the large distribution coefficient is preferred in order to avoid the excessive correction of the target fuel injection amount or detected fresh air amount by the excessive correction value for the target fuel injection amount correction or detected fresh air amount correction which is led in the case that the detected oxygen concentration difference is considerably large and therefore, it is preferred that the base coefficient (i.e. "1") is set as the distribution coefficient when the base NOx index value is equal to the decrease-side NOx index value in order to avoid such an excessive correction.

The base coefficient may become "1" during the setting of the second embodiment.

In this case, a value larger than the base coefficient by the predetermined value cannot be set and therefore, the increase-side NOx index value cannot be calculated by the formula 19.

In this case, the base NOx index value calculated by the formula 17 is compared with the decrease-side NOx index value calculated by the formula 18 and then, if the base value is smaller than or equal to the decrease-side NOx index value, the setting of the distribution coefficient is terminated by setting the base coefficient (i.e. "1") as the distribution coefficient and on the other hand, if the decrease-side NOx index value is smaller than the base NOx index value, a value smaller than the base coefficient by the predetermined value is set as a new base coefficient and thereafter, the process explained relating to the setting of the second embodiment is repeated.

In the above-explained embodiments, it is a given fact that the distribution coefficient is equal to or larger than "0".

Therefore, in the case that "0" is set as the initial base coefficient of the setting of the second embodiment, a value smaller than the base coefficient by the predetermined value cannot be set and therefore, the decrease-side NOx index value cannot be calculated by the formula 18.

In this case, the base NOx index value calculated by the formula 17 is compared with the increase-side NOx index value calculated by the formula 19 and then, if the base value is smaller than the increase-side value, the setting of the distribution coefficient is terminated by setting the base coefficient (i.e. "0") as the distribution coefficient, if the base value is equal to the increase-side value, the setting of the distribution coefficient is terminated by setting a value larger than the base coefficient as the distribution coefficient and if the increase-side value is smaller than the base value, a value larger than the base coefficient by the predetermined value is set as a new base coefficient and thereafter, the process explained relating to the setting of the second embodiment is repeated.

When the base value is equal to the increase-side value, the setting of the distribution coefficient may be terminated by setting the base coefficient as the distribution coefficient.

However, the large distribution coefficient is preferred in order to avoid the excessive correction of the target fuel injection amount or detected fresh air amount by the excessive large correction value for the target fuel injection amount correction or detected fresh air amount correction which is led in the case that the detected oxygen concentration difference is considerably large and therefore, it is preferred that a value larger than the base coefficient by the predetermined value is set as the distribution coefficient when the base NOx index value is equal to the increase-side value in order to avoid such an excessive correction.

The base coefficient may become "0" during the setting of the second embodiment.

In this case, a value smaller than the base coefficient by the predetermined value cannot be set and therefore, the decrease-side NOx index value cannot be calculated by the formula 18.

In this case, the base value calculated by the formula 17 is compared with the increase-side value calculated by the formula 19 and if the base value is smaller than the increase-side value, the setting of the distribution coefficient is terminated by setting the base coefficient (i.e. "0") as the distribution coefficient, if the base value is equal to the increase-side value, the setting is terminated by setting a value larger than the base coefficient by the predetermined value as the distribution coefficient and if the increase-side value is smaller than the base value, a value larger than the base coefficient by the predetermined value is set as a new distribution coefficient and thereafter, the process explained relating to the setting of the second embodiment is repeated.

In the case that the setting of the distribution coefficient of the second embodiment is employed, the malfunction diagnosis of the injector or air flow meter may be performed during the engine operation independently of whether the setting of the distribution coefficient is completed or the malfunction diagnosis of the injector or air flow meter may not be performed during the setting of the distribution coefficient and then, the diagnosis may be performed when the setting of the distribution coefficient is completed.

In the case that the limitation of the learned correction value by the upper and lower learned correction values or the limitation of the base correction value by the upper and lower base correction values or the limitation of the correction value for the target fuel injection amount correction by the upper and lower correction value is performed, it is preferred that the correction value for the target fuel injection amount correction calculated using the unlimited learned or base correction value or the unlimited correction value for the target fuel injection amount correction is employed as the correction value for the target fuel injection amount correction used for the injector malfunction diagnosis.

In the case that the limitation of the learned correction value by the upper and lower learned correction values or the limitation of the base correction value by the upper and lower base correction values or the limitation of the correction value for the detected fresh air amount correction by the upper and lower correction value is performed, it is preferred that the correction value for detected fresh air amount correction calculated using the unlimited learned or base correction value or the unlimited correction value for the detected fresh air amount correction is employed as the correction value for the detected fresh air amount correction used for the air flow meter malfunction diagnosis.

The above-explained embodiments are those that the invention is applied to the case that the EGR control valve opening is controlled to control the EGR rate.

However, the invention can be applied to the control of the throttle valve opening as well as the EGR control valve opening degree to control the EGR rate.

In addition, the invention can be applied to the control of the throttle valve opening degree without the EGR control valve opening degree to control the EGR rate.

The engine of the above-explained embodiments comprises a supercharger having an exhaust turbine arranged in the exhaust passage and a compressor arranged in the intake passage and the turbine of the supercharger has vanes for controlling the air compression by the compressor, the invention can be applied to the control of a vane opening degree as well as the EGR control valve opening degree to control the EGR rate.

In addition, the invention can be applied to the control of the vane opening degree without the EGR control valve opening degree to control the EGR rate.

The above-explained embodiments is those that the invention is applied to the case that the fuel injection amount used for the target EGR rate setting is corrected by the correction value introduced from the base correction value (i.e. the correction value for the target fuel injection amount correction).

However, the invention can be applied to the correction of the engine speed as well as the fuel injection amount used for the target EGR rate setting by the correction value introduced from the base correction value.

The invention can be applied to the correction of the engine speed without the fuel injection amount used for the target EGR rate setting by the correction value introduced from the base correction value.

The above-explained embodiments are those that the invention is applied to the case that the engine speed and the fuel injection amount are used for the target EGR rate setting.

However, the invention can be applied to the case that the engine speed, the fuel injection amount and parameter(s) other than them are used for the target EGR rate setting.

In this case, in addition to or in place of the correction of the fuel injection amount used for the target EGR rate setting by the correction value introduced from the base correction value (i.e. the correction value for the target fuel injection amount correction), the added parameter(s) may be corrected by the correction value introduced from the base correction value.

The invention can be applied to the case that the engine speed and the fuel injection amount are not used and parameter(s) other than them is/are used for the target EGR rate setting.

In this case, the added parameter(s) is/are corrected by the correction value introduced from the base correction value.

The above-explained embodiments are those that the invention is applied to the correction of the fuel injection amount for the target EGR rate acquisition, the detected fresh air amount for the estimated EGR rate calculation, the detected fresh air amount for the estimated air-fuel ratio calculation and the estimated fuel injection amount for the estimated air-fuel ratio calculation.

However, the invention can be applied to the correction of parameters such as a fuel injection command given to the injector, a command given to the throttle valve, etc. other than the above-mentioned parameters.

In the above-explained embodiments, the fuel injection amount for the target EGR rate acquisition is corrected, however, the actual EGR rate changes by changing the target EGR rate and thereby, the fresh air amount changes.

Therefore, the EGR control valve of the above-explained embodiments is means for controlling the amount of the air supplied to the combustion chamber and the correction of the fuel injection amount for the target EGR rate acquisition of the above-explained embodiment is a correction of the amount of the air supplied to the combustion chamber.

The above-explained embodiments are those that the invention is applied to the compression self-ignition engine. However, the invention can be applied to a spark ignition internal combustion engine (so-called gasoline engine).

The invention claimed is:

1. A control device of an internal combustion engine including at least one fuel injector for supplying a fuel to a combustion chamber, a throttle valve for controlling an amount of an air supplied to the combustion chamber, an air flow meter for detecting an amount of the air supplied to the combustion chamber as a detected air amount, an air-fuel ratio sensor for detecting an air-fuel ratio of a mixture gas formed in the combustion chamber as a detected air-fuel ratio, and an exhaust recirculation device for introducing to an intake passage an exhaust gas discharged from the combustion chamber to an exhaust passage, the control device comprising:

an electronic control unit configured:
  to acquire a target fuel injection amount, which is a target amount of the fuel to be supplied to the combustion chamber by the fuel injector, and control the fuel injector to inject the target fuel injection amount of the fuel from the fuel injector;
  to acquire a target throttle valve opening degree, which is a target value of an opening degree of the throttle valve for supplying a target amount of the air to the combustion chamber on the basis of the target fuel injection amount, and control the throttle valve to cause the opening degree of the throttle valve to become the target throttle valve opening degree;
  to calculate an estimated exhaust gas recirculation amount, which is an estimated amount of the exhaust gas actually introduced to the intake passage by the exhaust recirculation device on the basis of an amount of a gas suctioned into the combustion chamber and a corrected air amount, the corrected air amount being acquired by correcting the detected air amount by a second correction value, the second correction value being acquired on the basis of a calculated base correction value and a set control-used distribution coefficient; and
  to perform an air-fuel ratio control
    for acquiring a target exhaust gas recirculation amount, which is a target amount of the exhaust gas to be introduced to the intake passage by the exhaust recirculation device on the basis of a corrected injection amount, the corrected injection amount being acquired by correcting the target fuel injection amount by a first correction value, the first correction value being acquired on the basis of the calculated base correction value and the set control-used distribution coefficient, and
    for controlling the exhaust recirculation device to cause an exhaust gas recirculation amount, which is an amount of the exhaust gas introduced to the intake passage by the exhaust recirculation device, to become the target exhaust gas recirculation amount, to cause the detected air-fuel ratio and an estimated air-fuel ratio to correspond to each other, the estimated air-fuel ratio being acquired by dividing the corrected air amount by the corrected injection amount, wherein the electronic control unit is also configured:
(A) to calculate an air-fuel ratio difference, which is a difference of the estimated air-fuel ratio relative to the detected air-fuel ratio;
(B) to calculate a correction value for correcting the target fuel injection amount as the base correction value on the basis of the air-fuel ratio difference to acquire the target exhaust gas recirculation amount capable of causing the estimated air-fuel ratio and the detected air-fuel ratio to correspond to each other using the target fuel injection amount corrected by the base correction value;
(C) to acquire the control-used distribution coefficient by performing:
  (C1) a process for acquiring a discharged NOx amount, which is an amount of a NOx included in the exhaust gas discharged from the combustion chamber as a first NOx amount when performing the air-fuel ratio control using the target fuel injection amount in place of using the corrected injection amount under the condition where the fuel injector has an error, the air flow meter has no error, and the air-fuel ratio sensor has no error;
  (C2) a process for acquiring the discharged NOx amount as a second NOx amount when performing the air-fuel ratio control using the detected air amount in place of using the corrected air amount under the condition where the fuel injector has an error, the air flow meter has no error, and the air-fuel ratio sensor has no error;
  (C3) a process for acquiring the discharged NOx amount as a third NOx amount when performing the air-fuel ratio control using the target fuel injection amount in place of using the corrected injection amount under the condition where the fuel injector has no error, the air flow meter has an error, and the air-fuel ratio sensor has no error;
  (C4) a process for acquiring the discharged NOx amount as a fourth NOx amount when performing the air-fuel ratio control using the detected air amount in place of using the corrected air amount under the condition where the fuel injector has no error, the air flow meter has an error, and the air-fuel ratio sensor has no error;
  (C5) a process for acquiring the discharged NOx amount as a fifth NOx amount when performing the air-fuel ratio control using the target fuel injection amount in place of using the corrected injection amount under the condition where the fuel injector has no error, the air flow meter has no error, and the air-fuel ratio sensor has an error;
  (C6) a process for acquiring the discharged NOx amount as a sixth NOx amount when performing the air-fuel ratio control using the detected air amount in place of using the corrected air amount under the condition where the fuel injector has no error, the air flow meter has no error, and the air-fuel ratio sensor has an error; and
  (C7) a process for setting the control-used distribution coefficient to a value capable of minimizing the detected NOx amount on the basis of the first to sixth NOx amounts; and
(D) to acquire a value $Kb^{Kd}$ as the first correction value and a value $Kb^{-(1-Kd)}$ as the second correction value, Kb being the base correction value and Kd being the control-used distribution coefficient.

2. The device of claim 1, wherein
an allowable range of the first correction value is previously set as a first allowable range, and
the electronic control unit is configured to diagnose the occurrence of a malfunction in the fuel injector when the first correction value is not within the first allowable range.

3. The device of claim 2, wherein
an allowable range of the second correction value is previously set as a second allowable range, and
the electronic control unit is configured to diagnose the occurrence of a malfunction in the air flow meter when the second correction value is not within the second allowable range.

4. A control device of an internal combustion engine including at least one fuel injector for supplying a fuel to a combustion chamber, a throttle valve for controlling an amount of an air supplied to the combustion chamber, an air flow meter for detecting an amount of the air supplied to the combustion chamber as a detected air amount, an air-fuel ratio sensor for detecting an air-fuel ratio of a mixture gas formed in the combustion chamber as a detected air-fuel ratio, an exhaust recirculation device for introducing to an intake passage an exhaust gas discharged from the combustion chamber to an exhaust passage, and means for detecting an amount of NOx discharged from the combustion chamber as a detected NOx amount, the control device comprising:
an electronic control unit configured:
to acquire a target fuel injection amount, which is a target amount of the fuel to be supplied to the combustion chamber by the fuel injector, and control the fuel injector to inject the target fuel injection amount of the fuel from the fuel injector;
to acquire a target throttle valve opening degree, which is a target value of an opening degree of the throttle valve for supplying a target amount of the air to the combustion chamber on the basis of the target fuel injection amount, and control the throttle valve to cause the opening degree of the throttle valve to become the target throttle valve opening degree;
to calculate an estimated exhaust gas recirculation amount, which is an estimated amount of the exhaust gas actually introduced to the intake passage by the exhaust recirculation device on the basis of an amount of a gas suctioned into the combustion chamber and a corrected air amount, the corrected air amount being acquired by correcting the detected air amount by a second correction value, the second correction value being acquired on the basis of a calculated base correction value and a set control-used distribution coefficient; and
to perform an air-fuel ratio control
for acquiring a target exhaust gas recirculation amount, which is a target amount of the exhaust gas to be introduced to the intake passage by the exhaust recirculation device on the basis of a corrected injection amount, the corrected injection amount being acquired by correcting the target fuel injection amount by a first correction value, the first correction value being acquired on the basis of the calculated base correction value and the set control-used distribution coefficient, and
for controlling the exhaust recirculation device to cause an exhaust gas recirculation amount, which is an amount of the exhaust gas introduced to the intake passage by the exhaust recirculation device, to become the target exhaust gas recirculation amount, to cause the detected air-fuel ratio and an estimated air-fuel ratio to correspond to each other, the estimated air-fuel ratio being acquired by dividing the corrected air amount by the corrected injection amount,
wherein the electronic control unit is also configured:
(A) to calculate an air-fuel ratio difference, which is a difference of the estimated air-fuel ratio relative to the detected air-fuel ratio;
(B) to calculate a correction value for correcting the target fuel injection amount as the base correction value on the basis of the air-fuel ratio difference to acquire the target exhaust gas recirculation amount capable of causing the estimated air-fuel ratio and the detected air-fuel ratio to correspond to each other using the target fuel injection amount corrected by the calculated base correction value;
(C) to perform:
(C1) a process for acquiring the detected NOx amount as a base NOx amount when performing the air-fuel ratio control using the presently-set control-used distribution coefficient;
(C2) a process for acquiring the detected NOx amount as an increase-side NOx amount when performing the air-fuel ratio control using an increase-side distribution coefficient larger than the presently-set control-used distribution coefficient in place of using the presently-set control-used distribution coefficient; and
(C3) a process for acquiring the detected NOx amount as a decrease-side NOx amount when performing the air-fuel ratio control using a decrease-side distribution coefficient smaller than the presently-set control-used distribution coefficient in place of using the presently-set control-used distribution coefficient;
(D) to set the presently-set control-used distribution coefficient as the control-used distribution coefficient when the base NOx amount is the smallest among the base NOx amount, the increase-side NOx amount, and the decrease-side NOx amount;
(E) to perform a first process when the increase-side NOx amount is the smallest among the base NOx amount, the increase-side NOx amount, and the decrease-side NOx amount, the first process being realized by performing:
(E1) a process for acquiring the increase-side NOx amount as a new base NOx amount;
(E2) a process for setting a value larger than the presently-set increase-side distribution coefficient as a new increase-side distribution coefficient and acquiring the detected NOx amount as a new increase-side NOx amount when performing the air-fuel ratio control using the new increase-side distribution coefficient in place of using the control-used distribution coefficient; and
(E3) a process for setting a value smaller than the presently-set increase-side distribution coefficient as a new decrease-side distribution coefficient and acquiring the detected NOx amount as a new decrease-side NOx amount when performing the air-fuel ratio control using the new decrease-side distribution coefficient in place of using the control-used distribution coefficient;
(F) to perform a second process when the decrease-side NOx amount is the smallest among the base NOx amount, the increase-side NOx amount, and the decrease-side NOx amount, the second process being realized by performing:

(F1) a process for acquiring the decrease-side NOx amount as a new base NOx amount;

(F2) a process for setting a value larger than the presently-set decrease-side distribution coefficient as a new increase-side distribution coefficient and acquiring the detected NOx amount as a new increase-side NOx amount when performing the air-fuel ratio control using the new increase-side distribution coefficient in place of using the control-used distribution coefficient; and (F3) a process for setting a value smaller than the presently-set decrease-side distribution coefficient as a new decrease-side distribution coefficient and acquiring the detected NOx amount as a new decrease-side NOx amount when performing the air-fuel ratio control using the new decrease-side distribution coefficient in place of using the control-used distribution coefficient;

(G) to perform the first process when the increase-side NOx amount is the smallest among the base NOx amount, the increase-side NOx amount, and the decrease-side NOx amount;

(H) to perform the second process when the decrease-side NOx amount is the smallest among the base NOx amount, the increase-side NOx amount, and the decrease-side NOx amount;

(I) to set the presently-set increase-side distribution coefficient used in the first process as the control-used distribution coefficient when the base NOx amount is the smallest among the base NOx amount, the increase-side NOx amount, and the decrease-side NOx amount;

(J) to set the presently-set decrease-side distribution coefficient used in the second process as the control-used distribution coefficient when the base NOx amount is the smallest among the base NOx amount, the increase-side NOx amount, and the decrease-side NOx amount acquired in the second process; and (K) to acquire a value $Kb^{Kd}$ as the first correction value and a value $Kb^{-(1-Kd)}$ as the second correction value, Kb being the base correction value and Kd being the control-used distribution coefficient.

5. The device of claim 4, wherein an allowable range of the second correction value is previously set as a second allowable range, and the electronic control unit is configured to diagnose the occurrence of a malfunction in the air flow meter when the second correction value is not within the second allowable range.

* * * * *